US011265850B2

(12) United States Patent
Werb

(10) Patent No.: US 11,265,850 B2
(45) Date of Patent: Mar. 1, 2022

(54) MOBILITY EXTENSIONS TO INDUSTRIAL-STRENGTH WIRELESS SENSOR NETWORKS

(71) Applicant: ICT Research LLC, Newton Upper Falls, MA (US)

(72) Inventor: Jay P. Werb, Newton, MA (US)

(73) Assignee: ICT Research LLC, Newton Upper Falls (MA)

( * ) Notice: Subject to any disclaimer, the term of this patent is extended or adjusted under 35 U.S.C. 154(b) by 505 days.

(21) Appl. No.: 15/627,907

(22) Filed: Jun. 20, 2017

(65) Prior Publication Data

US 2017/0289812 A1 Oct. 5, 2017

Related U.S. Application Data

(63) Continuation of application No. 14/655,031, filed as application No. PCT/US2013/077677 on Dec. 24, 2013, now Pat. No. 9,699,768.

(Continued)

(51) Int. Cl.
*H04L 5/00* (2006.01)
*H04W 72/04* (2009.01)
(Continued)

(52) U.S. Cl.
CPC ....... *H04W 72/0406* (2013.01); *H04L 63/104* (2013.01); *H04L 63/12* (2013.01);
(Continued)

(58) Field of Classification Search
CPC ....... H04L 63/104; H04L 63/12; H04L 67/12; H04W 84/18; H04W 88/02; H04W 8/005
See application file for complete search history.

(56) References Cited

U.S. PATENT DOCUMENTS 7,242,294 B2   7/2007 Warrior et al.
7,701,858 B2   4/2010 Werb et al.
(Continued)

FOREIGN PATENT DOCUMENTS

DE   10 2005 055 150 A1   3/2014
WO   WO-2010/127394 A1   11/2010

OTHER PUBLICATIONS

Extended European Search Report for EP Patent Application No. 13866517.9, dated Jul. 20, 2016.
(Continued)

*Primary Examiner* — Phuc H Tran
(74) *Attorney, Agent, or Firm* — Foley and Lardner LLP

(57) ABSTRACT

The present solution, in various embodiments, addresses deficiencies in the prior art by providing systems, methods, and devices that enable industrial wireless sensor network nodes, individually or in clusters, to at least: (i) discover quickly and efficiently wireless neighbors that may come within range periodically and/or infrequently, (ii) communicate temporarily with one another in mobile configurations, (iii) transmit and/or receive information and commands from a source to a destination in delay-tolerant network configurations, and/or (iv) transmit and/or receive information and commands from a source to a destination via a mobile cluster that includes a store-and-forward (S&F) surrogate.

34 Claims, 34 Drawing Sheets

Related U.S. Application Data

(60) Provisional application No. 61/848,214, filed on Dec. 26, 2012, provisional application No. 61/859,869, filed on Jul. 30, 2013.

(51) Int. Cl.
| | |
|---|---|
| *H04W 4/70* | (2018.01) |
| *H04L 29/06* | (2006.01) |
| *H04W 12/08* | (2021.01) |
| *H04W 56/00* | (2009.01) |
| *H04W 12/033* | (2021.01) |
| *H04L 67/12* | (2022.01) |
| *H04L 67/63* | (2022.01) |
| *H04W 88/02* | (2009.01) |
| *H04W 84/18* | (2009.01) |
| *H04W 8/00* | (2009.01) |

(52) U.S. Cl.
CPC ............ *H04L 67/12* (2013.01); *H04L 67/327* (2013.01); *H04W 4/70* (2018.02); *H04W 12/033* (2021.01); *H04W 12/08* (2013.01); *H04W 56/002* (2013.01); *H04W 8/005* (2013.01); *H04W 84/18* (2013.01); *H04W 88/02* (2013.01)

(56) References Cited

U.S. PATENT DOCUMENTS

| | | | |
|---|---|---|---|
| 8,140,658 B1 | 3/2012 | Gelvin et al. | |
| 8,248,963 B2* | 8/2012 | Kim | G01S 5/0289 370/252 |
| 9,338,235 B2* | 5/2016 | Park | H04W 4/48 |
| 2003/0151513 A1* | 8/2003 | Herrmann | G08B 25/003 340/573.1 |
| 2009/0323669 A1 | 12/2009 | Salonidis et al. | |
| 2010/0260167 A1 | 10/2010 | Kim et al. | |
| 2011/0007663 A1 | 1/2011 | Scotton et al. | |
| 2011/0084800 A1 | 4/2011 | Ko et al. | |
| 2011/0122811 A1* | 5/2011 | Yuan | H04W 28/06 370/328 |
| 2011/0299421 A1 | 12/2011 | Werb et al. | |
| 2012/0300753 A1 | 11/2012 | Brown et al. | |
| 2013/0077548 A1* | 3/2013 | Park | H04W 52/46 370/311 |
| 2014/0286301 A1* | 9/2014 | Werb | H04W 84/18 370/330 |

OTHER PUBLICATIONS

International Preliminary Report on Patentability for International Application No. PCT/US2013/077677 dated Jul. 9, 2015, 9 pages.

International Search Report of the International Searching Authority for International Application No. PCT/US2013/077677 dated Apr. 29, 2014, 3 pages.

Jonson, T. et al.; "Application of Delay Tolerant Networking (DTN) in Airborne Networks", Military Communications Conference, IEEE Piscataway, NJ, Nov. 16, 2008, pp. 1-7.

Khabbas, M. J., et al.; "Disruption-Tolerant Networking: A Comprenensive Survey on Recent Developments and Persisting Challenges", IEEE Communication Surveys and Tutorials, Institute of Electrical and Electronics Engineers, US, vol. 14, No. 2, Apr. 1, 2012, 34 Pages.

Notice of Allowance for U.S. Appl. No. 14/655,031, dated Mar. 3, 2017.

Office Action for U.S. Appl. No. 14/655,031, dated Sep. 23, 2016.

Written Opinion of the International Searching Authority on International Application No. PCT/US2013/077677 dated on Apr. 29, 2014.

\* cited by examiner

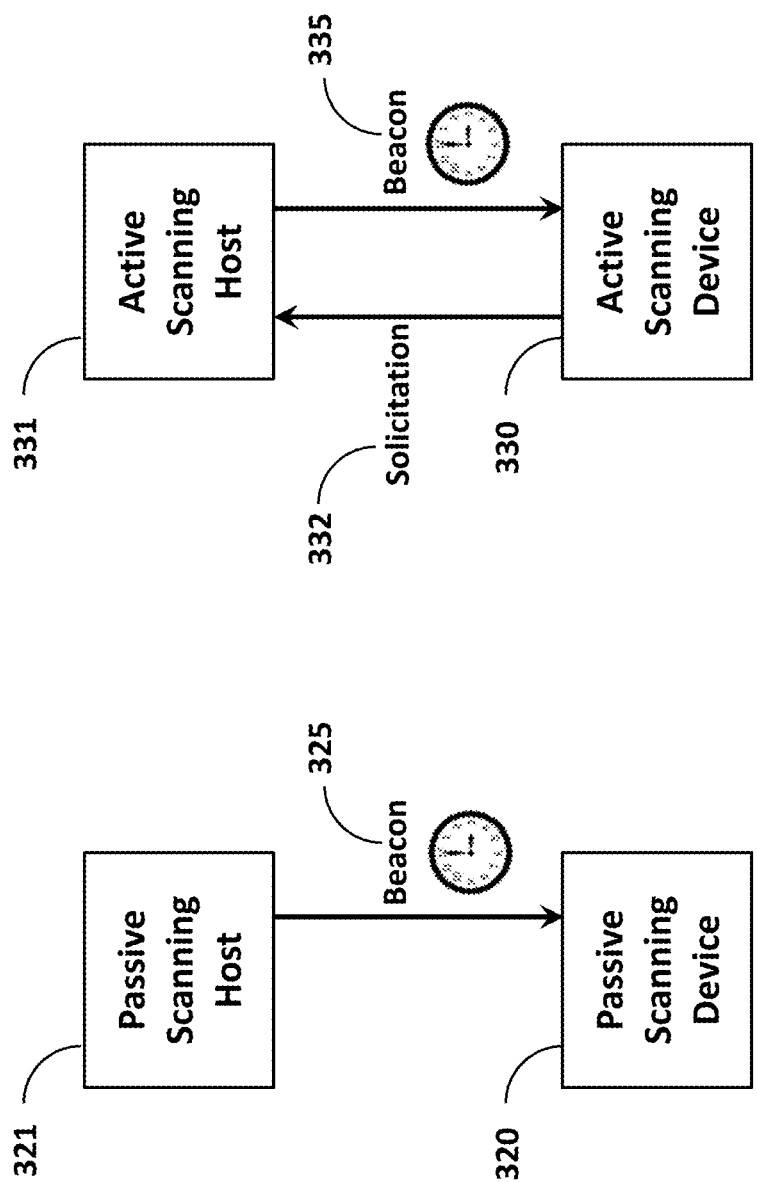

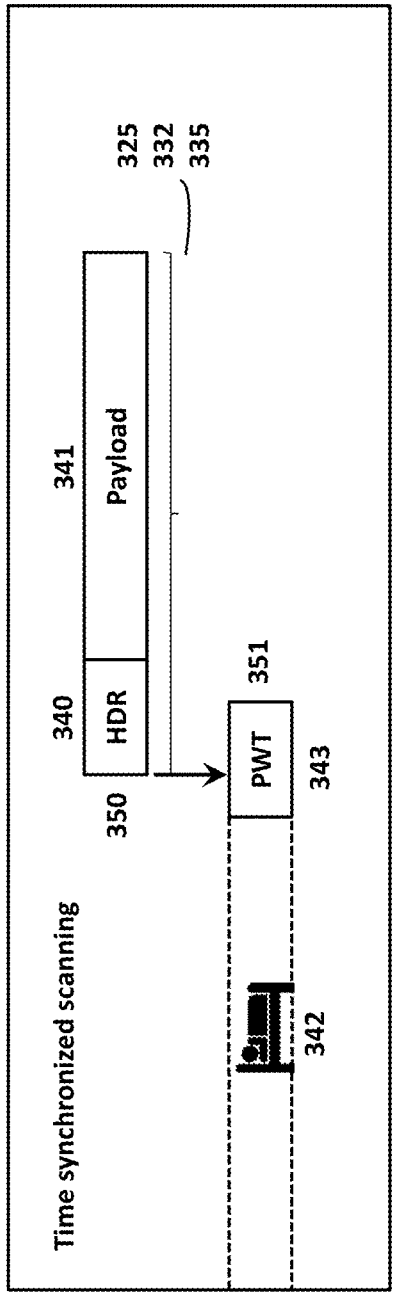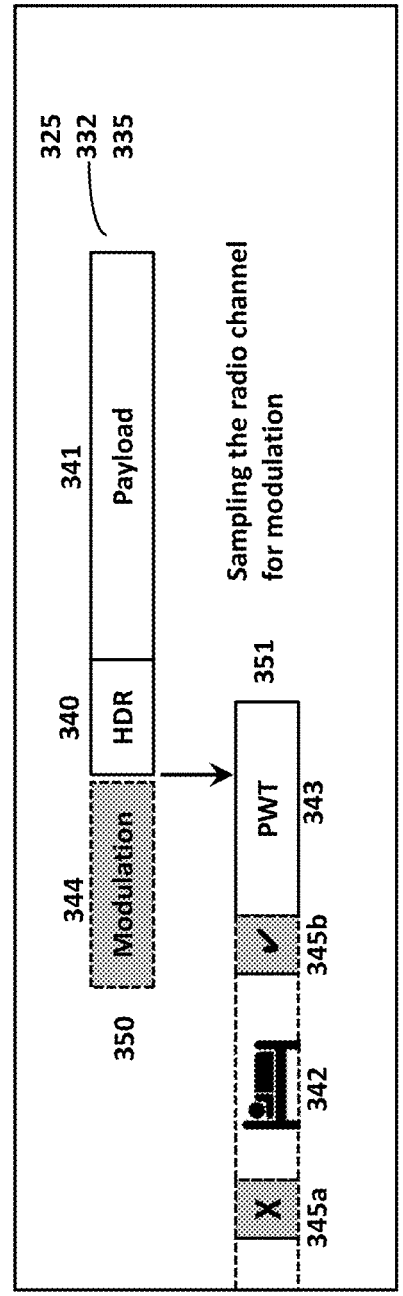
Figure 3D
Figure 3E

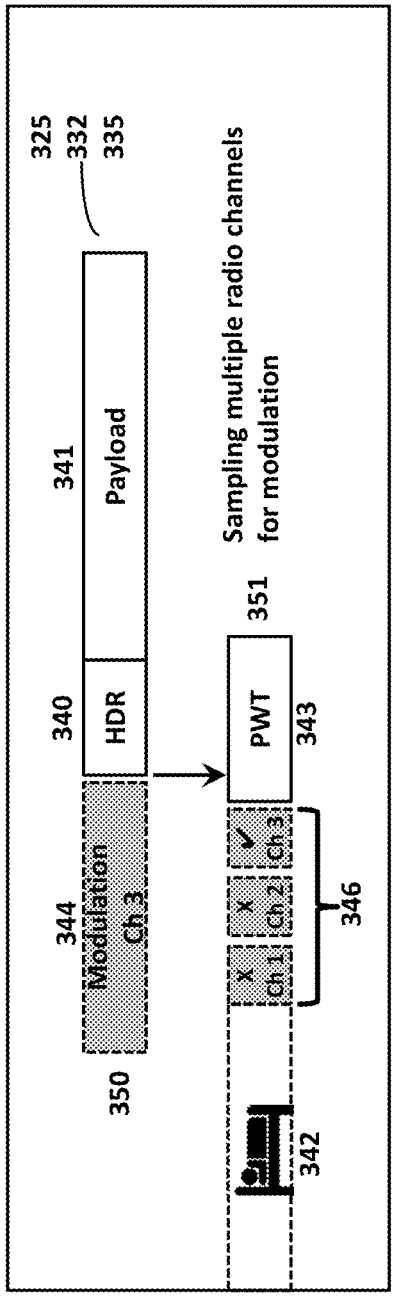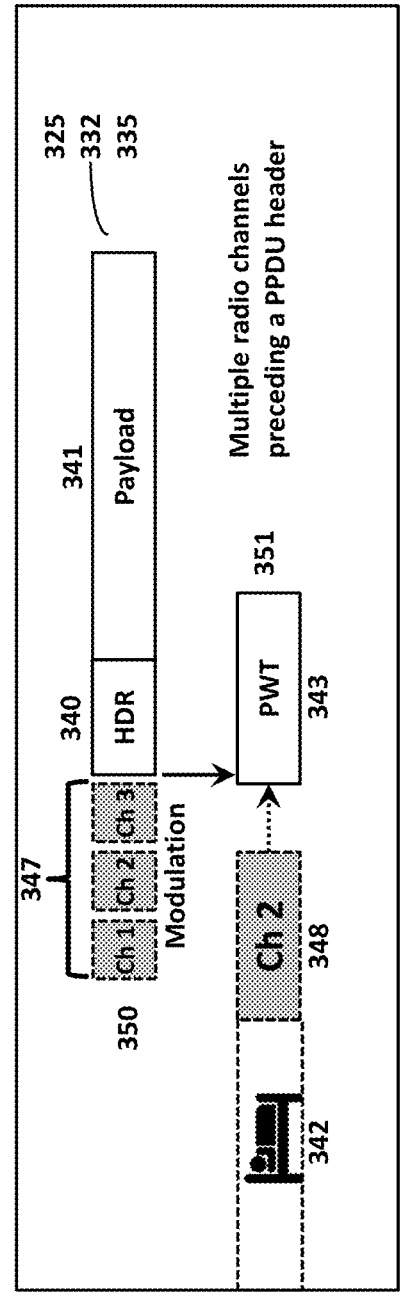

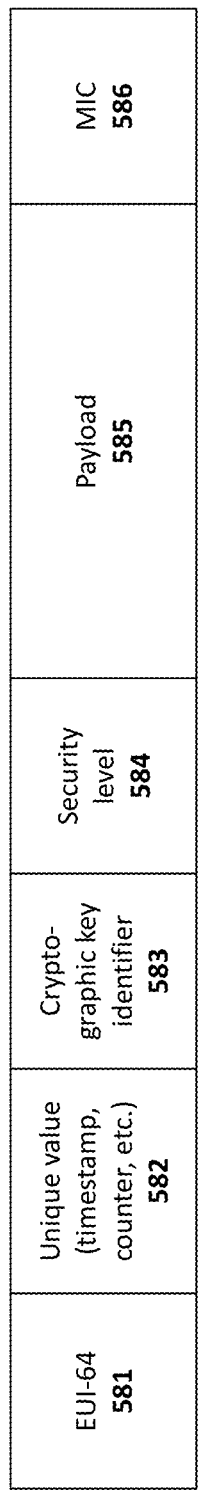

MOBILITY EXTENSIONS TO INDUSTRIAL-STRENGTH WIRELESS SENSOR NETWORKS

RELATED APPLICATIONS

This application is a Continuation of patent application Ser. No. 14/655,031, entitled "Mobility Extensions to Industrial-Strength Wireless Sensor Networks," and filed Jun. 23, 2015, which claims priority to and the benefit of International Patent Application No. PCT/US2013/077677, entitled "Mobility Extensions to Industrial-Strength Wireless Sensor Networks," and filed Dec. 24, 2013, which claims the benefit of and priority to each of U.S. Provisional Application No. 61/848,214, entitled "Mobility Extensions to Industrial-Strength Wireless Sensor Networks," and filed on Dec. 26, 2012 and U.S. Provisional Application No. 61/859,869, entitled "Store and Forward Surrogates," and filed on Jul. 30, 2013, all of which are hereby incorporated by reference in their entirety for all purposes.

BACKGROUND

Industrial wireless sensors and actuators are increasingly being standardized. Two leading standards in the industrial market, namely ISA100.11a-2011 (IEC/PAS 62734, called "ISA100.11a" herein) and WirelessHART™ (IEC 62591, called "WirelessHART" herein) have similar architectures and time-synchronized slotted communication models, with ISA100.11a being more flexible. Both standards are designed for scenarios wherein sensors and actuators utilize low-bandwidth wireless links from fixed locations via a fixed communication infrastructure, in various configurations as the network designer intends and the situation allows.

Both standards—specifically ISA100.11a and WirelessHART—are included herein by reference.

Neither standard specifically addresses mobility. Mobility, as described herein, may be supported in a scenario wherein individual wireless devices move within a network that is mostly stationary, such as an overhead crane in a factory or a data logger arriving at a loading dock. Conversely, mobility may be supported in configurations wherein wireless sensors are mostly stationary, but there is no fixed system to read them. In those and other permutations, devices or collections of devices may store their own data and/or data of their neighbors and occasionally connect to mobile readers that are periodically in range, such as in walk-by, drive-by, or fly-by scenarios. When mobile devices establish temporary connections, the stored data may be transmitted in a burst.

SUMMARY

The present solution, in various embodiments, addresses deficiencies in the prior art by providing systems, methods, and devices that enable industrial wireless sensor network nodes, individually or in clusters, to discover quickly and efficiently wireless neighbors that may come within range periodically and/or infrequently.

A cluster being discovered (CBD) may include one or more wireless devices. A discovering cluster (DC) may include one or more wireless devices. A given cluster may simultaneously act as a CBD and DC. A CBD and/or a DC may be mobile. A CBD may transmit a beacon. The beacon may include information to identify the CBD. The beacon may include clock information. A DC may receive the beacon. Two-way time-synchronized wireless communication may be established between the CBD and the DC. The DC or the CBD may log sensor data as a time series, and may transmit the time series when the communication connection is established.

The two-way time-synchronized communication may involve timeslots, where unicast transmission of a protocol data unit and a corresponding acknowledgement occur within a timeslot. A schedule of timeslots may be designated for a wireless device in a cluster. The timeslot schedule may include a radio channel hopping. The wireless device may be in a low-power non-communicating state during timeslots that are not designated for reception and/or transmission.

A CBD may transmit a beacon containing clock information, and a DC may receive the beacon. A DC or a CBD, as a first cluster, may select a DC or a CBD, as a second cluster, for time synchronized wireless communication. A symmetric key match between the first cluster and the second cluster may be verified. A service level may be established for communication between the first cluster and the second cluster for a period of time, with a corresponding timeslot schedule being designated for such communication. The timeslot schedule may be frequency hopped. A temporary address may be assigned for communication between the first cluster and the second cluster. A cryptographic key update may be transmitted in communication between the first cluster and the second cluster. A return receipt from an addressed entity may be transmitted in communication between the first cluster and the second cluster. Stored and/or time series sensor data may be transmitted in communication between the first cluster and the second cluster. Communication between the first cluster and the second cluster may involve a proxy in the first cluster and/or in the second cluster. The proxy may include a store and forward surrogate. The proxy may include a data aggregator. Data stored in the proxy may be forwarded toward an addressed entity after the connection between the first cluster and the second cluster is terminated or expired.

A CBD may include some combination of: one or more Wireless Sensor Network (WSN) nodes, some of which may be configured as symmetric beaconing devices; one or more asymmetric beaconing devices; a time source. A DC may include some combination of: one or more WSN nodes that may be configured to discover a CBD; a repeater that receives CBD beacons and forwards CBD information to WSN nodes in the DC; a time source. Active scanning, passive scanning, or a combination may be used by a DC to discover a CBD.

A CBD may include one or more asymmetric beaconing elements that may be located within the CBD or in proximity to the CBD. An asymmetric beaconing element may include a higher-power transmitter than is found in a symmetric beaconing element. An asymmetric beaconing element may include a different radio than is found in a symmetric beaconing element. An asymmetric beaconing element may operate at a lower radio frequency than a symmetric beaconing element.

A beacon from a CBD may include some combination of: a network identifier; a cryptographic authentication code; time synchronization fields; a time/frequency schedule of beacons from devices in the CBD. A beacon may be transmitted on a time/frequency schedule or in response to a solicitation. A limited number of radio channels may be used for transmission of beacons and/or solicitations.

A beacon from a CBD or a solicitation from a DC may have an extended header; and the receiver of such beacon may use channel sampling to detect the extended header. A separate PPDU may act as an extended header.

A DC may include one or more repeating elements that may be located within the DC or in proximity to the DC. A repeating element may retain time synchronization with other DC elements, so that it can forward beacon information on a predetermined schedule. A repeating element may include a higher-gain receiver than is found in a symmetric beaconing element, such as an antenna with high gain in the direction of travel. A repeating element may transmit solicitations on behalf of the DC and then forward a response. A repeating element may include a different radio than is found in a WSN node. A repeating element's radio may operate at a lower radio frequency than WSN nodes in the DC.

A CBD scanning for solicitations and/or a DC scanning for beacons may use a multi-channel receiver to scan multiple channels simultaneously, where such a receiver may be comprised of multiple single-channel radios and/or cognitive radio technology. A scanning operation may sample multiple channels in quick succession, and an extended header may be so detected.

A CBD may actively coordinate responses to a solicitation, with responses transmitted by one or more beaconing devices. A fixed latency period, such as 250 ms, may be incorporated into the solicitation response to allow for such coordination, and active scanning devices may go into a sleep state during that latency period. One beaconing device may transmit in response to a solicitation, or several beaconing devices may transmit responses in succession. A solicitation may include a device identifier, which may be a 64-bit MAC address, an assigned alias or number, or a device-generated randomized number.

An explicit or implicit scanning template may indicate a fixed packet wait time that applies when a DC is time-synchronized to a CBD. Such a template may be used to scan for beacons that are transmitted by a CBD on a time and/or radio channel schedule that is configured in the DC. When such a DC loses its connection to a CBD, the DC's clock may begin to drift, and the DC may autonomously extend its packet wait time accordingly. A DC may periodically synchronize its clock to a remote or global time reference, such as through GPS, WWV, or LTE, thereby reducing its clock drift and shortening the necessary packet wait time. The same principles may be applied to a CBD scanning for scheduled solicitations.

A DC may travel in a conveyance, such as a truck. A repeater may be configured to receive beacons with a high-gain antenna in the direction of travel. GPS, WWV, LTE, or other means may be used to retain time synchronization of the DC to a global reference.

Cryptographic authentication of a CBD's beacon by a DC may indicate that the DC has credentials to access the CBD. A key identifier in the beacon may identify a key that the DC may use, or the DC may attempt to authenticate a beacon from a list of candidate keys. The same principle may be applied to solicitations.

A DC's discovery process may increase its duty cycle in response to indicators of device movement. Indicators of movement may include a motion detector, change in radio diagnostics, or RTLS techniques. When stationary, a DC may conduct a baseline scan for routers in the general vicinity.

DCs that move along a consistent route may maintain connections to multiple points simultaneously and/or store a beaconing schedule for a known population of CBDs.

The present solution, in various embodiments, addresses deficiencies in the prior art by providing systems, methods, and devices that enable industrial wireless sensor network nodes, individually or in clusters, to communicate temporarily with one another in mobile configurations. A wireless sensor network may include: a wireless field entity that may be an I/O device or a cluster of devices; a wireless routing entity that may be a routing device or a cluster of devices; with one or both of the wireless field entity and the wireless routing entity being mobile. A beacon, including time synchronization information, may be transmitted by the wireless field entity and/or the wireless routing entity. Communication between the wireless field entity and the wireless routing entity may follow reception of a beacon by the wireless field entity and/or the wireless routing entity, using a schedule of timeslots for a limited period of time. A first symmetric key may be used for cryptographic authentication of a beacon. A second symmetric key, which may be the same as the first symmetric key, may be used for cryptographic authentication of communication between the wireless field entity and the wireless routing entity. An addressed entity may exchange messages with the wireless field entity, via the wireless routing entity. A third symmetric key may be used for cryptographic authentication and/or encryption of messages between the wireless field entity and the addressed entity. The first, second, and third symmetric keys may be stored in the wireless field entity before the beacon is transmitted. In a virtual mobile network configuration, the first and/or second and/or third symmetric key may be designated for use on multiple networks or subnets in support of temporary wireless communication.

A first wireless entity may transmit a beacon containing clock information, and a second wireless entity may receive the beacon. A wireless field entity or a wireless routing entity, as the first wireless entity, may select a wireless field entity or a wireless routing entity, as the second wireless entity, for time synchronized wireless communication. A symmetric key match between the first wireless entity and the second wireless entity may be verified. A service level may be established for communication between the first wireless entity and the second wireless entity for a period of time, with a corresponding timeslot schedule being designated for such communication. The timeslot schedule may be frequency hopped. A temporary address may be assigned for communication between the first wireless entity and the second wireless entity. A cryptographic key update may be transmitted in communication between the first wireless entity and the second wireless entity. A return receipt from an addressed entity may be transmitted in communication between the first wireless entity and the second wireless entity. Stored and/or time series sensor data may be transmitted in communication between the first wireless entity and the second wireless entity. Communication between the first wireless entity and the second wireless entity may involve a proxy in the first wireless entity and/or in the second wireless entity. The proxy may include a store and forward surrogate. The proxy may include a data aggregator. Data stored in the proxy may be forwarded toward an addressed entity after communication between the first cluster and the second cluster is terminated or expired.

A wireless field entity may include a wireless I/O device and may include a sensor and/or actuator. A wireless field entity may include a cluster of wireless devices.

An addressed entity may include a gateway, a system manager, a security manager, a user application, and/or an I/O device.

A wireless routing entity may be a router, a backbone router, and/or a cluster of devices. A wireless routing entity may support temporary connections to one or more wireless field entities for routing of payloads to and from one or more remote entities.

A wireless field entity and/or a wireless routing entity may include a store-and-forward surrogate.

A wireless field entity and/or a wireless routing entity may be mobile and may be conveyed by vehicle, personnel, personal transport, boat, ship, aircraft, robot, or drone.

A connecting entity may select among multiple candidate entities when establishing a temporary communication relationship. A connecting entity and/or a candidate entity may be mobile. For redundancy, multiple candidates may be selected for communication with a connecting entity.

Candidate entity selection may account for candidate capability factors. Candidate capability factors may include duration of available connection. Candidate capability factors may include rate and/or latency of connection to a remote network entity for offered communication services. Offered communication services may include: publication; subscription; client/server; burst transfer. Candidate capability factors may include a message pending from a remote network entity addressed to or routed through the connecting entity. Candidate capability factors may include store-and-forward capability and capacity of a candidate entity. Candidate capability factors may include data aggregation capability and capacity of a candidate entity. Candidate capability factors may include energy capacity of a candidate entity. Candidate capability factors may include radio signal quality of wireless messages received from a candidate entity.

Candidate entity selection may account for configured factors in a connecting entity. Configured factors may include a list of preferred and/or permitted candidate entities. Configured factors may include a list and/or bit map mask of preferred and/or permitted subnets. Configured factors may include key matches between the connecting entity and a candidate entity.

Candidate entity selection may account for a time-stamped history, stored in the connecting entity, of candidate entities that have been used successfully in the past.

A temporary schedule of timeslots may be established for communication between a served entity and an allocating entity. A served entity may request a level of service from an allocating entity for a period of time. An allocating entity may establish a temporary schedule of timeslots when a served entity may transmit messages to and/or receive messages from the allocating entity. A temporary schedule of timeslots may be transmitted from an allocating entity to a served entity, with the schedule transmitted in a representation that may include an index to a shared lookup table. A temporary schedule of timeslots may expire after a time interval. A temporary schedule of timeslots may be terminated by an allocating entity or by a served entity.

An addressed entity may have an address and/or security credentials that is the same on all networks and/or subnets. A unique short address may be assigned to a gateway and/or a system manager, with the short address being the same on multiple networks and/or subnets.

A short address for an addressed entity may be ascertained by a wireless field entity by interrogating a directory service in a wireless routing entity.

A unique short address may be assigned to a wireless field entity, to be used on multiple networks and/or subnets.

A wireless routing entity may assign a temporary short address to a wireless field entity. The temporary short address may be drawn from a set of addresses that are allocated to the wireless routing entity.

A message addressed from a wireless field entity to an addressed entity may be routed to a wireless routing entity that in turn routes the message to the addressed entity.

A message addressed from an addressed entity to a wireless field entity may be routed to a wireless routing entity that in turn routes the message to the wireless field entity.

A message addressed from a wireless field entity to an addressed entity may be routed to an access point that then routes the message to the addressed entity. A fixed and unique graph identifier, applicable to multiple networks and subnets, may be designated to route a message to an access point through a wireless routing entity.

A wireless routing entity may send a message to an addressed entity indicating that a wireless field entity may receive messages through a wireless routing entity. A wireless field entity may provide a wireless routing entity with an address of an addressed entity.

The present solution, in various embodiments, addresses deficiencies in the prior art by providing systems, methods and devices that enable industrial wireless sensor network nodes, individually or in clusters, to transmit and/or receive information and commands from a source to a destination in delay-tolerant network configurations.

Systems and methods described herein include a store-and-forward (S&F) surrogate in a wireless sensor network that stores and subsequently forwards message sets in a delay-tolerant manner.

Interactions between a wireless field entity and an S&F surrogate may include one or more of the steps of: discovery; connection; receipt and processing by the wireless field entity of a return receipt from prior interactions with an S&F surrogate; receipt and processing by the wireless field entity of a configuration message; receipt and processing by the wireless field entity of a management message; receipt and processing by the wireless field entity of a cryptographic key update; receipt and storage by the S&F surrogate of field data; receipt and storage by the S&F surrogate of process data; receipt and storage by the S&F surrogate of wireless field entity diagnostic data; receipt and storage by the S&F surrogate of network diagnostic data; receipt and storage by the S&F surrogate of responses to messages received and processed by the wireless field entity.

A wireless entity may transmit a beacon containing clock information, and a wireless entity may receive the beacon. A wireless field entity or a wireless routing entity, as a first wireless entity, may select a wireless field entity or a wireless routing entity, as a second wireless entity, for time synchronized wireless communication. A symmetric key match between the first wireless entity and the second wireless entity may be verified. A service level may be established for communication between the first wireless entity and the second wireless entity for a period of time, with a corresponding timeslot schedule being designated for such communication. The timeslot schedule may be frequency hopped. A temporary address may be assigned for communication between the first wireless entity and the second wireless entity. A cryptographic key update may be transmitted in communication between the first wireless entity and the second wireless entity.

The connection between the first wireless entity and the second wireless entity may be a connection between a wireless field entity and a wireless routing entity. Before the connection between the wireless field entity and the wireless routing entity is available, an S&F surrogate in the wireless routing entity may store a return receipt and/or other messages from an addressed entity. The return receipt and/or other messages may be forwarded from the S&F surrogate to the wireless field entity when the connection between the wireless field entity and the wireless routing entity becomes available. When the connection between the wireless field entity and the wireless routing entity is available, stored and/or time series sensor data may be transmitted from the wireless field entity to the S&F surrogate in the wireless routing entity. After the connection between the wireless field entity and the wireless routing entity expires or is terminated, the stored and/or time series data from the wireless field entity may be forwarded toward an addressed entity when connectivity from the wireless routing entity toward the addressed entity is available. The wireless routing entity may be mobile, with periodic connectivity to the wireless field entity and periodic connectivity to the addressed entity, but not at the same time.

A host system may include a wireless sensor network access point and/or gateway and/or system manager and/or security manager. Interactions between a host system and an S&F surrogate may include one or more of the steps of: discovery; connection; receipt and storage by the S&F surrogate of a return receipt from a host; receipt and storage by the S&F surrogate of a configuration message; receipt and storage by the S&F surrogate of a management message; receipt and storage by the S&F surrogate of a cryptographic key update; receipt and processing by the host system of field data; receipt and processing by the host system of process data; receipt and processing by the host system of device diagnostic data; receipt and storage by the host system of network diagnostic data; receipt and processing by the host system of field device responses to previously transmitted messages.

An S&F surrogate may allow for changes to network topology by storing and subsequently forwarding message sets that cannot be forwarded at the time of receipt. An S&F surrogate may allow for short connection durations where network latencies do not allow for execution of complete end-to-end interactions. An S&F surrogate may allow for network latencies that are long or mismatched.

S&F surrogates may be daisy-chained, with message sets being forwarded from one S&F surrogate to another.

In one aspect of the present solution, the S&F surrogate may be mobile, conveyed by personnel, personal transport, vehicle, boat, ship, robot, drone, or aircraft. A wireless field element and/or host may be mobile.

An S&F surrogate may perform data aggregation operations. An S&F surrogate may be a trusted intermediary, and trust may be based on credentials that secure interactions with the S&F surrogate. Data aggregation may involve incremental accumulation of time series. Data aggregation may involve concatenating message sets from multiple sources and forwarding them as a block.

An update to a security credential may be delivered to a field device on a delay-tolerant basis through an S&F surrogate.

A cluster of devices may be formed whereby a message set from a first device is stored in a second device's S&F surrogate, and is subsequently forwarded to a third device through a connection between the third device and the second device. PKI credentials may be used to establish trust between the first device and the second device.

An S&F surrogate may be implemented as a store-and-forward layer or sub-layer in a wireless industrial protocol stack and may be present and activated in some devices, configurations, or networks, and absent or deactivated in other devices, configurations, or networks.

Symmetric cryptographic keys may be pre-loaded with cryptographic key identifiers in wireless sensor network devices and matched in conjunction with a mobile connection process.

The present solution, in various embodiments, addresses deficiencies in the prior art by providing systems, methods and devices that enable industrial wireless sensor network nodes, individually or in clusters, to transmit and/or receive information and commands from a source to a destination via a mobile cluster that includes a store-and-forward (S&F) surrogate.

Systems and methods described herein include a store-and-forward (S&F) surrogate in a wireless sensor network that stores and subsequently forwards message sets in a delay-tolerant manner.

A wireless sensor network may include: a wireless field entity that may be an I/O device or a cluster of devices; one or more wireless routing entities, each of which may be a routing device or a cluster of devices; an addressed entity; with the wireless routing entity being mobile. The wireless field entity may be unable, for an extended period of time to establish a communication relationship with the addressed entity. A wireless routing entity may establish a first set of temporary communication relationships with the wireless field entity during the extended period of time. The wireless routing entity may establish a second set of temporary communication relationships with the addressed entity during the extended period of time. The first set of temporary communication relationships and the second set of temporary communication relationships may occur at non-overlapping times. A store-and-forward (S&F) surrogate in a wireless routing entity may provide two-way delayed transmission of messages between the wireless field entity and the addressed entity. The S&F surrogate may support data aggregation.

The mobile wireless routing entity may be conveyed by vehicle, personnel, personal transport, boat, ship, aircraft, robot, or drone.

A wireless routing entity may be a DC or CBD as described above. A beacon, including time synchronization information, may be transmitted by the wireless field entity and/or the wireless routing entity. Communication between the wireless field entity and the wireless routing entity may follow reception of the beacon by the wireless field entity and/or the wireless routing entity, with the communication using a schedule of timeslots for a limited period of time. A first symmetric key may be used for cryptographic authentication of a beacon. A second symmetric key, which may be the same as the first symmetric key, may be used for cryptographic authentication of communication between the wireless field entity and the wireless routing entity. A third symmetric key may be used for cryptographic authentication and/or encryption of messages between the wireless field entity and the addressed entity. The first, second, and third symmetric keys may be stored in the wireless field entity before the beacon is transmitted. In a virtual mobile network configuration, the first and/or second and/or third symmetric key may be designated for use on multiple networks or subnets in support of temporary wireless communication.

A service level may be established for communication between the wireless field entity and a wireless routing entity for a period of time, with a corresponding timeslot schedule being designated for such communication. The timeslot schedule may be frequency hopped. A temporary address may be assigned for communication between the between the wireless field entity and the wireless routing entity. Interactions between the wireless field entity and an S&F surrogate in the wireless router entity may include one or more of the steps of: receipt and processing by the wireless field entity of a return receipt from the addressed entity; receipt and processing by the wireless field entity of a cryptographic key update from an addressed entity; receipt and processing by the wireless field entity of a configuration message from an addressed entity; receipt and processing by the wireless field entity of a management message from an addressed entity; receipt and storage by the S&F surrogate of field data; receipt and storage by the S&F surrogate of process data; receipt and storage by the S&F surrogate of logged and/or time series sensor data; receipt and storage by the S&F surrogate of device diagnostic data; receipt and storage by the S&F surrogate of network diagnostic data; receipt and storage by the S&F surrogate of a response a command received from an addressed entity.

Interactions between the addressed entity and an S&F surrogate in a wireless router entity may include one or more of the steps of: receipt and storage by the S&F surrogate of a return receipt from the addressed entity; receipt and storage by the S&F surrogate of a cryptographic key update from an addressed entity; receipt and storage by the S&F surrogate of a configuration message from an addressed entity; receipt and storage by the S&F surrogate of a management message from an addressed entity; receipt and processing by the addressed entity of field data; receipt and processing by the addressed entity of process data; receipt and processing by the addressed entity of logged and/or time series sensor data; receipt and processing by the addressed entity of device diagnostic data; receipt and processing by the addressed entity of network diagnostic data; receipt and processing by the addressed entity of a response a command received from the addressed entity.

BRIEF DESCRIPTION OF THE DRAWINGS

These and other features and advantages will be more fully understood by the following illustrative description with reference to the appended drawings, in which like elements are labeled with like reference designations and which may not be drawn to scale.

FIG. 3B is a diagram illustrating passive scanning.

FIG. 3C is a diagram illustrating active scanning.

FIG. 3D is a diagram illustrating time-synchronized scanning.

FIG. 3E is a diagram illustrating scanning, with a modulated signal preceding a header.

FIG. 3I is a diagram illustrating scanning on multiple radio channels, with a modulated signal preceding a header.

FIG. 3J is a diagram illustrating scanning, with a modulated signal on a series of channels preceding a header.

FIG. 5K is a diagram illustrating essential data for store-and-forward message sets in support of store-and-forward layer security.

DETAILED DESCRIPTION

Industrial wireless standards, such as ISA100.11a and WirelessHART, are designed to provide reliable and secure connectivity to and from mostly stationary field instruments in rigorous industrial environments. Extensions to such standards could optimally support mobility, without negatively impacting the reliability, security, and energy efficiency that are so essential to their operation in stationary configurations.

In this disclosure, the term "wireless" is used to describe a device with a radio. A wireless device may also have wired functions. For example, wired HART devices may include wireless extensions for remote or enhanced reporting, and such devices are considered "wireless" herein. As another example, a wireless access point with an Ethernet connection to the Internet is considered "wireless" herein.

Device Roles in a Reference Stationary Configuration

Figure 1:
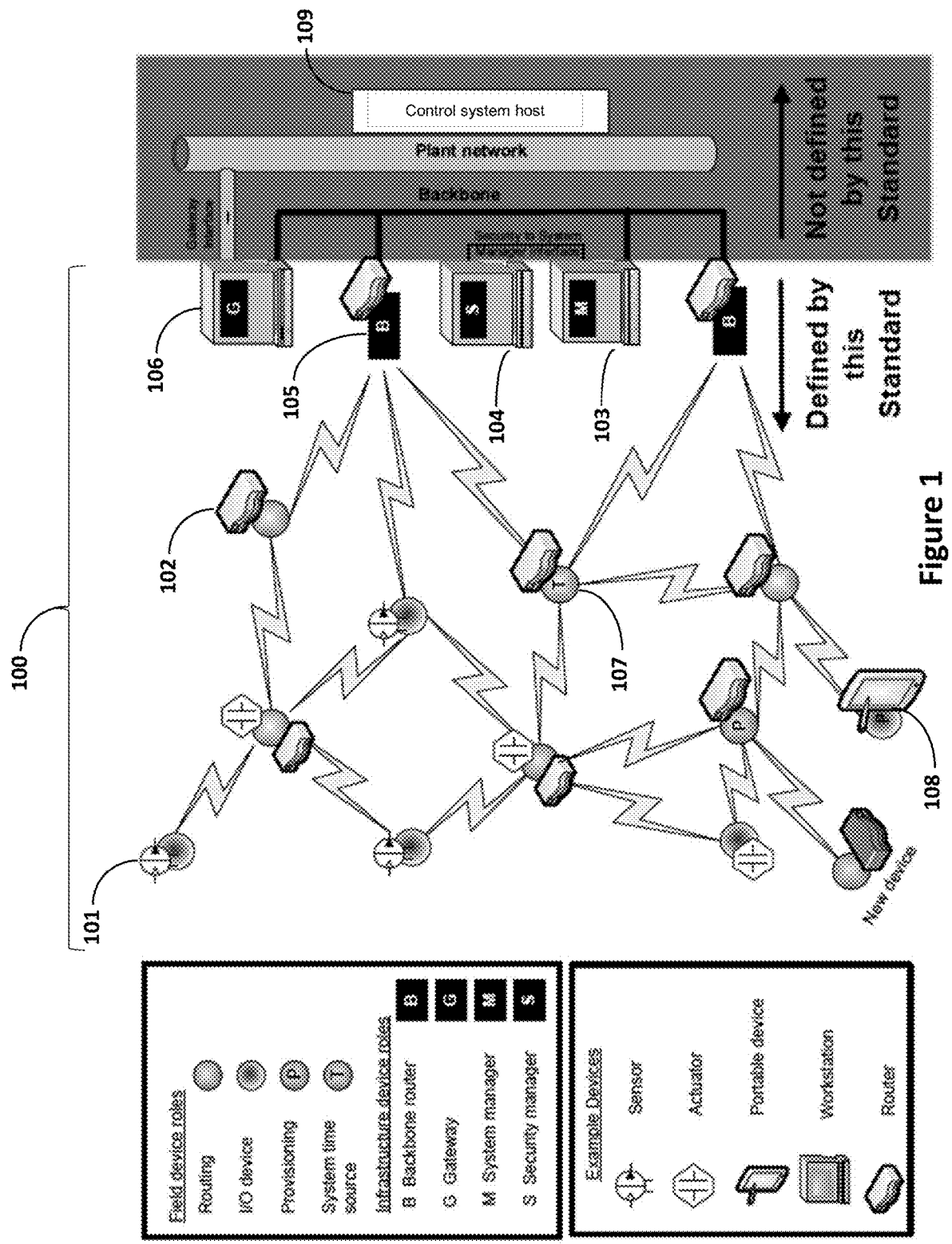
FIG. 1 is a diagram illustrating the major components of a wireless sensor network in a reference stationary configuration.

FIG. 1 duplicates a diagram from the ISA100.11a standard, showing the major components of a wireless sensor network (WSN) (100) in a reference stationary configuration. Functional elements are defined as roles, wherein a given device might fulfill multiple roles. These ISA100.11a roles correspond to similar functionality in other protocols, wherein different nomenclature may be used. Those roles, which are described in ISA100.11a in more detail, comprise:

Input/Output (101). A device with the Input/Output (I/O) (101) role sources (provides) data to and/or or consumes (utilizes) data from other devices. For example, a temperature sensor sources data, and a positioner consumes data. A single device with multiple sensor and/or actuator elements might both source and consume data, such as an actuator that also reports its state. A device filling the I/O (101) role also includes a radio for communication with a WSN (100). An I/O (101) role may be combined with other roles, such as the routing role. In this disclosure, we refer to a device filling the I/O (101) role as an I/O (101) device, with the understanding that the device might simultaneously fill other roles. Primarily, the focus of this disclosure is to describe how an I/O (101) device, individually or within a cluster, may operate while mobile, and/or how an I/O (101) device may interact with mobile devices.

Router (102). A device with a router (102) role can forward messages wirelessly using a sensor networking protocol, and may also provide a temporary wireless connection to the network (100) while a new device is establishing a relationship with the system manager (103) and security manager (104). The router (102) role may be combined with the I/O (101) role, and such I/O (101) devices are also capable of routing messages on behalf of their neighbors. At the time of this writing, most ISA100.11a and WirelessHART I/O (101) devices are capable of also supporting the Router (102) role when so configured.

System Manager (103). The system manager role (103) is a specialized device function that governs the network (100), devices, and communications. A system manager (103) may establish communication relationships when the network (100) forms, and updates communication relationships when the network (100) changes its topology. While the network (100) can run for perhaps hours or even days in the absence of a system manager (103), the design of ISA100.11a and WirelessHART are not intended to enable devices to operate autonomously for an indefinite amount of time in the face of inevitable network topology changes that occur slowly, such as addition or subtraction of network devices or alterations in the radio environment, and neither standard provides a mechanism for I/O (101) devices or routers (102) autonomously to create full-function connections to their neighbors without assistance from a system manager (103).

Security Manager (104). The security manager role (104) is a specialized function that establishes secure sessions between network (100) entities based on shared secrets. In the case of ISA100.11a, messages to and from the security manager (104) are addressed through the system manager (103), but the messages are designed so that no secret information is exposed to the system manager (103) or any other intermediary. That is, the system manager (103) is not trusted. In ISA100.11a, the maximum life of a key is 48.5 days, when the key expires if not replaced by the security manager (104).

Backbone Router (105). A device with the backbone router (105) role, as defined in ISA100.11a, acts as a Layer 3 interface between the wireless network (100) (defined to operate at Layer 2) and a Layer 3 backbone that is modeled by the standard as being IP-based. Essentially, the backbone router (105) role provides connectivity to infrastructure devices though a "backbone", such as Ethernet or a wireless bridge. In other standards or protocols, an "access point" may provide the same general function of providing a backbone connection, although not necessarily at the same level of the stack as in ISA100.11a.

Gateway (106). A device with the gateway (106) role translates messages from the native format of the I/O (101) device (e.g. ISA100.11a or WirelessHART application layers) to another format. The native message might be tunneled through the gateway (106), but in any case secure communication sessions of the industrial protocol terminate at the gateway (106). Gateways (106) may be assumed, architecturally, to be trusted devices, so that once a message is securely delivered from an I/O (101) device to a gateway (106), or vice versa, the message may be assumed by the WSN protocol to be delivered securely and reliably to the message's ultimate destination.

System Time Source (107). Both ISA100.11a and WirelessHART assume a coherent source of time on the network (100). A system time source (107) provides a coherent sense of time that is shared by each device in the network (100). A shared sense of time may be used to timestamp messages and/or events. A shared sense of time may be used to provide a basis for channel-hopped TDMA communications. A shared sense of time sense of time may be used for sequence-of-event reporting. Time may be provided by one or several infrastructure devices, such as backbone routers (105), and may propagate to I/O (100) devices via routers (102). ISA100.11a also allows for scenarios wherein a router (102) or even an I/O device (101) might act as a time source. For example, some routers (102) within the WSN (100) might include a GPS clock that provides a high-quality time reference, and a system manager (104) might reasonably designate such devices as time sources (107) for the WSN (100).

Provisioning (108). A device with the provisioning (108) role is used to "provision" a device from the device's factory state in preparation for the device's operation on a particular network. Provisioning (108) includes providing symmetric join keys to a field device, along with other network-specific information to aid in network discovery. The provisioning (108) operation may include configuration of the device's application, for example calibrating a sensor. In a literal reading of ISA100.11a, one might incorrectly conclude that provisioning (108) is done through an open radio channel. In practice, for improved security, provisioning (108) is accomplished by an out-of-band means, such as a HART modem or a short-range infrared connection. The provisioning (108) device is drawn as a handheld computer with a stylus in FIG. 1, implying that a provisioning device may link to a host through Wi-Fi, cellular, or other means not involving the sensor network per se.

Host (109). A device with the host (109) role includes software that runs a user application. A host (109) may be a control system application. A host (109) may interact with the WSN (100) though a gateway (106) interface, with data translated to another format such as OPC or Modbus. A host (109) may interact with a WSN (100) devices employing data semantics that are similar to that of the WSN (100) application layer. A host (109) may use the WSN (100) to convey messages to I/O devices (101) using application semantics that are specific to that I/O device (101), such as by tunneling or proxy methodologies.

The logical roles in FIG. 1—namely I/O (101), router (102), system manager (103), security manager (104), backbone router (105), gateway (106), system time source (107), provisioning device (108), and host (109)—can be, and often are, combined in actual devices. For example, the gateway (106), system manager (103), and security manager (104) roles are may be combined into one device, which may be marketed as a "gateway". Such a "gateway" may also include a WSN radio link for direct wireless communication with a WSN by incorporating a backbone router (105) role, and a system time source (107) role as well, all in a single infrastructure device. As another example, the I/O role (101) and router role (102) are may be supported and active in a wireless field device.

In WirelessHART, analogs of the gateway (106), system manager (103), and security manager (104) roles are modeled as co-existing in a single device that may be marketed as a "gateway".

The backbone router (105) function is covered by an "access point", which is modeled as an extension of the network's single gateway.

Application scenarios for mobility may include:

Field devices moving between mostly stationary networks. One or more mobile field device (101, 102) may move between networks, such as from one facility to another. For example, a wireless data logger may be configured for operation at one location in a first network (100), collect sensor data while in transit, and then report sensor data through a second remote wireless network (100) when the device (101, 102) arrives at a loading dock. The wireless data logger may accumulate substantial data that may need to be transferred quickly during a potentially brief period of time when the data logger is periodically connected to a network.

Field devices moving within a mostly stationary network. One or more mobile field device (101, 102) may move within a network (100). For example, a mobile worker may move from one building to another, where the two buildings may be configured as different subnets within a single network.

Field devices moving within a mostly stationary subnet. One or more mobile field device (101, 102) may move within a network's (100) subnet. For example, an overhead crane may regularly move from point to point within a building, where the building is covered by a single subnet. The mobile field device (101, 102) may periodically report data to a gateway (106), but from locations within a subnet that may vary from one report to the next. A similar scenario may apply to mobile workers carrying wireless biometric or environmental sensors. Subnets may be configured as topologically separated collections of devices, such as in different buildings within a facility. In radio-based configurations, the physical borders of a subnet might not be very distinct. A subnet may be defined as described in the ISA100.11a standard or in a similar manner, enabling multiple backbone routers (105) to behave as one subnet, thereby eliminating troublesome edge conditions.

Mobile network connection points. One or more device implementing a router role (102) or backbone router role (105), may be mobile, and may provide a temporary connection point for one or more stationary or mobile field device (101, 102) to exchange messages periodically with a WSN (100).

Reference Device Life Cycle

Figure 2A:
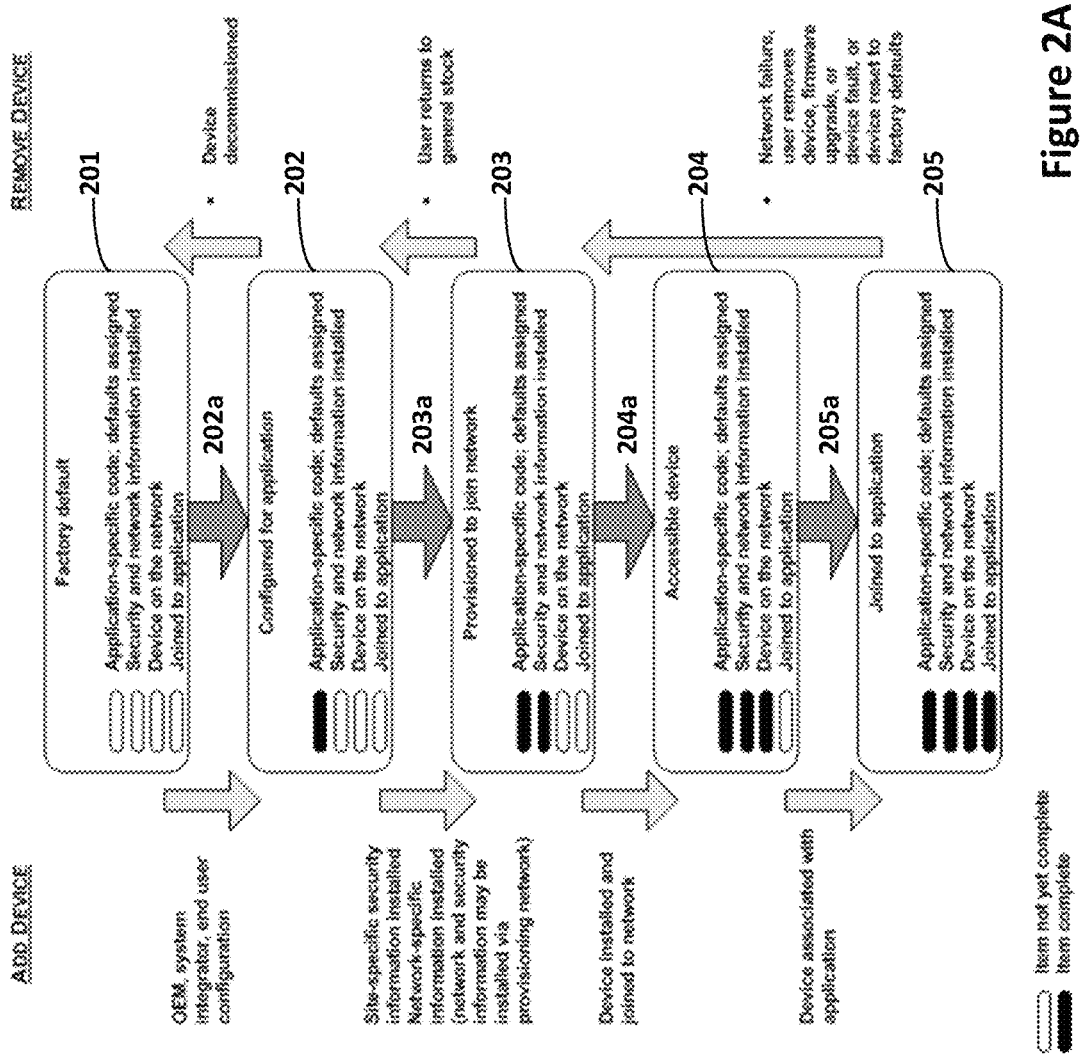
FIG. 2A is a diagram illustrating the phases and states of an I/O device as it passes through a reference device life cycle.

FIG. 2A duplicates a diagram from the ISA100.11a standard and shows phases and states of an I/O (101) device as it passes through a device life cycle. Other protocols may have somewhat different semantics, but generally the flow may be as shown.

Five distinct phases are identified:

Factory default (201). An I/O (101) device may be considered non-configured if it has not been configured or commissioned with any application- or network-specific information. A non-configured device may be shipped from a manufacturer or may enter a non-configured state as a result of decommissioning.

Configured for application (202). An I/O (101) device may be considered configured for an application when it has received its own application-specific programming and when all appropriate application-layer defaults have been applied. An I/O (101) device configured for application may be shipped from the manufacturer or may be supplied by a systems integrator or other value-added reseller, already configured for the intended application.

Provisioned to join network (203). An I/O (101) device may be provisioned (203) to join the network (100) when the I/O (101) device has obtained appropriate security credentials and other network-specific information. An I/O (101) device may be considered provisioned (203) when the I/O (101) device has been prepared to discover and connect to a network (100). The provisioning (203) procedure may be accomplished at the user site using a wired interface, such as a HART modem, or an infrared back channel Accessible device (204). An I/O device (101) may be considered accessible (or joined) (204) when the I/O device (101) has joined the network (100) and has been authenticated by the security manager (104) via the system manager (103). An accessible device may have the credentials and/or contracts (reserved network resources) to communicate with the system manager (103), primarily so that the device's (101) credentials and communications can be managed.

Not indicated in FIG. 2A, the transition to an accessible device (204) may actually occur in two phases, as in ISA100.11a. In a first phase, the I/O device (101) has been authenticated and is connected to the network (100) through a temporary radio link with limited capacity. The I/O device (101) may then spend some time, for example approximately a minute, surveying and evaluating candidate neighbors for communication, and then report a list of candidates to the system manager (103). Based on this information, the system manager (103) may configure the I/O device (101) with a more optimal connection to the network (100), allowing for more deterministic performance, and may also configure the I/O device (101) to operate as a router (102).

Joined to application (205). A device (101) that is joined to an application (205) may have the security credentials and contracts to exchange application-layer information with a gateway (106) or peer device (101).

The illustrative life cycle flow in FIG. 2A may occur in a different order. The configuration step (202) may be completed in conjunction with provisioning (203), such as through a HART modem, or after provisioning (203) through the wireless link after security credentials are established. Security credentials, such as involving PKI, may be installed in the factory. Even allowing for such variations, ISA100.11a and WirelessHART are generally optimized for applications wherein a device (101, 102) does not need to join the network quickly and spends very extended periods of time in the Joined to application (205) state, with both the device (101, 102) and the network (100) being mostly stationary. This disclosure describes impediments that arise when some fundamental life cycle assumptions are violated in mobile applications, along with a description of strategies that may be employed to overcome said impediments.

Figure 2B:
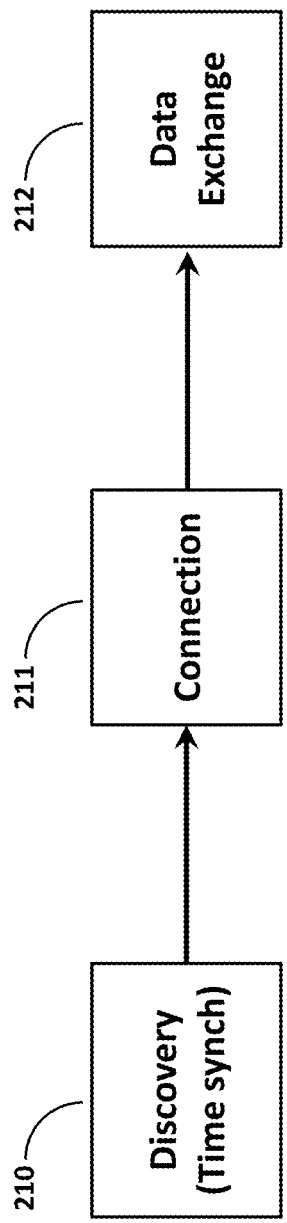
FIG. 2B is a diagram illustrating steps for a mobile communication scenario in an industrial wireless sensor network.

FIG. 2B shows steps that may be involved in a mobile communication scenario in an industrial wireless sensor network (100). During Discovery (210), devices or clusters of devices ascertain that they are in wireless range of each other, and have or obtain enough information to establish a WSN connection. Time synchronization, when necessary, may occur during Discovery (210). During Connection (211), devices or clusters of devices confirm and/or establish communication and/or security relationships that can be used for data exchange. During Data Exchange (212), information is exchanged using those communication and/or security relationships.

In further details of Step 210, a cluster being discovered (CBC) (302) may transmit a beacon (325, 335) containing clock information, and a discovering cluster (DC) (301) may receive the beacon (325, 335). The DC (301) and/or the CBD (302) may be mobile. Active scanning (FIG. 3B) and/or passive scanning (3C) may be used for cluster discovery. A DC (301) may include one or more repeating elements (305). A CBD (302) may include one or more symmetric beaconing elements (304) and/or asymmetric beaconing elements (306).

In further details of Step 211, communication between a wireless field entity (401) and a wireless routing entity (402) may be established for a period of time, based on a temporary timeslot schedule (422). The communication may be authenticated and/or encrypted using symmetric keys (420k, 422k, 424k, 410k) that exist in the wireless field entity (401) prior to discovery (210). Candidate selection (436) may account for candidate capability factors (434) and/or configuration factors (435). Service level resources (434) may be temporarily allocated to meet service level (450) requirements. Addresses may be allocated and/or communicated (FIG. 4E).

In further details of Step 212, a store and forward (S&F) surrogate (542) in an S&F routing entity (502) may store, and subsequently forward, stored data addressed from a field entity (501) to a host system (503). Stored data may reflect the current state of a process. Stored data may reflect the previous state of a process, stored in a cluster (301, 302), which may be reported as time-stamped elements or time series. A host system (503) may respond to reception of stored data with a return receipt (524) on a delay tolerant basis through an S&F routing entity (502).

Figure 2C:
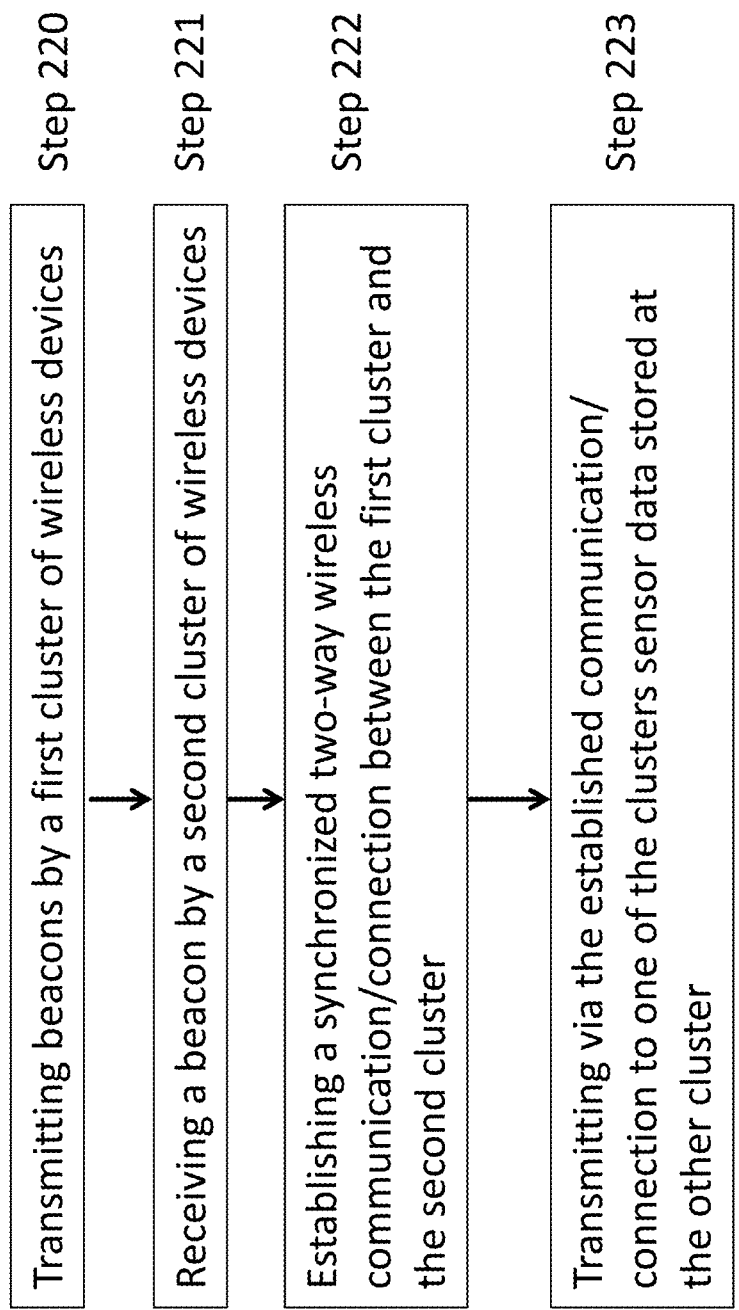
FIG. 2C is a diagram illustrating steps that may be involved in a mobile process involving discovery.

FIG. 2C shows steps that may be involved in discovery (210), connection (211), and data exchange (212) in an industrial wireless sensor network (100). Beacons may be transmitted by a first cluster of wireless devices (220). A beacon from the first cluster may be received and processed by a second cluster of wireless devices (221). A synchronized two-way communication/connection may be established between the first cluster and the second cluster (222). Via the established communication/connection, data stored in one cluster may be transmitted to the other cluster (223).

In further details of Step 220, a CBD (302) may transmit a beacon (325, 335) containing clock information. The beacon (325, 335) may be transmitted in response to a solicitation (332). The beacon may be transmitted by a symmetric beaconing device (304) or by an asymmetric beaconing device (306).

In further details of Step 221, a DC (301) may receive and process a beacon (325, 335) and subsequently engage in time-synchronized communication with the CBD (302). The beacon (325, 335) may be received by a beacon repeater (305) that may forward CBD information (338) to WSN nodes (303) in the DC (301). The DC (301) may utilize channel sampling (FIG. 3E, 3I, 3J) to detect modulation (344, 347) preceding the beacon (325, 335). The DC's (301) scan for beacons may involve multiple radio channels (FIGS. 3G, 3H, 3I, 3J). Synchronous scanning by the DC (301) may account for clock drift (FIG. 3L).

In further details of Step 222, communication between a wireless field entity (401) and a wireless routing entity (402) may be established for a period of time, based on a temporary timeslot schedule (422). The communication may be authenticated and/or encrypted using symmetric keys (420k, 422k, 424k, 410k) that exist in the a wireless field entity (401) prior to discovery (210). Candidate selection (436) may account for candidate capability factors (434) and/or configuration factors (435). Service level resources (454) may be temporarily allocated to meet service level (450) requirements.

In further details of Step 223, a store and forward (S&F) surrogate (542) in an S&F routing entity (502) may store, and subsequently forward, stored data addressed from a field entity (501) to a host system (503). Stored data may reflect the current state of a process. Stored data may reflect the previous state of a process, stored in a cluster (301, 302), which may be reported as time-stamped elements or time series. A host system (503) may respond to reception of stored data with a return receipt (524) on a delay tolerant basis through an S&F routing entity.

Figure 2D:
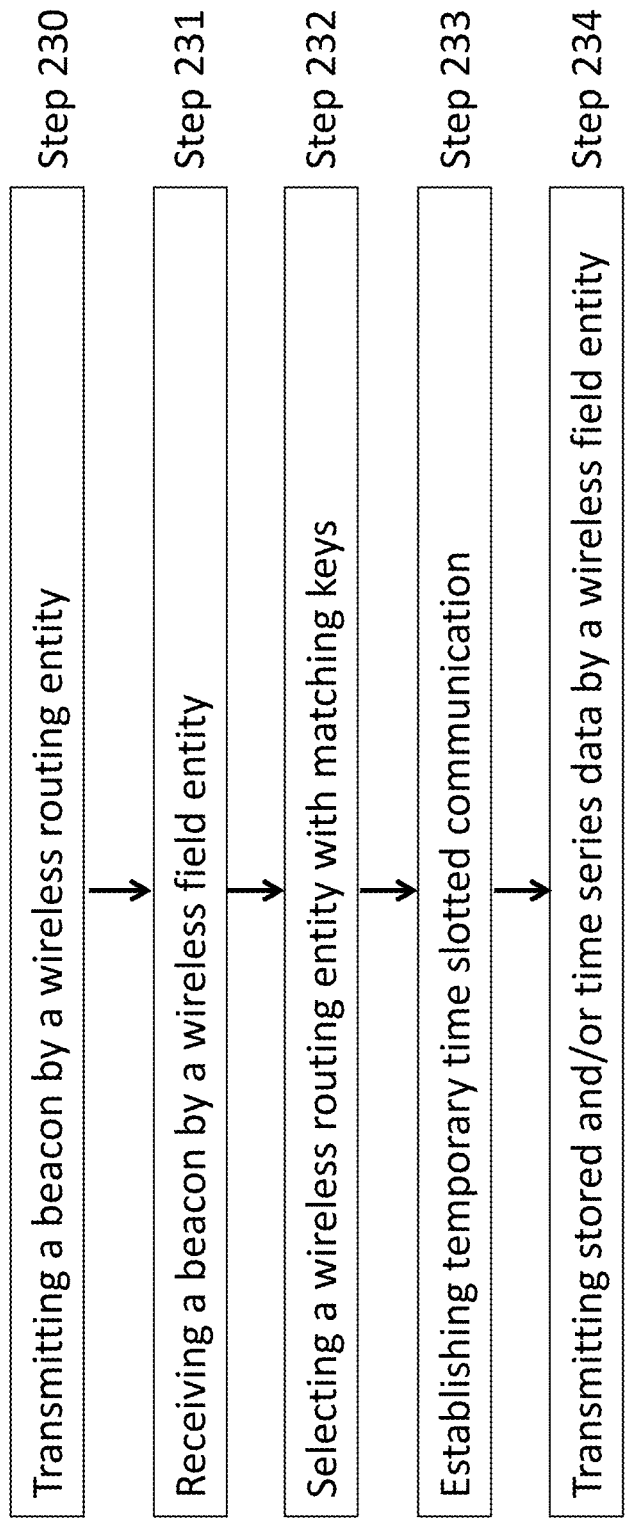
FIG. 2D is a diagram illustrating steps that may be involved in discovery, connection, and data exchange in an industrial wireless network.

FIG. 2D shows steps that may be involved in discovery (210), connection (211), and data exchange (212) in an industrial wireless network wherein a wireless field entity (401) interacts with a wireless routing entity (402) that offers routing services to an addressed entity (403). A wireless routing entity (402) transmits a beacon (325, 335) (Step 230). The beacon (325, 335) is received and processed by a wireless field entity (401) (Step 231). The wireless field entity (401) may select a wireless routing entity (402) for communication after validating a cryptographic key match (Step 232). Temporary time slotted communication may be established between the wireless field entity (401) and the wireless routing entity (402) (Step 233). Stored and/or time series data may be transmitted from the wireless field entity (401) to the wireless routing entity (402) (Step 234).

In further details of Step 230, the wireless routing entity (402) may be configured to transmit (Step 230) a beacon (325, 335) indicating that routing services are available through the wireless routing entity (402). The beacon (325, 335) may include an indication of candidate capability factors (434) available through the wireless routing entity (402), for example the duration of service (434*a*) for a temporary connection. In some implementations, a beacon (325, 335) may be transmitted by the wireless field entity (401).

In further details of Steps 231, 232 following reception of a beacon (325, 335) from one or more candidates (431), the wireless field entity (401) may select (436) one or more wireless routing entities (402) for communication with one or more addressed entities (403) through the wireless routing entities (402). Selection (436) of a wireless routing entity (402) may account for candidate capability factors (434) and/or configuration factors (435), especially key matches (435*d*). In some implementations, selection (436) may be determined by the wireless routing entity (402), for example in a configuration where the wireless routing entity (402) is a mobile device and the wireless field entity (401) is a remote cluster (602).

In further details of Step 233, a service level may be established for a temporary connection between the wireless field entity (401) and a wireless routing entity (402). The service level may be supported through a timeslot schedule. Service level resources (454) may be temporarily allocated to meet service level (450) requirements. Address resolution (FIG. 4E) may be necessary in some configurations, or addresses may be fixed.

In further details of Step 234, an addressed entity (403) may be a security manager (104) that may provide a key update to the wireless field entity (401). An addressed entity may be a gateway (106) or host application that may transmit to the wireless field entity (401) a return receipt (524, 513) of data that was previously received from the wireless field entity (401). The return receipt (524, 513) may include a timestamp of the most recently received data. The wireless field entity (401) may use information in the return receipt (524, 514) as an indication to elide previously transmitted data from subsequent transmissions. The wireless field entity (401) may delete such elided data from the wireless field entity (401) or may archive such elided data on the wireless field entity (401). The wireless field entity (401) may transmit stored and/or time series data through the wireless routing entity (402) to an addressed entity (403). If duration of service (450*a*) is constrained, data may be transmitted in priority order, giving differential priority to different classes of data, such as most recent data first, then time-stamped exception data such as stateful alarms or stateless events, then a limited sample of time series data (e.g., data per hour when data per minute is logged), then data at full sample rate (e.g., each minute or each second). An addressed entity (403) may receive that data and, if duration of service (450*a*) allows, acknowledge receipt of the data with a return receipt (524, 514).

Figure 2E:
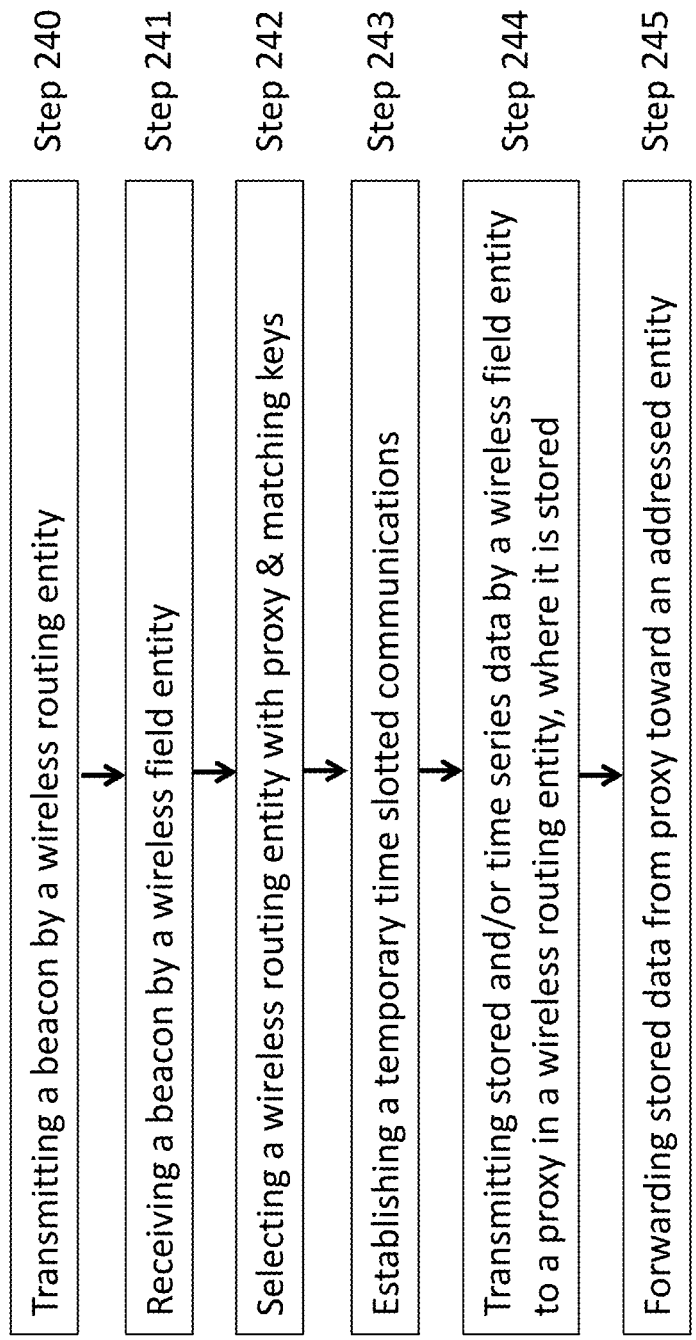
FIG. 2E is a diagram illustrating steps that may be involved in discovery, connection, and data exchange in an industrial wireless network involving a proxy.

FIG. 2E shows steps that may be involved in discovery (210), connection (211), and data exchange (212) in an industrial wireless network wherein a wireless field entity (401) interacts with a wireless routing entity (402) that offers proxy services. Proxy services, such as store-and-forward proxy services or data aggregation, enable data to be stored by the wireless routing entity (402) in the absence of a connection toward a wireless sensor network (100), and subsequently forwarded by the wireless routing entity (402) when a connection toward the wireless sensor network (100) is established at a later time. For example, a wireless routing entity (402) may be mounted on a vehicle that is periodically connected to the network, and offers proxy services when it is not connected. Proxy services in a wireless routing entity (402) may include a store-and-forward surrogate (542, 450*g*) and/or support for data aggregation (450*h*). A wireless routing entity (402) may transmit a beacon (325, 335) (Step 240). The beacon (325, 335) may be received and processed by a wireless field entity (401) (Step 241). The wireless field entity (401) may select a wireless routing entity (402) for communication after establishing that proxy services are offered and validating a cryptographic key match (Step 242). Temporary time slotted communication may be established between the wireless field entity (401) and the wireless routing entity (402) (Step 243). Stored and/or time series data may be transmitted from the wireless field entity (401) to the wireless routing entity (402), where the data is stored by the proxy for later transmission (Step 244). Subsequently, the stored data may be forwarded from the proxy toward an addressed entity (403) (Step 245).

In further details of Step 240, the wireless routing entity (402) may be configured to transmit a beacon (325, 335). The beacon (325, 335) may include an indication of capability factors (434) available through the wireless routing entity (402), for example the store-and-forward capacity (450*g*) and/or data aggregation capacity (450*h*). In some implementations, a beacon (325, 335) may be transmitted by the wireless field entity (401).

In further details of Steps 241, 242 following reception of a beacon (325, 335) from one or more candidates (431), a wireless field entity (401) may select (436) one or more wireless routing entities (402) for communication via proxy with one or more addressed entities (403) through the wireless routing entities (402). Selection (436) of a wireless routing entity (402) may account for candidate capability factors (434) and/or configuration factors (435), especially key matches (435*d*) and proxy support (434*g*, 434*h*). In some implementations, selection (436) may be determined by the wireless routing entity (402), for example in a configuration where the wireless routing entity (402) is a mobile device and the wireless field entity (401) is a remote cluster (602).

In further details of Step 243, a service level may be established for a temporary connection between the wireless field entity (401) and a wireless routing entity (402). The service level may be supported through timeslot schedule. Service level resources (454) may be temporarily allocated to meet service level (450) requirements. Address resolution (FIG. 4E) may be necessary in some configurations, or addresses may be fixed.

In further details of Step 244, an addressed entity (403) may be a security manager (104) that may provide a key update that is conveyed to the wireless field entity (401) via a proxy in the wireless routing entity (402). An addressed entity may be a gateway (106) or host application that may transmit a return receipt (524, 513) to the wireless field entity (401) via a proxy in the wireless routing entity (402). The return receipt (524, 513) may indicate data that was previously received from the wireless field entity (401). The return receipt (524, 513) may include a timestamp of the most recently received data. The wireless field entity (401) may use information in the return receipt (524, 514) as an indication to elide previously transmitted data from subsequent transmissions. The wireless field entity (401) may delete such elided data from the wireless field entity (401) or may archive such elided data on the wireless field entity (401). The wireless field entity (401) may transmit stored and/or time series data to a proxy in the wireless routing entity (402), designating an addressed entity (403) as the data's destination. Stored and/or time series data may be buffered in the proxy and subsequently forwarded. If duration of service (450a) is constrained, data may be transmitted to the proxy in priority order, giving differential priority to different classes of data, such as most recent data first, then time-stamped exception data such as stateful alarms or stateless events, then a limited sample of time series data (e.g., data per hour when data per minute is logged), then data at full sample rate (e.g., each minute or each second). Connectivity between the wireless field entity (401) and the wireless routing entity (402) may expire or be terminated before data in the proxy can be forwarded toward the addressed entity (403).

In further details of Step 245, data may be stored in a proxy for an extended period of time, until it becomes possible to forward data in the proxy toward an addressed entity (403). Forwarding of proxy data may commence when a mobile wireless routing entity (402) moves into radio range of a WSN (100) that includes a connection to an addressed entity (403).

Figure 2F:
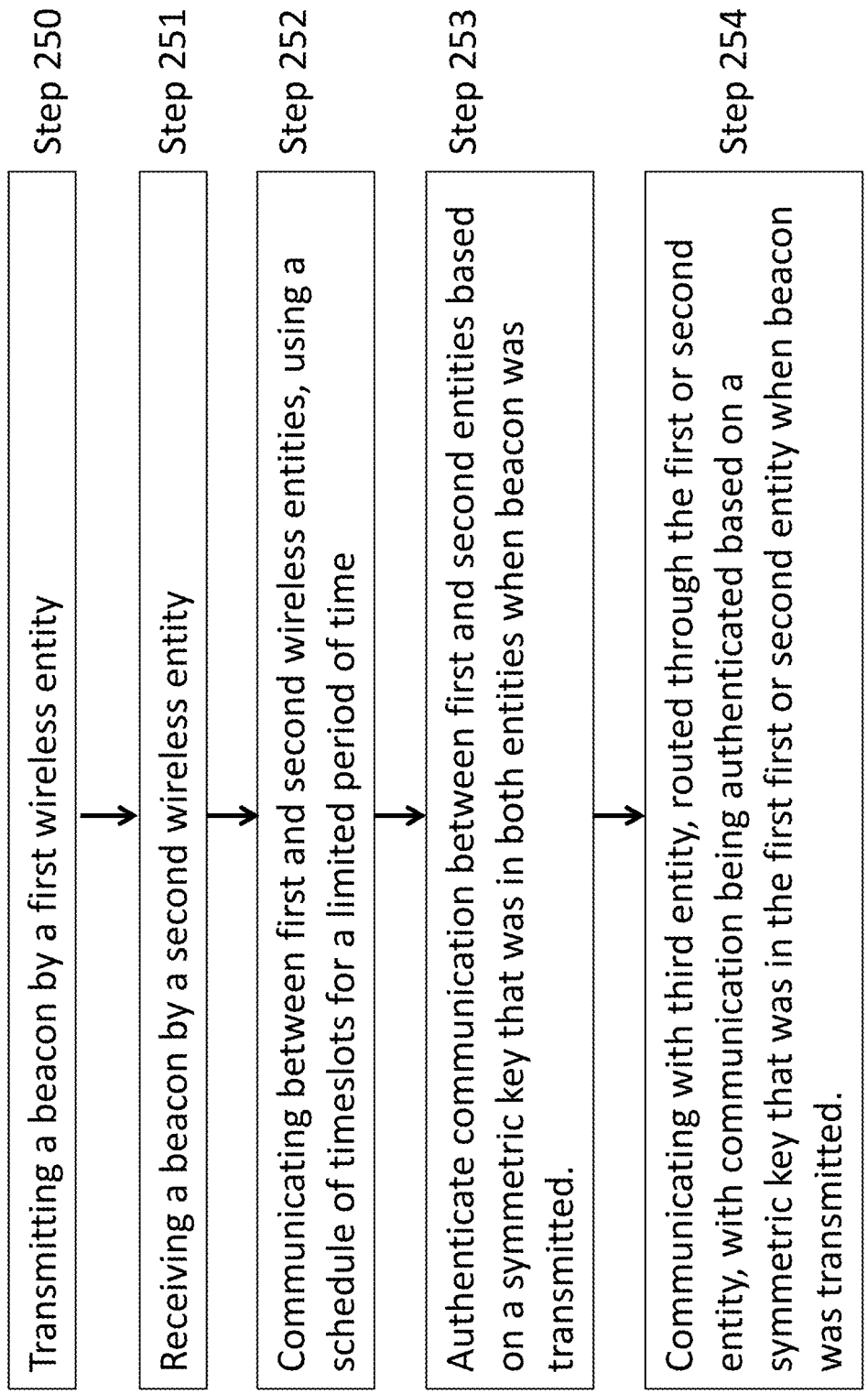
FIG. 2F is a diagram illustrating steps that may be involved in discovery, connection, and data exchange in an industrial wireless network involving shared symmetric keys.

FIG. 2F shows steps that may be involved in discovery (210), connection (211), and data exchange (212) in an industrial wireless sensor network (100). In Step 250 a beacon, including time synchronization information, may be transmitted by a wireless field entity and/or a wireless routing entity. In Step 251, the beacon may be received by a wireless field entity and/or a wireless routing entity. In Step 252, communication between the wireless field entity and the wireless routing entity may follow reception of a beacon by the wireless field entity and/or the wireless routing entity, using a schedule of timeslots for a limited period of time. In Step 253, communication between the first wireless entity and the second wireless entity may be authenticated based on a symmetric key that was in both entities when the beacon was transmitted. In Step 254, communication with a third entity, routed through the first entity or the second entity, is authenticated using a symmetric key that was in the first entity or second entity when the beacon was transmitted.

The wireless sensor network may include: a wireless field entity that may be an I/O device or a cluster of devices; a wireless routing entity that may be a routing device or a cluster of devices; with one or both of the wireless field entity and the wireless routing entity being mobile.

In further details of Step 250, the first wireless entity may be configured to transmit a beacon (325, 335). The beacon (325, 335) may include an indication of capability factors (434) available through the first wireless entity (402), for example the store-and-forward capacity (434g) and/or data aggregation capacity (434h). In some implementations, a beacon (325, 335) may be transmitted by a wireless field entity (401). In some implementations, a beacon (325, 335) may be transmitted by a wireless routing entity (402).

In further details of Step 251, following reception of a beacon (325, 335) from one or more candidates (431), the second wireless entity may select (436) one or more wireless entities for communication. Selection (436) of a wireless routing entity (402) may account for candidate capability factors (434) and/or configuration factors (435), especially key matches (435d).

In further details of Step 252, a temporary communication relationship may be established between the first wireless entity and the second wireless entity, with the first or second wireless entity acting as a wireless routing entity (402) and the other wireless entity acting as a wireless field entity (401). The wireless field entity (401) may engage in two-way communication with an addressed entity (403) via the wireless routing entity (402). The wireless routing entity (402) may include a store and forward surrogate (542) in support of delay tolerant communications.

In further details of Step 253, a first symmetric key may be used for cryptographic authentication of a beacon (225, 235). A second symmetric key, which may be the same as the first symmetric key, may be used for cryptographic authentication of communication between the wireless field entity (401) and the wireless routing entity (402). The first and second symmetric keys may be stored in the wireless field entity (401) and the wireless routing entity (402) when the beacon is transmitted in Step 250.

In further details of Step 254, the addressed entity (403) may exchange messages with the wireless field entity (401), via the wireless routing entity (402). A third symmetric key may be used for cryptographic authentication and/or encryption of messages between the wireless field entity (401) and the addressed entity (403). The third symmetric key may be stored in the wireless field entity before the beacon is transmitted in Step 250. In a virtual mobile network configuration, the first and/or second and/or third symmetric key may be designated for use on multiple networks or subnets in support of temporary wireless connections.

Figure 2G:
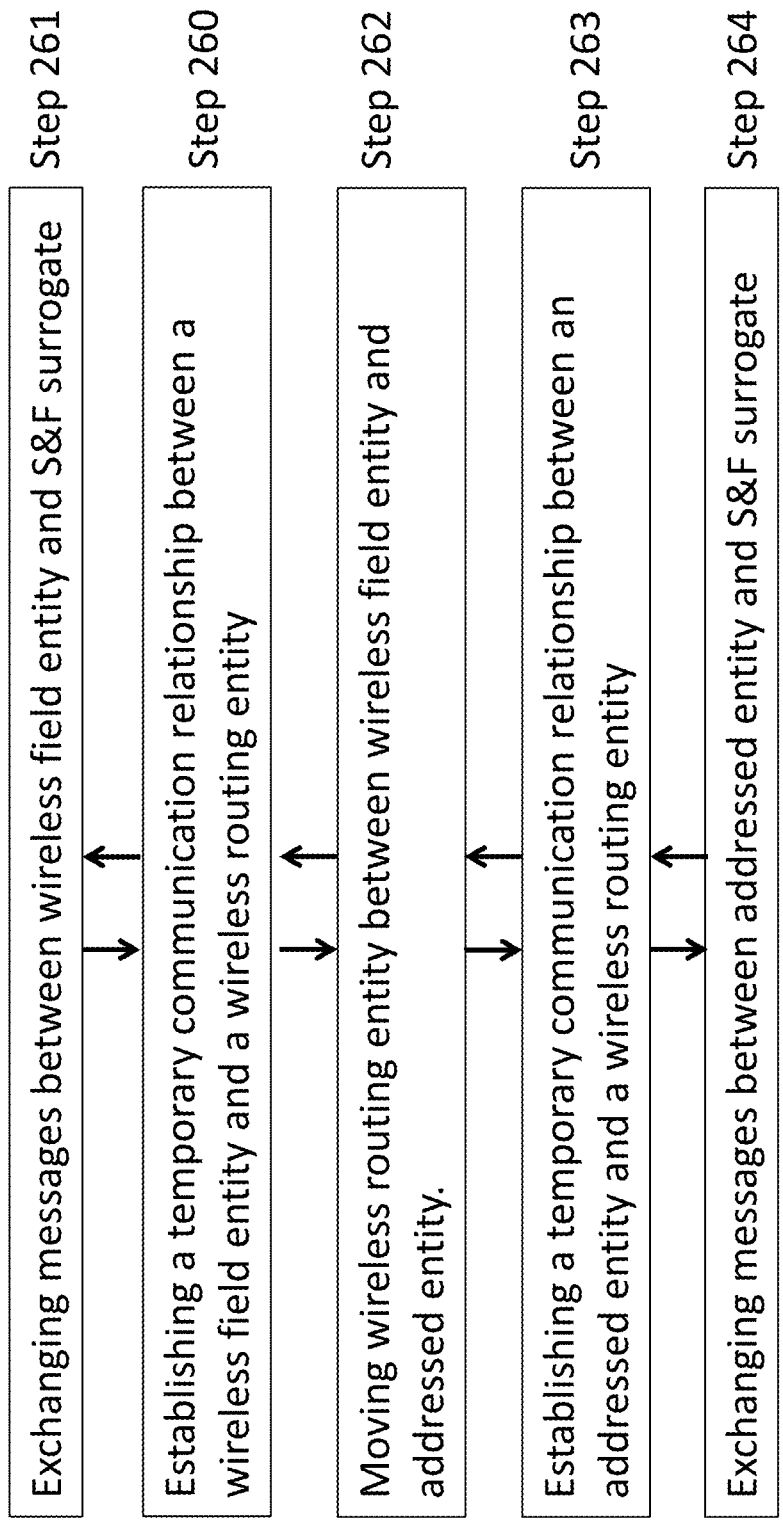
FIG. 2G is a diagram illustrating steps that may be involved in data exchange in an industrial wireless network involving a store and forward surrogate.

FIG. 2G shows steps that may be involved in discovery (210), connection (211), and data exchange (212) in an industrial wireless network wherein a wireless field entity (401) and one or more addressed entities (403) interact with a mobile wireless routing entity (402) that offers time-delayed store and forward (S&F) surrogate (542, 450g) services. In Step 260, a temporary communication relationship (422) may be established between a wireless field entity (401) and the mobile wireless routing entity (402). In Step 261, data may be exchanged between the wireless field entity (401) and an S&F surrogate (542) in the mobile wireless routing entity (402). In Step 262, the mobile wireless routing entity (402) may move one location to another, whereby connectivity is lost with the wireless field entity (401) but connectivity may be established with the addressed entity (403). In Step 263, a temporary communication relationship (422) may be established between an addressed entity (401) and the mobile wireless routing entity (402). In Step 264, data may be exchanged between the addressed entity (403) and an S&F surrogate (542) in the mobile wireless routing entity (402).

In further details of Step 260 the wireless routing entity (402) may be a DC (301) or CBD (302). A beacon (325, 335), including time synchronization information, may be transmitted by the wireless field entity (401) and/or the wireless routing entity (402). Communication between the wireless field entity (401) and the wireless routing entity (402) may use a schedule of timeslots (455) to provide a service level (450) for a limited period of time.

In further details of Step 261, interactions between the wireless field entity (401) and an S&F surrogate (542) in the wireless router entity (402) may include one or more of the steps of: receipt and processing by the wireless field entity (401) of a return receipt from the addressed entity (403); receipt and processing by the wireless field entity (401) of a cryptographic key update from an addressed entity (403); receipt and processing by the wireless field entity (401) of a configuration message from an addressed entity (403); receipt and processing by the wireless field entity (401) of a management message from an addressed entity (403); receipt and storage by the S&F surrogate (542) of field data; receipt and storage by the S&F surrogate (542) of process data; receipt and storage by the S&F surrogate (542) of logged and/or time series sensor data; receipt and storage by the S&F surrogate (542) of device diagnostic data; receipt and storage by the S&F surrogate of network diagnostic data; receipt and storage by the S&F surrogate (542) of a response to a command received from an addressed entity (403).

In further details of Step 262, the mobile wireless routing entity may be conveyed by vehicle, personnel, personal transport, boat, ship, aircraft, robot, or drone. Two-way arrows in FIG. 2G indicate that the mobile wireless routing entity (402) may have multiple opportunities to form temporary communication relationships with the wireless field entity (401) and the addressed entity (403).

In further details of Step 263, the wireless routing entity may connect and communicate with an addressed entity (403) directly, through an access point (105), through a wireless sensor network (100), or by other means. An addressed entity (403) may comprise a system manager (103), a security manager (104), a gateway (106), a host application (109), or another functional element. A wireless field entity (401) may exchange messages with multiple addressed entities (403) through a mobile wireless routing entity (402). An addressed entity (403) may exchange messages with multiple wireless field entities (401) through a mobile wireless routing entity (402).

In further details of Step 264, interactions between an addressed entity (403) and an S&F surrogate (542) in a wireless router entity (402) may include one or more of the steps of: receipt and storage by the S&F surrogate (542) of a return receipt from the addressed entity (403); receipt and storage by the S&F surrogate (542) of a cryptographic key update from the addressed entity (403); receipt and storage by the S&F surrogate (542) of a configuration message from the addressed entity (403); receipt and storage by the S&F surrogate (542) of a management message from the addressed entity (403); receipt and processing by the addressed entity (403) of field data; receipt and processing by the addressed entity (403) of process data; receipt and processing by the addressed entity (403) of logged and/or time series sensor data; receipt and processing by the addressed entity (403) of device diagnostic data; receipt and processing by the addressed entity (403) of network diagnostic data; receipt and processing by the addressed entity (403) of a response to a command previously transmitted from the addressed entity (403).

Discovery

Figure 3A:
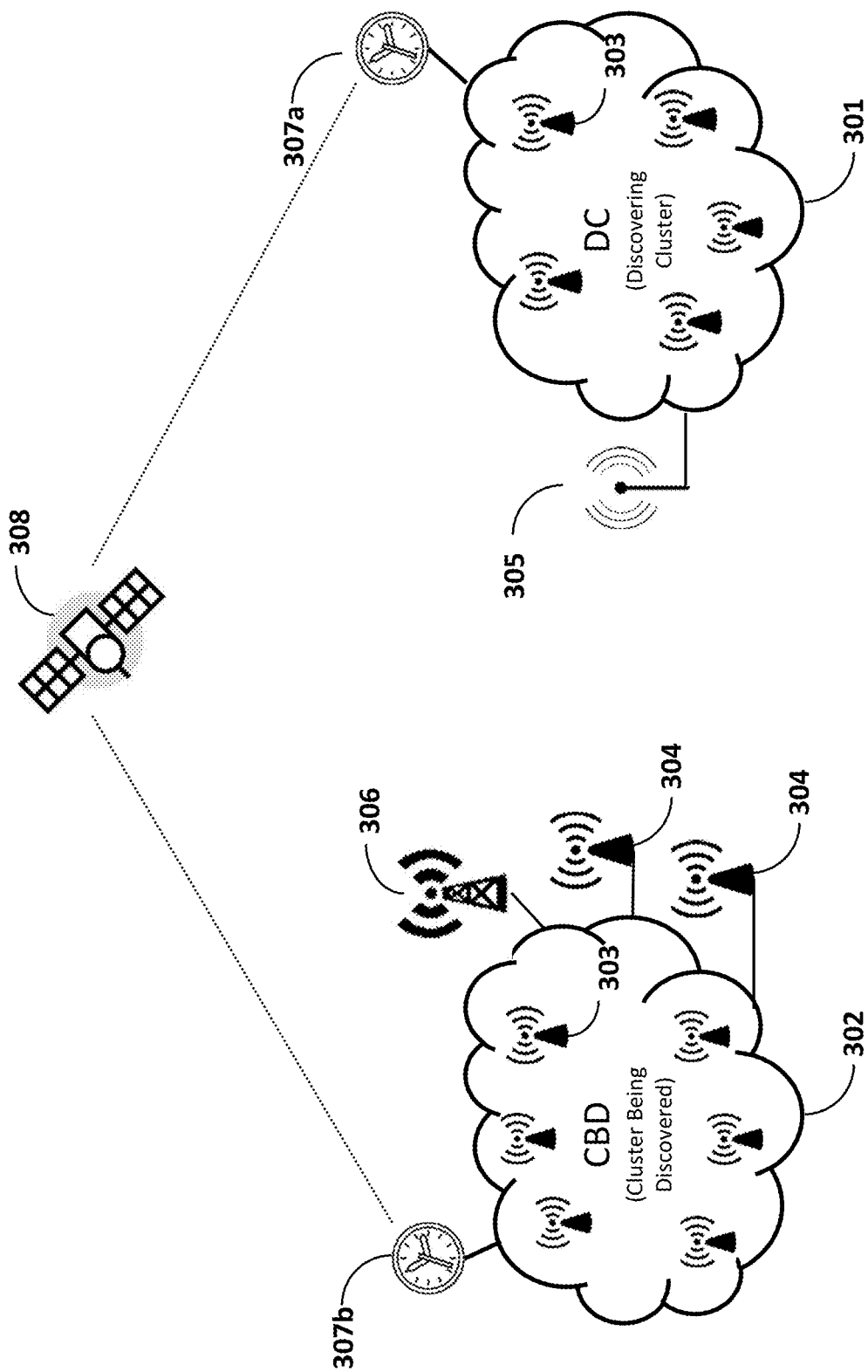
FIG. 3A is a diagram illustrating functions, devices, and/or subsystems involved in neighbor discovery.

FIG. 3A illustrates functions, devices, or subsystems that may participate in a mobile discovery process.

A Discovering Cluster (DC) (301) includes a collection of one or more wireless devices (303, 305, 307*a*) that may be configured to discover periodically connection points to a remote set of wireless services. A DC (301) may be instantiated as a single wireless device and/or may be mobile.

A Cluster Being Discovered (CBD) (302) includes a collection of one or more wireless devices (303, 304, 306, 307*b*) that may be configured to be discovered by one or more DCs (301). A CBD (302) may be instantiated as a single wireless device, and/or may be mobile.

One or both of the DC (301) and the CBD (302) may be in motion during a discovery process. In some implementations, devices within a given cluster (301, 302) may move in unison, in the same direction and at the same speed, such as a cluster of devices all being transported on the same vehicle, and the relative topology of devices within such clusters may be fixed in relation to each other while in transit. In some implementations, devices within a cluster may move in relation to each other, such as devices deployed in a series of temporary installations or biometric sensors carried by personnel traveling together; and the relative topology of devices within such clusters may be variable in relation to each other.

A remote time services subsystem (307*a*, 307*b*) may be included in a DC (301) or CBD (302), providing time synchronization to a remote or global source, such as by using NTP, GPS (308), WWV, or cellular technology. When present in one or both clusters, a shared sense of time (some degree of synchronous discovery) can improve the performance of a discovery process.

Certain wireless devices (303) in a CBD (302) may be configured as symmetric beaconing devices (304). Symmetric beaconing devices (304) may be configured to transmit beacons periodically on a time/frequency schedule, on demand, or spontaneously. Symmetric beaconing devices (304) may also receive and demodulate messages from a DC (301), such as a solicitation for a beacon.

The term "symmetric" indicates that DC (301) devices receiving a beacon can engage in robust 2-way communication with or through a symmetric beaconing device (304).

Certain devices in a CBD (302) may be configured as asymmetric beaconing devices (306). Asymmetric beaconing devices (306) may be configured to transmit beacons periodically on a schedule, on demand, or spontaneously. Asymmetric beaconing devices (306) cannot necessarily receive and demodulate messages from a DC (301), such as a solicitation for a beacon. The term "asymmetric" indicates that devices receiving a beacon cannot necessarily engage in 2-way communication with or through an asymmetric beaconing device (306).

Certain devices in a DC (301) may be configured as beacon repeaters (305). Beacon repeaters (305) may receive a beacon from a CBD (302) and then wirelessly propagate information from that beacon to other wireless devices (303) in the DC (301).

A given cluster may operate as a DC (301) and a CBD (302) simultaneously. When two such clusters come into proximity of each other, either cluster might transmit a beacon.

Industrial Wireless Sensor Networks may be designed with an assumption that network elements, including field devices, are largely stationary. In a stationary configuration, it is sometimes deemed non-essential that field devices be capable of quickly discovering a network. Neighbor discovery (210) may be defined as the process whereby a Wireless Sensor Network (WSN) (100) wireless entity (e.g., a field I/O (101) device and/or router (102) and/or cluster (301, 302)) detects that one or more neighboring WSN wireless entities is accessible to its radio. In a time-synchronized protocol such as ISA100.11a or WirelessHART, neighbor discovery may also involve synchronization of a WSN wireless entity's time to that of a neighboring device, and identifying a time/channel schedule that can be used for initial communications.

Especially when no operating network is in range, some WSN wireless entities may lack the energy budget to scan on an extended basis for neighbors that are not usually present. The discovery process for a low-energy WSN wireless entity may utilize a radio very sparingly, and therefore a user may observe long network discovery periods when using current implementations of ISA100.11a, WirelessHART, and other WSN protocols. There is a fundamental trade-off between speed of neighbor discovery and energy use. Generally, a WSN wireless entity that does not search aggressively for a neighbor will use less energy in its quiescent state, but will take longer to discover a neighbor.

For a stationary WSN wireless entity, it is sometimes possible to mask long discovery periods. For example, a WSN wireless entity may search aggressively when it is turned on, so that the operator observes a quick response in that scenario. However, if a neighbor is not quickly discovered, the WSN wireless entity may soon revert to operation at a low duty cycle and potentially slow neighbor discovery.

These tradeoffs become particularly intractable in WSNs intended to support mobile WSN wireless entities. Wireless entities in mobile WSN applications may need to discover their neighbors more quickly than in stationary scenarios. For example, if a WSN wireless entity is continuously in motion, such as attached to a vehicle or carried by personnel, it needs to execute neighbor discovery during potentially short periods of time when radios are in range of each other. If a WSN wireless entity moves into neighbor range periodically, such as a data logger arriving at a loading dock, application requirements may include prompt neighbor discovery, on a time frame that is consistent with WSN wireless entity movement that places neighbors in and out of range. Similarly, a low-energy WSN wireless entity (stationary or mobile) may need to connect rapidly with mobile neighbors that periodically move into range.

In stationary operation of a WSN such as an ISA100.11a network, a wireless entity may discover a network prior to joining Beaconing neighbors, i.e. other WSN wireless entities in the vicinity that are transmitting beacons (sometimes called advertisements), may be discovered using passive scanning, active scanning, or a combination of passive and active scanning.

In passive scanning, a WSN wireless entity searching for a neighbor may periodically listen for beacons on one radio channel, multiple radio channels, and/or a series of radio channels. A battery-powered passive scanning WSN node may listen frequently when first powered on. If a neighbor is not discovered quickly, the WSN node may preserve battery life by scanning less frequently, on fewer channels, and/or for shorter periods of time, resulting in substantial delays in neighbor discovery and subsequent communication and/or wireless network formation.

Active scanning overcomes some disadvantages of passive scanning WSN wireless entity that are searching for neighbors may periodically transmit a solicitation, which may trigger a response such as transmission of one or more beacons from neighboring entities.

FIGS. 3B and 3C illustrate active and passive scanning.

In passive scanning (FIG. 3B), a passive scanning host (321) may periodically transmit a beacon (325), sometimes called an advertisement as in ISA100.11a. A passive scanning device (320), such as a mobile I/O (101) device, can receive and demodulate a beacon (325) when a passive scanning host (321) transmits the beacon (325) on a time and radio channel, and a passive scanning device (320) operates a radio receiver at the same time and on the same radio channel. Such radio channel may be a wide or ultra-wide radio channel.

In active scanning (FIG. 3C), an active scanning device (330), such as a mobile I/O (101) device, may periodically transmit a solicitation (332). If an active scanning host (331) is in range and is operating its radio receiver at the same time and on the same radio channel, the active scanning host (331) may receive and demodulate the solicitation (332). The active scanning host (331) may process the solicitation and, if appropriate, respond by broadcasting or unicasting one or more beacons (335) on designated radio channel(s). The format of a passive scanning beacon (325) may be identical to that of an active scanning beacon (335), as is the case in ISA100.11a.

FIGS. 3B and 3C both illustrate a clock in proximity to beacons (325, 335) to indicate that, in a time-synchronized protocol, clock information may be an essential constituent of a beacon.

In ISA100.11a, a solicitation (332) is broadcast, in the sense that it is not addressed to any particular active scanning host (331). Similarly, an ISA100.11a beacon (335) transmitted in response is also broadcast, in the sense that it uses the same format as a passive scanning beacon (325) that is not addressed to any particular device. In some implementations, solicitations (332) and/or responding beacons (335) may be unicast or n-cast, for example with encryption and/or authentication codes to limit reception and processing to specific network entities.

As an illustration, consider the energy requirements for passive versus active scanning for a mobile device that needs to discover a network within 10 seconds. Energy consumption specifications for actual devices may differ from the illustrative numbers given here, but nonetheless the comparison is applicable to real devices that were available at the time this was written. To simplify the illustration, a single-channel scenario will be used here.

For the comparative examples herein, assume an IEEE 802.15.4 radio that consumes 20 mA at 3 V when receiving and 40 mA at 3 V when transmitting. (Note that 1 mA at 3 V for 1 ms converts to 3 µJ.) Actual power draw depends on a variety of factors, such as energy to initiate radio operation, radio and microprocessor sleep current, voltage regulation, sensor power, and so forth.

In a passive scanning scenario (FIG. 3B), imagine that a beacon (325) is transmitted every second by the passive scanning host (321) on a particular radio channel. A passive scanning entity (320) needing to receive and process that beacon within 10 seconds would need to operate its receiver about 10% of the time on that same radio channel, or about 6 seconds per minute, consuming about 20*3 µJ*6,000 ms≈360,000 µJ/min.

Passive scanning performance may be improved by increasing the length of the PPDU header. (PPDU is a Physical Protocol Data Unit.).

Scanning is illustrated in FIG. 3D. A scanned PPDU (350) that may be a beacon (325, 335) or solicitation (332) may include a header (340) and payload (341). A scan procedure (351) may include an idle time (342) and a packet wait time (343). As part of the scan procedure (351) illustrated in FIG. 3D, in order to receive and demodulate the header (340), the receiver needs to be operating its receiver at the start of the header. If the header (340) transmission time is on a known schedule, the scanning device may be in an idle state (342) until a transmission is expected, and enable its receiver during a packet wait time (343) that accounts for expected clock drift of the transmitting and receiving devices in relation to each other. FIG. 3D illustrates a packet wait time (343) for reception aligned with a header (340) transmission time/channel that is approximately known by the scanning device, a process sometimes called synchronous scanning. If relative timing is unknown by a scanning device, a search process may be called asynchronous scanning In asynchronous scanning, a scanning device may operate the scanning device's receiver continuously in order to be assured of receiving the next header (340) transmitted. In some implementations, an asynchronous scanning device may operate the scanning device's receiver on a duty cycle, for example as illustrated in FIG. 3E.

(343) FIG. 3E illustrates how scanning efficiency may be improved by transmitting a modulated signal (344) prior to a PPDU header (340). A modulated signal (344) may be transmitted by extending the length of a header. In some implementations, a modulated signal (344) may be transmitted as one or more PPDUs timed previously to the PPDU containing a header (340). During a scan procedure (351), a scanning device may detect such a modulated signal (344) by periodically sampling (345a, 345b) the radio channel and operating in low-power idle mode (342) between samples. When modulation is detected (345b), the scanning device may continue to operate its receiver for a packet wait time (343) in anticipation of receiving a header (340) soon thereafter.

Continuing the previous example, assume that a receiver can detect an IEEE802.15.4 modulated signal (344) by operating its receiver for 0.25 ms. If the PPDU header (340) is increased to about 2.5 ms in duration, the passive scanning device (320) can sample the channel every 2.5 ms, for a duration of 0.25 ms, to check for modulation. If modulation (344) is detected during the scan procedure (350), the receiver may then remain enabled in anticipation of a beacon (325, 335) to follow. This kind of approach, within sensible parameters, may improve passive scanning performance by approximately an order of magnitude, or to about 36,000 µJ/min in this example.

Active scanning (FIG. 3C) can support a radically different energy profile. In our example, a single solicitation (332) at 40 mA (3V) for 2 ms consumes about 240 µJ per solicitation. Following transmission of a solicitation (332), an active scanning device (330) may operate its receiver at 20 mA (3V) for a packet wait time (343) on the order of 10 ms, for an additional 600 µJ per solicitation. For a 10-second discovery time, six such solicitations per minute consume about 5,000 µJ/min. Active scanning may involve an asymmetry, as an active scanning host (331) may operate its receiver on a correspondingly high duty cycle to detect a solicitation (332) when it is transmitted. As shown in FIG. 3E, modulation (344) prior to the solicitation's header (340) may reduce the energy impact on an active scanning host (331) that is scanning for a solicitation (332).

So, broadly, from the mobile device's point of view, passive scanning performance may be improved by about one order of magnitude by extending the advertisement's header or by using other channel sampling techniques at the physical layer. Active scanning can reduce energy consumption of the discovery process by approximately two orders of magnitude, as compared to passive scanning without an extended header.

Figure 3F:
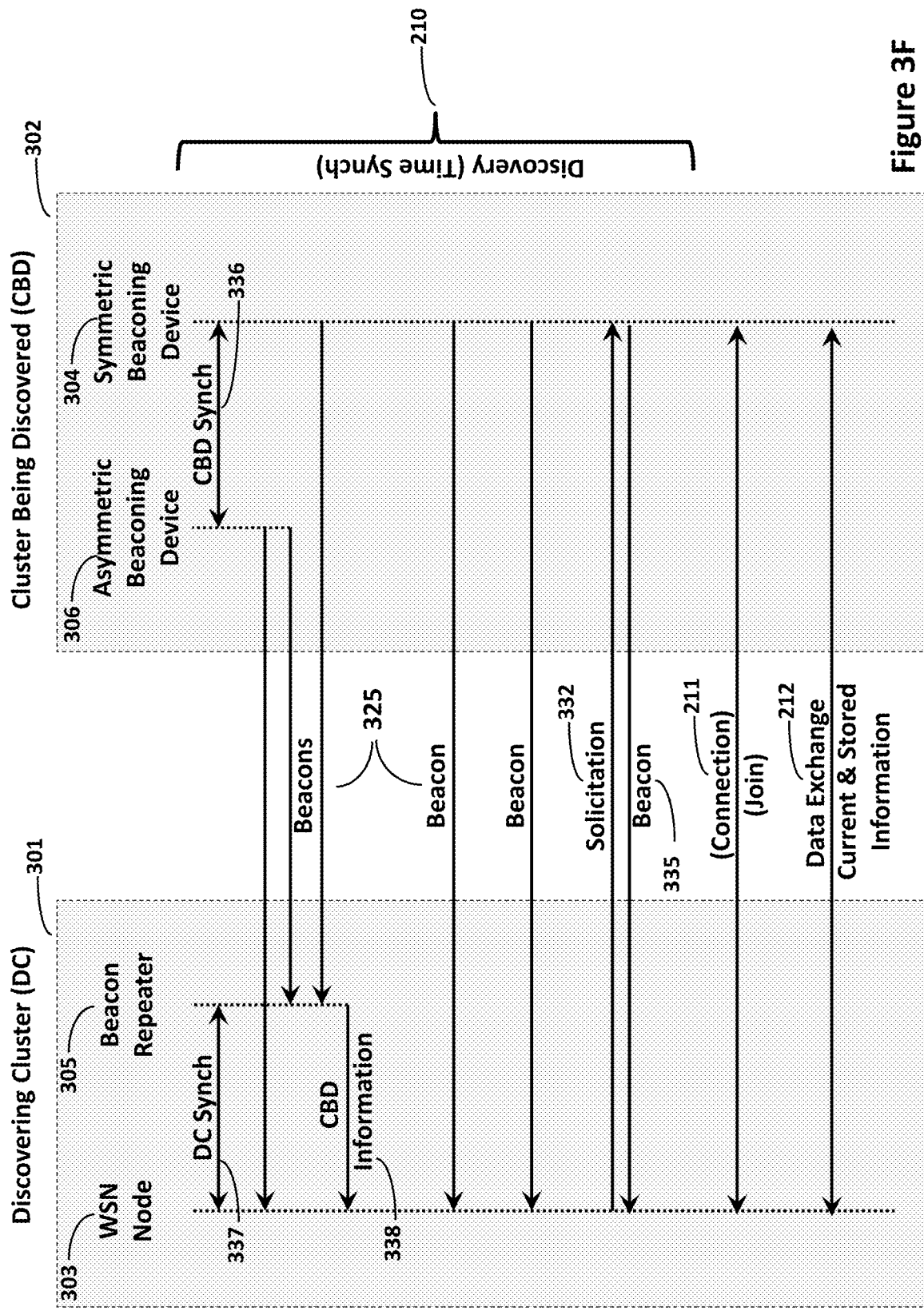
FIG. 3F is a diagram illustrating a discovery process.

FIG. 3F illustrates discovery (210) of a CBD (302) by a DC (301).

A DC (301) may include multiple devices, including one or more WSN nodes (303). One or more wireless devices may be configured as beacon repeaters (305) that receive CBD beacon(s) (325, 335) and may forward CBD information (338) from said beacon(s) to WSN nodes (303). A synchronization process (337) within the DC (301) may enable efficient time-synchronized propagation of CBD information (338) when it is received and then repeated.

A CBD (302) may include multiple devices, including one or more symmetric beaconing devices (304) that can engage in 2-way communication with a DC (301). A CBD (302) may also include one or more asymmetric beaconing devices (306) that can transmit beacons that may be received and processed by a DC (301) but might not directly participate in the connect/join (211) and/or data exchange (212) process. A synchronization process (336) within the CBD (302) may enable coordinated beaconing (325) and solicitation response (335).

In FIG. 3F, beacons (325) are shown being transmitted periodically by asymmetric (306) and symmetric (304) beaconing devices and passively received by DC devices (303, 305). In some implementations, DC devices (303, 305) may actively solicit (332) transmission of one or more beacons (335). FIG. 3F shows a solicitation (332) originating from a WSN node (303) and being received by a symmetric beaconing device (304). A solicitation (332) may, in some implementations, originate from a Beacon Repeater (305) and/or be received and processed by an asymmetric beaconing device (306).

Active and passive WSN scanning are sometimes described as occurring on a single channel. In practice, industrial WSN protocols such as ISA100.11a and WirelessHART may use frequency-hopping operation. When relatively narrow channel direct sequence radios are used, such as the 802.15.4 DSSS radio, channel diversity provides resilience and substantial process gain in multipath environments. When FSK and similar radios are used, operation on diverse channels may additionally be a regulatory requirement for all but the lowest transmission power levels. Even in networks that operate on a single frequency, particular networks may be configured to operate and/or be discovered on different frequencies. For these and other reasons, it is not necessarily possible or desirable to designate one or a limited number of radio channels in advance for discovery purposes.

Figure 3G:
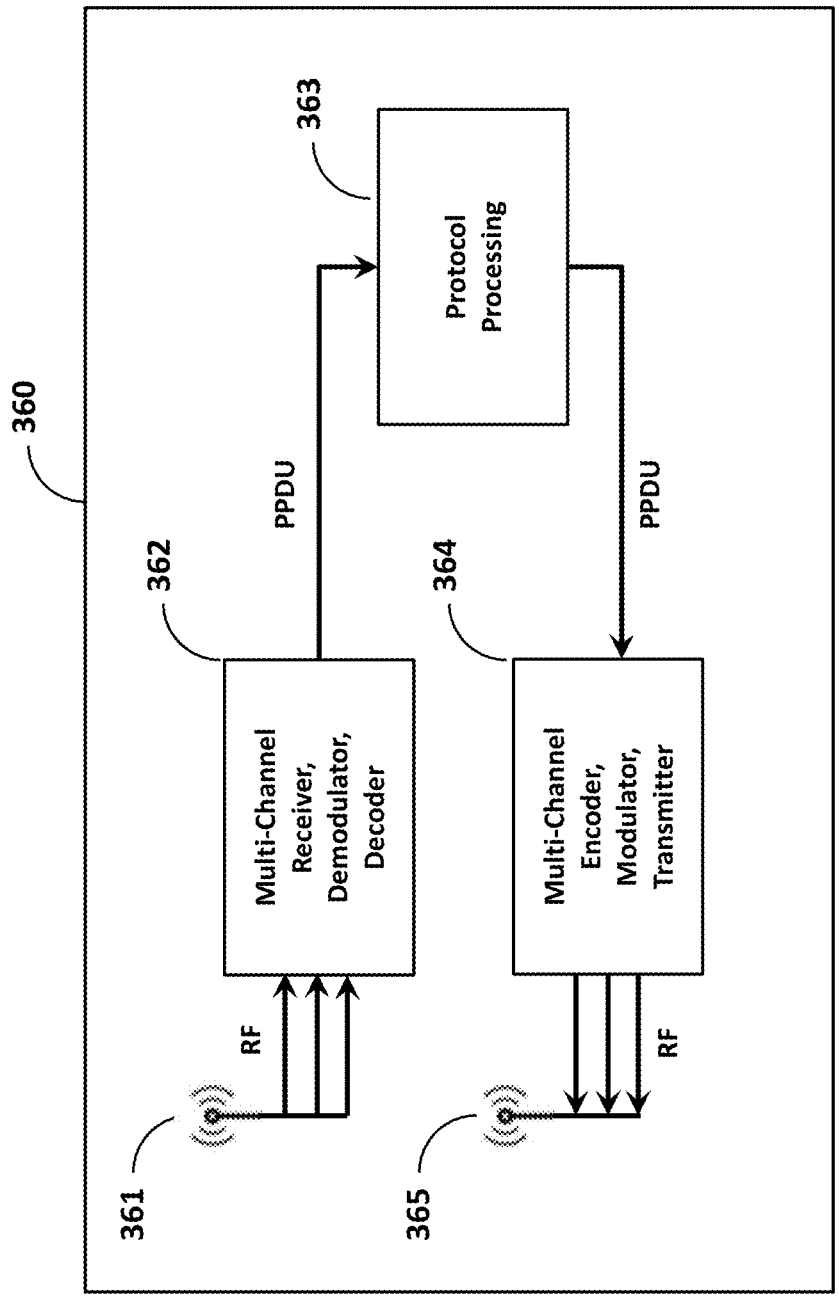
FIG. 3G is a diagram illustrating a device that can receive, process, and respond to discovery messages on multiple channels simultaneously.

To overcome some limitations of single-channel discovery in a multi-channel or flexible channel architecture, radios participating in passive and/or active scanning may be capable of operating on multiple channels simultaneously, as illustrated in FIG. 3G. A device (360) may be capable of receiving and demodulating solicitations (332) and/or beacons (325, 335) on multiple radio channels simultaneously. As illustrated, a receive antenna subsystem (361) may be connected to a subsystem (362) that is capable of receiving, demodulating, and decoding signals on multiple radio channels simultaneously and converting them to a PPDU digital representation suitable as input to hardware and software for protocol processing (363). On the transmit side, a subsystem (364) may receive PPDU digital representations as input, and may encode, modulate, and transmit a PPDU through a transmit antenna subsystem (365). The illustrated multichannel transmitter (362) and receiver (364) may be an integrated unit. A receiver and/or transmitter may include multiple single-channel transceivers operating in parallel and/or a cognitive radio (software radio) configured for transmit and/or receive/demodulate operation on multiple channels simultaneously.

A receive antenna (361) and a transmit antenna (365) are illustrated as separate entities in FIG. 3G, but may be combined. Segregation of the receive and transmit chains may improve throughput, to the extent that such segregation enables PPDUs to be received and demodulated on one channel at the same time that PPUs are transmitted on a different channel, particularly for devices (360) that transmit on a relatively high duty cycle.

Figure 3H:
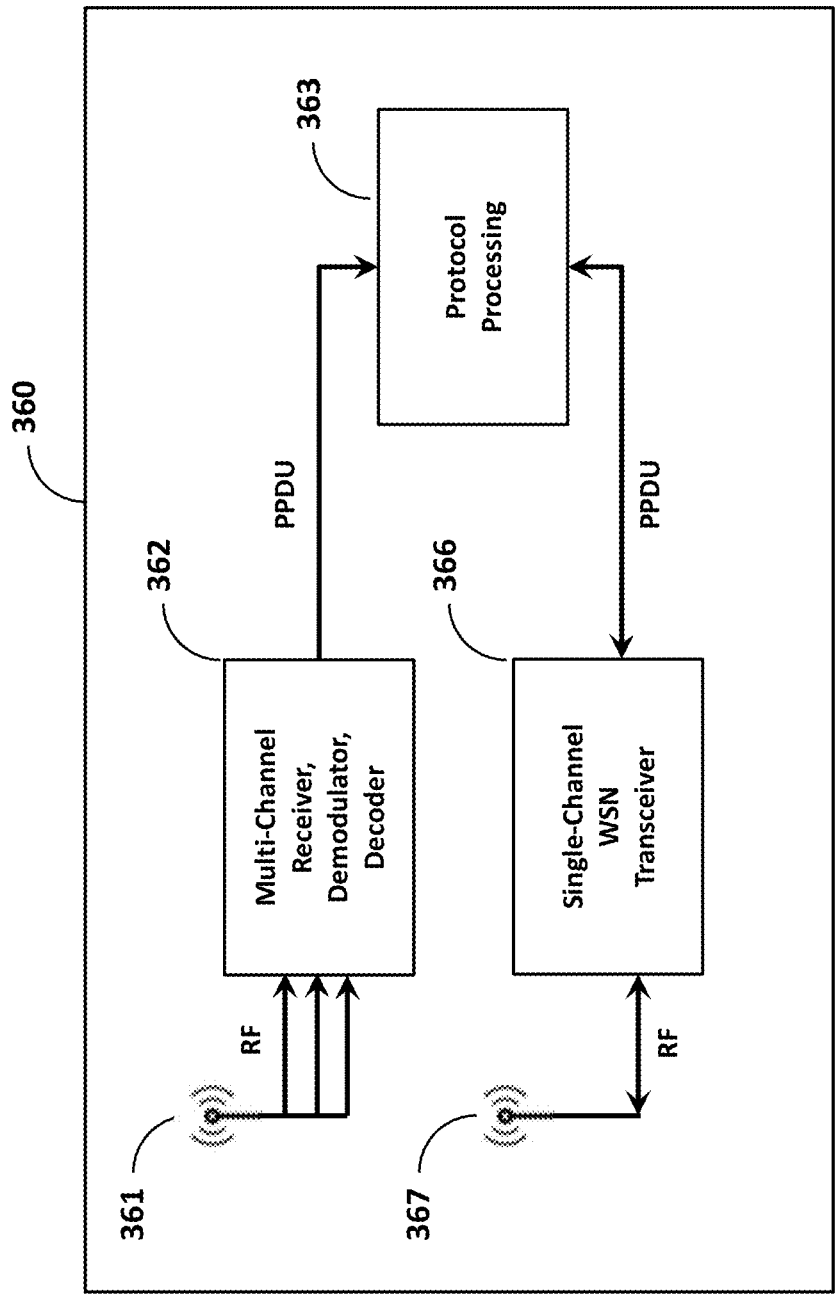
FIG. 3H is a diagram illustrating a device that can receive and process discovery messages on multiple channels simultaneously, with response being limited to one channel.

FIG. 3H illustrates an implementation with a multi-channel receiver (362) operating in conjunction with one or more single-channel WSN Transceiver(s) (366) and antenna subsystem(s) (367). A device (360) so constituted may receive and demodulate solicitations (332) and/or beacons (325, 335) on multiple radio channels simultaneously, but respond to only one at a time. FIG. 3H is a reasonable configuration for low duty cycle operation, and allows for a multi-channel receiver module (361, 362) dedicated to scanning for inbound solicitations (332) and/or beacons (325, 335), operating in conjunction with WSN subsystems (363, 366, 367) for general two-way WSN communication.

A result similar to scanning multiple channels simultaneously may be obtained with fewer radio receivers, and as few as one radio receiver, by employing increased header lengths and channel sampling, as illustrated in FIG. 3I for a single-channel system. Radio modulation (344) on at least one channel may precede a header (340) of a scanned PPDU (350) conveying a beacon (325, 335), solicitation (332), or other PPDU of interest. Periodically as part of a scan procedure (351), the scanning device may sample (346) multiple radio channels in a series for modulation (344). When modulation (344) is detected on one of the sampled channels, the device may enable a receiver on a radio channel where it is expected that a header (340) may be transmitted. In the example shown in FIG. 3I, the scanning device samples (346) three radio channels in a series for modulation (344), and modulation (344) is not detected on channels 1 or 2 but is detected on channel 3. Header (340) radio channel may be fixed. Header (340) radio channel may be scheduled based on approximate time. Header (340) radio channel for the may be indicated in the encoding of the modulated signal (344).

For example, suppose it is possible to detect a modulated radio signal (344) within 0.25 ms, as approximately the case for the IEEE 802.15.4 DS radio. With a header (340) length of 4.25 ms (with an extra 0.25 ms to account for alignment considerations), it would be possible for a single receiver to sample 16 channels in series during said header (340). A full PPDU transmitted just prior to a solicitation or beacon could serve the same purpose as an extended header (340). N receivers operating in parallel (362) could process an extended header with length reduced to 1/N.

In configurations wherein beacons are known to be limited to certain radio channels, the header length may be reduced accordingly. More generally, multiple radio channels may be sampled to improve the probability of detecting a beacon that may be transmitted on one of several channels, and an extended header (340) increases the number of channels that can be sampled. With an IEEE 802.15.4 radio, most channel diversity benefits may be achieved by limiting passive and active scanning to 3 or 4 channels, which may be pre-selected, when allowable under local regulatory and policy guidelines.

In some implementations, shown in FIG. 3J, a modulated signal (344) may be transmitted on a series of channels (347) prior to a header (340) in a scanned PPDU (350). During a scan procedure (351), a scanning device may periodically operate its receiver on at least one of the series of channels, shown as Channel 2 (348). After modulation (344) is detected, scanning (343) for the HDR may commence on the same or a different designated channel.

In some implementations, simultaneous transmission of beacons (325, 335) or solicitations (332) may occur on multiple channels, in which case a receiver may scan a lesser number of channels. A similar result may be achieved by transmitting multiple PPDUs in succession on multiple channels, or with an extended header where a modulated signal is transmitted on multiple channels in succession. Some implementations transmit on a single channel and scan on multiple channels in order to avoid congesting the radio channel. A balanced result may be achieved by both transmitting and receiving on multiple channels in order to cover a set of channels.

Scanning involving multiple channels, simultaneously (FIG. 3G, 3H) and/or in succession (FIG. 3I, 3J), may be applied to beacons (325, 335) and/or solicitations (332), depending upon the configuration. Generally, a low-energy device may transmit a PPDU on a very low duty cycle. For example, if a PPDU is transmitted every 10 seconds, with a length of 2 ms, the corresponding transmission duty cycle is approximately 0.02%. However, for that PPDU to be received/demodulated reliably in asynchronous operation, a receiver may scan on a relatively high duty cycle, for a high-performance result in an asymmetric configuration.

An active scanning host (331) may be a continuously powered infrastructure element of a WSN (100). An active scanning host (331) may operate within a field device such as a positioner that may require a relatively high-capacity source of energy for non-communications aspects of the device's operation. An active scanning host (331) with high energy capacity may operate its receiver(s) on a high duty cycle and/or may scan multiple channels simultaneously (FIG. 3G, 3H) and/or in succession (FIG. 3I). An active scanning device (330) that is mobile may transmit a solicitation on a schedule that is consistent with the application's join time requirements, optimized for a configuration wherein an active scanning host's (331) receiver operates on a high duty cycle. For reasonably consistent discovery latency, solicitations should be transmitted with channel diversity (solicitations transmitted on various channels in some sequence and/or multiple channels in a header) and frequently enough to allow for a reasonable percentage of lost PPDUs.

A DC (301) device (303, 305) with a substantial power source may be configured as a passive scanning device (320). A mobile DC device may be have access to a continuous power source, for example a mobile device installed in a vehicle. A mobile DC device may have a rechargeable power source, for example a mobile device carried by personnel for an 8-hour shift and recharged overnight. A mobile DC device may, on a high duty cycle, scan for beacons (325, 335) originating from various CBDs (302). When a beacon (325, 335) is received and processed, a mobile DC device may act as a beacon repeater (305), forwarding CBD information (338) to other devices (303) in the DC (301). Other devices (303) in the DC (301) may retain time synchronization to a beacon repeater (305) so that those other devices (303) may efficiently receive and process forwarded CBD information (338), and commence their own discovery process (210) when such information is received and processed.

Figure 3K:
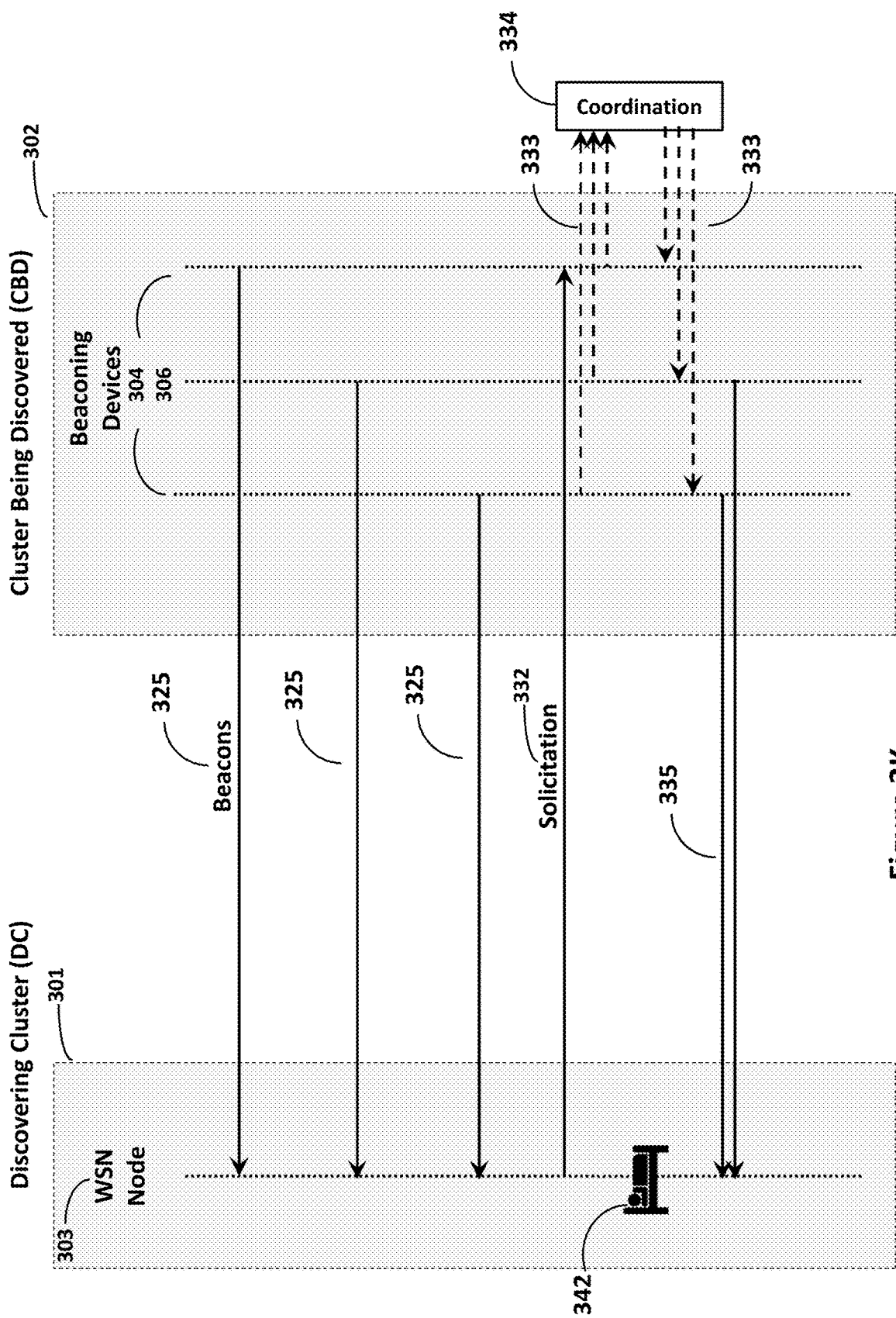
FIG. 3K is a diagram illustrating coordination of responses among active scanning hosts.
Figure 3L:
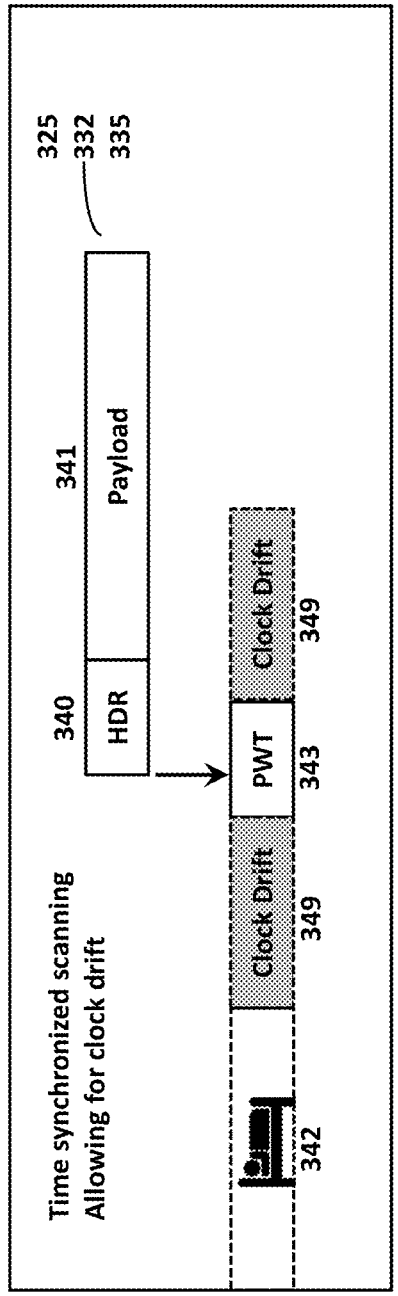
FIG. 3L is a diagram illustrating scanning, with compensation for clock drift.

A CBD (302) with multiple active scanning hosts (331) may coordinate the responses of those active scanning hosts (331), as illustrated in FIG. 3K. A set of beaconing devices (304, 306) in a CBD (302) may have a master time/frequency schedule of beacons (325). A master schedule may be indicated in the beacons (325) themselves, so that once a single beacon (325) is received and processed the master schedule indicated in the beacon may be used to search for other beaconing devices (304, 306). Periodically, a solicitation (332) may be transmitted by a DC (301). A beaconing device (304, 306) capable of responding to a solicitation may fill the role of an active scanning host (331). One of more active scanning hosts (331) may respond immediately. In some implementations, coordination messages (333) may be exchanged with a distributed or centralized coordination function (334), and the discovering entity (303) may enter an idle state (342) while messaging (333) and processing (334) occurs. After an interval, one or more active scanning hosts (331) may transmit beacons (335) in response to the solicitation (332).

If multiple active scanning hosts (331) receive/demodulate the same solicitation (332), which should respond with a beacon (335)? ISA100.11a enables the configuration of each host (331) to respond on a randomized basis, and hosts (331) in dense configurations may be configured to respond a lower percentage of the time to avoid collisions. Randomization adds a stochastic element to the response (335) that might not be acceptable in a mobile scenario wherein devices move quickly in and out of range. A more deterministic result may be obtained, in some implementations, if active scanning hosts (331) can coordinate (334) responses to solicitations (332), with only one designated host (331) responding to each solicitation at a time. For example, if hosts (331) share a communication channel, hosts (331) may report their results to an authority that may select one device to respond based on some reasonable criteria, such as signal quality of the solicitation as received by various hosts. A similar result may be obtained on a distributed basis without a central authority, such as by broadcast of squelch messages on a back channel, with devices receiving strong signals sending the message at an earlier time and/or using a token passing arrangement.

ISA100.11a currently requires that the active scanning host (331) respond to a solicitation (332) quickly, within about 10 ms depending on the configuration. Coordination of the solicitation response among multiple hosts (332) may take longer than that. For optimal support of active scanning devices (330) that are mobile, an improved result may be achieved by defining a longer latency for the solicitation (332) response, such as 250 ms. In that example, an active scanning device (330) may send a solicitation (332) and then go into a low-energy sleep state for a fixed latency period, such as 250 ms. At the end of this latency period, the device (330) may enable its receiver for a brief period of time before listening for a responding beacons. A 250 ms latency may provide an opportunity for various candidate active scanning hosts (331) to coordinate their responses.

With a coordinated response to a solicitation (332), multiple active scanning hosts (331) may be configured to respond serially. For example, if an active scanning device (330) enables its receiver exactly 250 ms following a solicitation, multiple hosts might respond serially at that time (332), with 250 ms providing time for the hosts (331) to coordinate and serialize their responses.

In ISA100.11a, a solicitation (332) does not identify the active scanning device (330). When multiple active scanning hosts (331) are coordinating their responses (335), a device identifier in a solicitation (332) may allow for a more optimized result. A second solicitation (332) received from a given active scanning device (330), after a responding beacon (335) is transmitted from one or more hosts (331), indicates that different host(s) (331) may reasonably be tried for the next response. To facilitate selection of a responding active scanning host (331), a device identifier may be included in the solicitation (332) from an active scanning device (330). A solicitation's device identifier might be, for example, a 16-bit identifier (if assigned), a 64-bit MAC address, or a device-generated randomized number that is consistent from one solicitation (332) to the next.

With a fixed packet wait time (343), discovery can be synchronous for a fixed period of time and then become asynchronous and/or unreliably synchronous, due to clock drift. Clock drift (349) may be overcome with a variable packet wait time (343) that expands with the passage of time to account for expected clock drift (349), as illustrated in FIG. 3L. Field(s) in the link, timeslot template, or elsewhere may be configured to indicate that a particular set of receive links is intended for reception of scheduled beacons (325), even in the absence of an active network connection. If the relative timing of DC (301) and CBD (302) clocks can be expected to drift over time, the extent of anticipated clock drift (349) may be indicated in a configurable field. In some implementations, such as in cases wherein the DC (301) is a single device and CBD (302) timing is generally stable, a DC (301) cluster or device may estimate its own clock drift (349) without external configuration. With knowledge that a particular packet wait time (343) defines when a beacon (325) is scheduled for transmission, a passively scanning device may then autonomously extend its packet wait time (343) to account for the expected clock drift characteristics in the absence of a clock correction. For example, if a scanning device has a temperature-compensated crystal that provides time accuracy within ±5 ppm, that corresponds to clock drift (349) of about ±0.3 ms per minute or about ±18 ms per hour. With the passage of time, the packet wait time (343) may be extended by ±0.3 ms per minute to account for such clock drift (349).

More generally, a passively scanning device may be configured with a schedule of beacons (325) or solicitations (332) for which to search, with a packet wait time (343) corresponding to synchronous operation. While the device retains time synchronization, the device can simply use that schedule with the designated packet wait time (343). If the device stops receiving time corrections, the device can compensate by autonomously extending the device's packet wait time (343) to account for expected clock drift (349) in the absence of a clock correction.

Consider the earlier example, wherein a beacon (325) is transmitted every 10 seconds, with beacon (325) transmission on a time/frequency schedule that is known a priori. A device with a 5 ppm clock that has not received and processed a time synchronization for an hour may be assumed to be accurate within ±18 ms. Given that assumption, a baseline 2 ms packet wait time extends to 38 ms, accounting for clock drift (349). (A packet wait time (343) of 38 is twice the ±18 ms clock drift (349), plus a configured baseline packet wait time of 2 ms.) Energy per minute needed for such a scan would be approximately 6 (DPDUs per minute)*38 (ms packet wait time)*20 (mA receiver draw)*3 (µJ)≈15,000 µJ/min, or on the order of 5% of the 360,000 µJ/min estimate of an equivalent search that lacks any time synchronization. In addition, since the underlying beaconing schedule may include a channel hopping schedule, a time-synchronized search strategy allows for channel diversity for additional energy and efficiency advantages.

Eventually, an extended packet wait time (343) plus clock drift (349) may exceed a DC's (301) energy budget. In that event, a DC (301) may check for beacons at a reduced interval. In the example above, the DC (301) may reduce its scans from every 10 seconds to every 20 seconds, then every 30 seconds, and so forth as needed to preserve energy. After extensive periods of time, the DC (301) may revert to active scanning and/or asynchronous search techniques.

A similar approach may be applied to scans for solicitations.

With the passage of time, loss of clock synchronization reduces the efficiency of extended packet wait times (343, 349). If clock corrections are not available from the CBD (302), a secondary radio (305, 307) may be incorporated in a DC (301) device to acquire clock corrections from another source. GPS, WWV, or cellphone (e.g., LTE) receivers are reasonable candidates to resynchronize a device's time base to a global reference. Assuming the CBD (302) tracks to a consistent time reference, time synchronization is thereby re-established. Similarly, a network proximity beacon (described subsequently) may be used to re-establish a shared time base. While time synchronization procedures, such as a GPS fix, may consume significant battery power when operating, the operation or such time synchronization procedures may be deferred until the energy cost of a resynchronization operation is balanced by the energy saving from a more efficient scan.

Figure 3M:
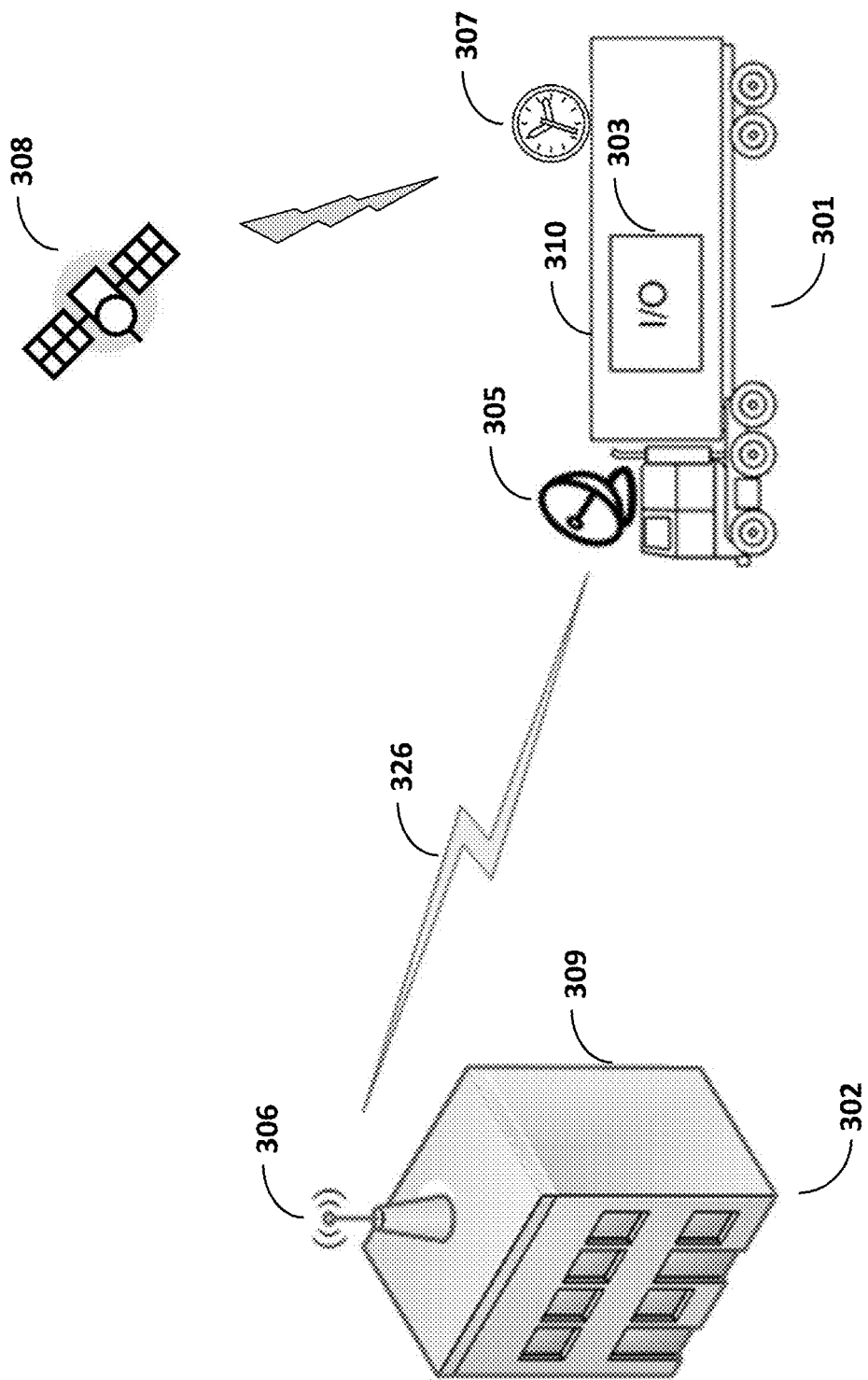
FIG. 3M is a diagram illustrating network discovery from a vehicle approaching a facility.

One configuration is shown in FIG. 3M. A mobile DC (301) approaches a facility (309) wherein a CBD (302) is operating. The DC (301) may be carried by a conveyance (310) such as a truck. An asymmetric beaconing device (306) may be located within a facility (309) or in its vicinity, and may periodically transmit a wake-up beacon (326) containing a time synchronization signal and/or other information about the network, such as network ID and/or a schedule of beacons (325, 335) for the CBD (301) and/or neighboring symmetric beaconing devices (304) within the CBD (301). While in transit, the DC's (301) active or passive scan may be limited to a scan for a wake-up beacon (326). A wake-up beacon (326) may be identical in modulation and/or format to a standard beacon (325 or 335).

FIG. 3M illustrates a configuration wherein a CBD (302) is stationary and a DC (301) is mobile. As indicated in FIG. 3A and the associated description, the same principles may apply to configurations wherein either cluster is stationary or mobile. The roles of the CBD (302) and DC (301), shown in FIG. 3M, may be reversed.

Upon receipt of a wake-up beacon (326), a scan by the DC (301) may be enabled for a period of time that is pre-configured in the DC (301) or indicated in the wake-up beacon (326) itself. The wake-up beacon (326) may contain a schedule that can be used by the DC (301) in its search for beacons (325, 335) from other beaconing devices (304, 306) in the vicinity.

To facilitate discovery of a CBD (302) by a DC (301), the DC (301) may be provided with a schedule of wake-up beacons (326) by time and radio frequency. By monitoring the radio channel at those times and frequencies, the mobile device may efficiently discover nearby network connection points (304) as it arrives at and moves through a network. Such a schedule may be based on a superframe cycle (channel hopping pattern and superframe length), and then within that schedule allowing for beacons that:

Occur at a fixed timeslot offset within each superframe cycle; and/or

Occur multiple times in each cycle, first at a fixed timeslot offset and then repeating at an interval until the end of the cycle; and/or Occur at one or more range of slots in each cycle; and/or Occur at timeslot offsets within each superframe cycle as indicated by a bitmap.

Directly through a subnet ID and/or indirectly through a security MIC, a beacon (325, 335, 326) may include network identification information. If an asymmetric beaconing device (306) does not itself offer links for network joining, it could so indicate with a reserved source address, such as address zero. If the beacon (325, 335, 326) includes non-null fields indicating a schedule of links, corresponding to a master beaconing schedule for the CBD (302).

A wake-up beacon (326) may use the same radio that the mobile device (303) uses for WSN communication (IEEE 802.15.4 in the case of ISA100.11 and WirelessHART), thereby enabling the DC (301) to receive and demodulate the wake-up beacon (326) directly without involving a second radio. Sensor networks such as ISA100.11a may use two-way links, wherein a discovering device (303) can both send and receive/demodulate messages. In contrast, wake-up beacons (326) shown in FIG. 3M may be based on asymmetric one-way links, wherein no message is expected directly in response to the beacon. This asymmetrical nature of the link can be used to extend its range. For example, a discovering device (303) may have a relatively low-power radio transmitter, such as 10 dBm. The asymmetric beaconing device (306) may have a much stronger radio, up to 36 dBm under FCC rules, enabling the wake-up beacon (326) to be received at a long distance even though the receiving transceiver might not be capable of responding at that range.

A wake-up beacon (326) does not necessarily need to be received directly by a discovering device (303). It might be received serendipitously by a second neighboring device (303), which may be configured to act as a repeater (305) of CBD information (338) from the wake-up beacon (326).

In some implementations, a conveyance (310) may be equipped with a specialized repeater (305) that is configured in such a way as to optimize reception of a beacon (325, 335, 326) as the conveyance (310) approaches a facility (309). For example, the repeater (305) may be continuously powered or rechargeable in order to be able to listen continuously for beacons (325, 335, 326). The repeater (305) may be equipped with a multi-channel radio (FIG. 3G, 3H), such as a software-defined radio, that is capable of scanning for beacons on multiple channels simultaneously. The repeater (305) may be equipped with a directional antenna that is optimized to receive beacons (325, 335, 326) in the direction of travel. The repeater (305), once it receives a beacon (326 325, 335,) from the facility (309), may in turn be configured to transmit CBD information (338) from the beacon to discovering devices (303) in the immediate vicinity. While in transit, the repeater (305) may reasonably retain time synchronization to discovering devices (303) in range, so that it can transmit local beacons at a time that is precisely scheduled in order to preserve the energy capacity of the discovering devices (303) and of the repeater (305).

One or more radio channels may be designated for frequent transmission of beacons (325, 335) and/or wake-up beacons (326), which may have extended PPDU headers (344, 347) and/or be burst advertisements.

The conveyance (310) in FIG. 3M is drawn as a vehicle, but that is not intended to be limiting. For example, the conveyance may be a pallet with a repeater (305) built in. In some implementations, devices (303) in the conveyance (310) may form a wireless cluster (301), with designated devices taking the role of a repeater (305) on a temporary basis as device energy budgets allow.

Asymmetric beaconing devices (306) may be constituted or configured to transmit beacons (325, 335), wake-up beacons (326), and/or solicitations (332) without offering any other network services themselves. Even in configurations wherein certain beaconing devices (306) cannot act as very effective active or passive scanning hosts (321, 331), such beaconing devices (306) may indicate that a mobile device is or will soon be in range of an operating network, and may provide time synchronization and/or site-specific information in a wake-up beacon (326). A wake-up beacon (326) from an asymmetric beaconing device (306) may include a particular source address, such as zero, to indicate that it is not itself offering any network services.

For longer range, especially when involving asymmetric beaconing devices, different radios may be used for beacons (325, 335, 326) and/or solicitations (332), with lower frequency radios providing longer range in general. As one illustrative example, an IEEE 802.15.4 radio at 900 MHz may be used for beaconing. In applications wherein a repeater (305) is feasible, the discovering device (303) does not need to receive the beacon (326) directly, and can instead rely on a repeater (305) to receive the beacon (325, 335, 326) and convert the beacon's information (338) to a modulation and format that a discovering device (303) can receive and demodulate.

Site-specific information in a beacon (325, 335, 326) may include a CBD (302) beacon schedule and CBD identification information (338). A beacon (325, 335, 326) may include security authentication information (e.g. DMIC in ISA100.11a) to prevent the DC (301) from expending energy exchanging messages with a network that lacks proper security credentials.

The process of network discovery may be similar in mobile scenarios for devices that are already joined to the network, with some opportunity for optimization. Knowledge of a data link layer cryptographic key or equivalent enables the receiver of a beacon or solicitation to authenticate its MIC (cryptographic message integrity code) and provides security assurances that the originating device is authentic. The originating device's EUI-64, which may be needed for MIC nonce construction, may be known a priori, or in some implementations may be acquired by interrogating the beaconing device such as described in 9.1.14.2 (final paragraph) of ISA100.11a. When multiple MIC keys are in use by multiple subnets, the mobile device may identify the applicable key using a crypto key identifier (for example as described in Table 203 of ISA100.11a, which is similar to the key identifier field in IEEE 802.15.4), the subnet ID, or a combination thereof. Generally, information in the beacon may instruct the receiver to select one of many keys, which is then used to authenticate the beacon. In some implementations, for a higher processing load and arguably reduced security, the receiver may attempt to authenticate the beacon using a series of keys from a list and accept any beacon with a matching key. Similar principles may be applied to authenticate a solicitation.

A second radio, such as GPS, WWV, or LTE may be incorporated in a DC (301) or CBD (302) to acquire clock corrections (307) from another source. For devices in a cluster that are disconnected from a larger network, a time service (307) of this kind may be provided by a device on the conveyance (310) or facility (309) for a population of devices, as an independent service or in conjunction with a repeater service (305). A dedicated or designated device (303, 305, 307, etc.) in a mobile and/or disconnected cluster may periodically synchronize the device's clock to a remote wireless time source and may also periodically broadcast a time reference locally, on a predictable schedule that can be used by other devices (303, 305) to retain time synchronization while disconnected from a time-synchronized cluster.

For devices (DCs (301) and/or CBDs (302)) for which motion is expected to be relatively infrequent, a discovery process may be limited to when the device is in motion, resulting in a very substantial energy saving. For example, if a device is in motion for 1% of its life cycle, the discovery process may be limited to that 1% of the time. Once a mobile device discovers a suitable network connection point for communication, the discovery process may be paused until there is reason to expect that connection quality to degrade, such as a change of radio performance diagnostics (e.g., RSSI, packet error rate, change of the RF fingerprint, or other network diagnostics), physical motion of the device (e.g., accelerometer readings indicative of motion), or RTLS techniques (e.g., RF distance estimates to neighbors, or passage through a low-frequency portal). When stationary, the mobile device may conduct a baseline scan for routers in the general vicinity, so that the discovery process has a substantial head start when motion commences.

Devices (DCs (301) and/or CBDs (302)) that move along a consistent route, such as overhead cranes, may maintain connections to multiple points simultaneously, eliminating the need to discover those points repeatedly. In some implementations, DCs (301) and/or CBDs (302) may store a beaconing or solicitation schedule for a known population of connection points to facilitate efficient discovery when in motion.

Connection

As written, ISA100.11a and WirelessHART are optimized for network topologies wherein an I/O (101) device does not need to join a network quickly, and spends very extended periods of time in a joined to application (205, FIG. 2A) state, with both the I/O device (101) and the network (100) being mostly stationary. In this description, we describe impediments that may arise when fundamental networking assumptions are violated in mobile applications, along with a description of strategies that may be employed to overcome such impediments.

FIG. 2A and corresponding systems assume that a device in the joined to an application (205) state may also be an Accessible device (204). In this specification, however, a device or cluster of devices, when inaccessible, may nonetheless remain joined to an application (205), such as while the inaccessible device and/or the network are in motion. While inaccessible, a device or cluster of devices may archive data. When an inaccessible device or cluster of devices periodically comes into radio range of other devices in the wireless sensor network (100), the inaccessible device or cluster of devices may quickly discover a neighbor, exchange data and network control messages with the neighbor, and/or transfer data toward a destination through the neighbor, using security credentials and sessions that were previously established.

In industrial operation at the time this was written, ISA100.11a field procedures for a wireless field device may involve installation of join key at the provisioning step (203a). All other keys and sessions may be established in a subsequent network join (204a) and application join (205a). This specification extends that model so that, in a device or cluster of devices intended for mobile operation, the network join (204a) and application join (205a) may be executed in conjunction with the provisioning step, before the device has actually accessed the network. In other implementations, a device or cluster of devices may acquire security material, network information and application context through a network join (204a) and application join (205a), but may retain security material, network information and application context, and thereby remain joined to an application even when the device or cluster of devices loses connection with the network.

For example, an infrared interface may be used to exchange provisioning messages with a wireless field device prior to device deployment. The same infrared interface may be used to exchange join messages, as described in the ISA100.11a standard but using an infrared interface instead of a radio interface. When the infrared interaction with a field device is completed, the field device may be provisioned (203) and joined to application (205), but not accessible (204). The device would, however, be configured to discover matching networks that come into proximity, and then be able to quickly exchange data leveraging a previously established join state and credentials.

Similarly, a device that has joined a network may become inaccessible for an extended period of time, but still retain its joined state and credentials.

Figure 4A:
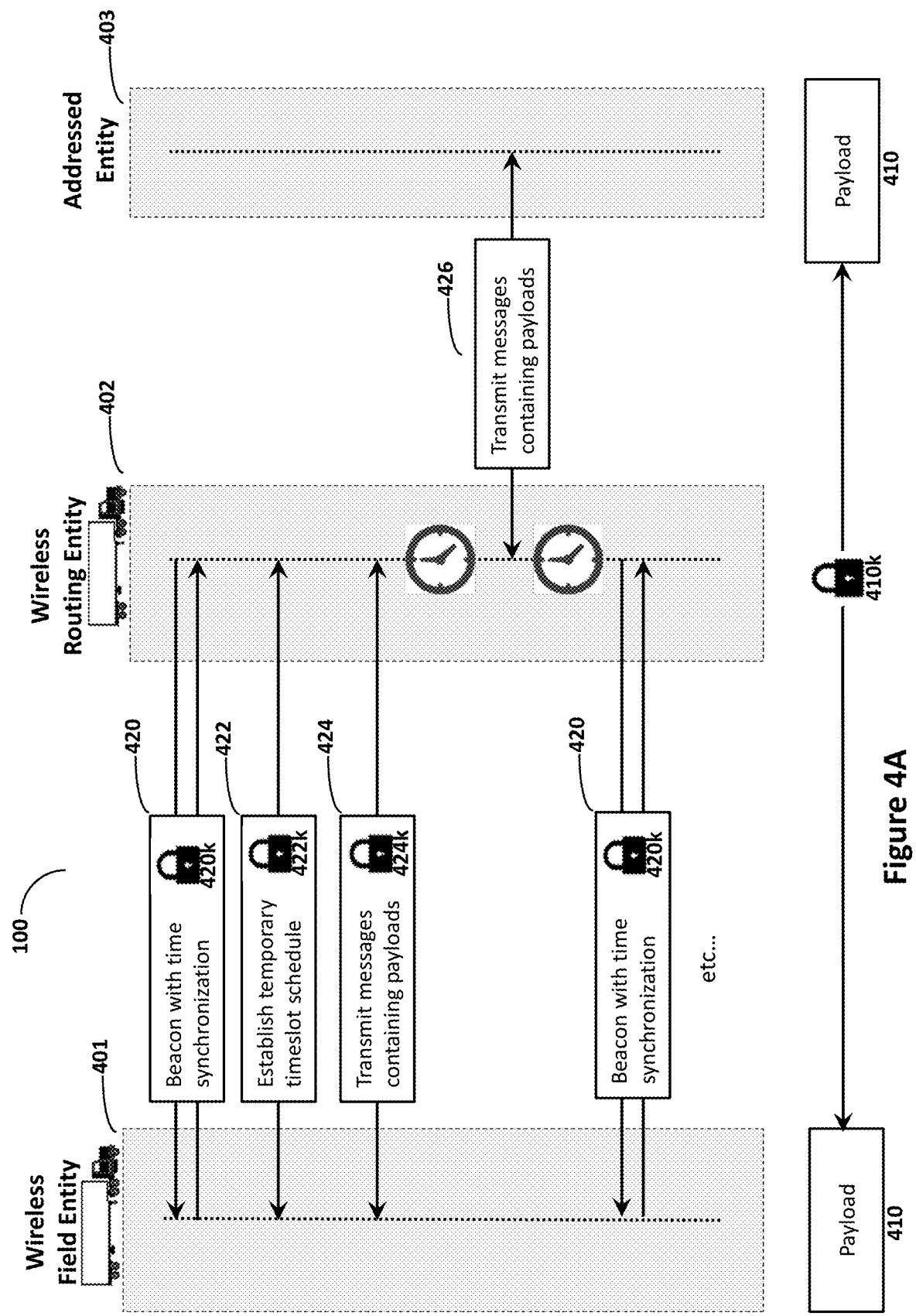
FIG. 4A is a diagram illustrating functions, devices and systems that may participate in a mobile connection process in a wireless sensor network.

FIG. 4A illustrates functions, devices, and systems that may participate in a mobile connection process in a wireless sensor network (100).

A wireless field entity (401) exchanges secure payloads (410) with one or more remote entities (403). A wireless field entity (401) may include a wireless I/O device (101) and may include a sensor and/or actuator. A wireless field entity (401) may include a cluster (301, 302). An addressed entity (403) may include a gateway (106), system manager (103), security manager (104), user application host, and/or an I/O (101) device. Payload (410) communications may be cryptographically authenticated and/or encrypted with a symmetric key (410k). A wireless routing entity (402) may provide connections to one or more wireless field entities (401) for routing of payloads (410) to and from one or more remote entities (403). A wireless routing entity (402) may be a router (102), a backbone router (105), and/or a cluster (302, 303) of devices. A wireless field entity (401) and/or a wireless routing entity (402) may include a store-and-forward surrogate (542).

One or both of the wireless field entity (401) and/or the wireless routing entity (402) may be mobile; and may be conveyed by a vehicle, such as a car, truck, or personal transport (cycle, scooter, Segway, etc.), conveyed by personnel, conveyed by boat, conveyed by ship. A mobile wireless field entity (401) and/or a wireless routing entity (402) may be conveyed by aerial equipment, such as an aircraft, helicopter, or drone. The aerial equipment may be used to conduct visual inspections, such as of a pipeline, and simultaneously collect archived time series information originating from wireless sensing entities along the flight path.

An addressed entity (403) may or may not be able to communicate with wireless routing entity (402) during the same time period that the wireless routing entity (402) is able to communicate with the wireless field entity (401); and/or latency of communication between the wireless routing entity (402) and the addressed entity (403) may be high relative to the time period that the wireless field entity (401) and wireless routing entity (402) are within radio communication range of each other. Therefore, in some implementations it may be necessary for a wireless routing entity to buffer messages, for example as illustrated and described with FIGS. 5A-5L.

In some implementations, a wireless routing entity (402) and an addressed entity (403) may be integrated in the same device, with messages containing payloads (426) being an internal device matter. In some implementations, a wireless routing entity (402) may be a backbone router or access point (105) with a relatively high-speed link to an addressed entity (403).

A wireless routing entity (402) may be a mobile device. A mobile device may be integrated with a handheld or vehicle-mounted terminal that may provide IP-based connectivity to an addressed entity (403). IP connectivity from the wireless routing entity (402) to the addressed entity (403) may be provided through Wi-Fi, which may be a meshed version of Wi-Fi such as using IEEE 802.11s. A mobile wireless routing entity (402) with a live IP connection to an addressed entity (403) may be modeled as a backbone router or access point (105) in a wireless sensor network (100).

In FIG. 4A, a beacon is transmitted, including time synchronization information (420), generally corresponding to a process called discovery (210). As described with FIGS. 3A and 3F, discovery (210) may involve a cluster being discovered (CBD) (302) transmitting a beacon (325, 335) with time synchronization information, and reception of that beacon (325, 335) by a discovering cluster (DC) (301). A DC (301) and/or CBD (302) may each comprise one or multiple wireless devices. Relating FIG. 4A to FIGS. 3A and 3F, a wireless field entity (401) may be configured as a DC (301) and/or CBD (302); that is, a wireless field entity (401) may receive and/or transmit a beacon (325, 335) that may include time synchronization information. Similarly, a wireless routing entity (402) may be configured as a DC (301) and/or CBD (302).

After discovery (210, 420), a temporary schedule of timeslots may be established (422), to be used for communication between the wireless field entity (401) and the wireless routing entity (402). A communication schedule being established, messages containing payloads (410) may be transmitted (424) between the wireless field entity (401) and the wireless routing entity (402).

Messages containing payloads (410) from a wireless field entity (401) may be forwarded (426) by a wireless routing entity (402) toward one or more remote entities (403). Similarly, payloads (410) from an addressed entity (403) may be forwarded (426) by a wireless routing entity (402) toward one or more wireless field entities (401).

Time delays are illustrated in FIG. 4A, to indicate that the duration of a connection (424) between a wireless field entity (401) and a wireless routing entity (402) may not have sufficient time duration to allow for an end-to-end two-way interaction between the wireless field entity (401) and the addressed entity (403). When connection time does not allow for full two-way interactions, a response may be delayed to a subsequent connection, as illustrated in FIG. 4A.

In ISA100.11a and WirelessHART, a join process includes establishing symmetric cryptographic keys. The time and networking connections used to establish such keys can be a major impediment to mobile operation. In a mobile implementation herein, entities may be essentially "pre-joined", whereby cryptographic keys may be stored in the wireless field entity (401), to allow for a quickly established connection between a wireless field entity (401) and a wireless routing entity (402), especially in the absence of a real-time link from a wireless routing entity (402) to a security manager (104). For example, a data logger may arrive at a loading dock, where a stationary mesh network exists. If the data logger is pre-joined, it can discover an advertising router and then immediately report data through a proxy function in that router. Then, over a period of a minute or two, the device may survey the vicinity for other routers and then be fully integrated into the network.

A first symmetric cryptographic key (420k) may be used to authenticate and/or encrypt a beacon. A second symmetric cryptographic key (424k), which may be the same as the first symmetric cryptographic key, may be used to authenticate and/or encrypt messages exchanged between a wireless field entity (401) and a wireless routing entity (402). A third symmetric cryptographic key (410k) may be used to authenticate and/or encrypt payloads (410) exchanged between a wireless field entity (401) and an addressed entity (403). A fourth symmetric cryptographic key (422k), which may be the same as the first and/or second symmetric cryptographic key, may be used to authenticate and/or encrypt messages used to establish a timeslot communication schedule between a wireless field entity (401) and a wireless routing entity (402). Any or all of these keys (420k, 422k, 424k, and 410k) may be pre-loaded as appropriate (consistent with security policies) into the wireless field entity (401) and wireless routing entity (402) before beacon transmission (420), so that secure communication can proceed quickly after the beacon is received, with minimal setup overhead.

In ISA100.11a, in some implementations, a data link layer (DL) cryptographic key may cover the same function as the first symmetric cryptographic key (420k), second symmetric cryptographic key (424k), and fourth symmetric cryptographic key (422k), while a transport layer (TL) session key may cover the same function as the third symmetric cryptographic key (410k). ISA100.11a also has a join key to bootstrap the join process and a master key for key update. In WirelessHART, there are similar keys, with somewhat different layer semantics. All of these keys may be pre-loaded in a mobile device to enable secure communication whenever mobile devices and/or clusters with matching key sets come into proximity of each other, even without live access to a security manager (104).

Figure 4B:
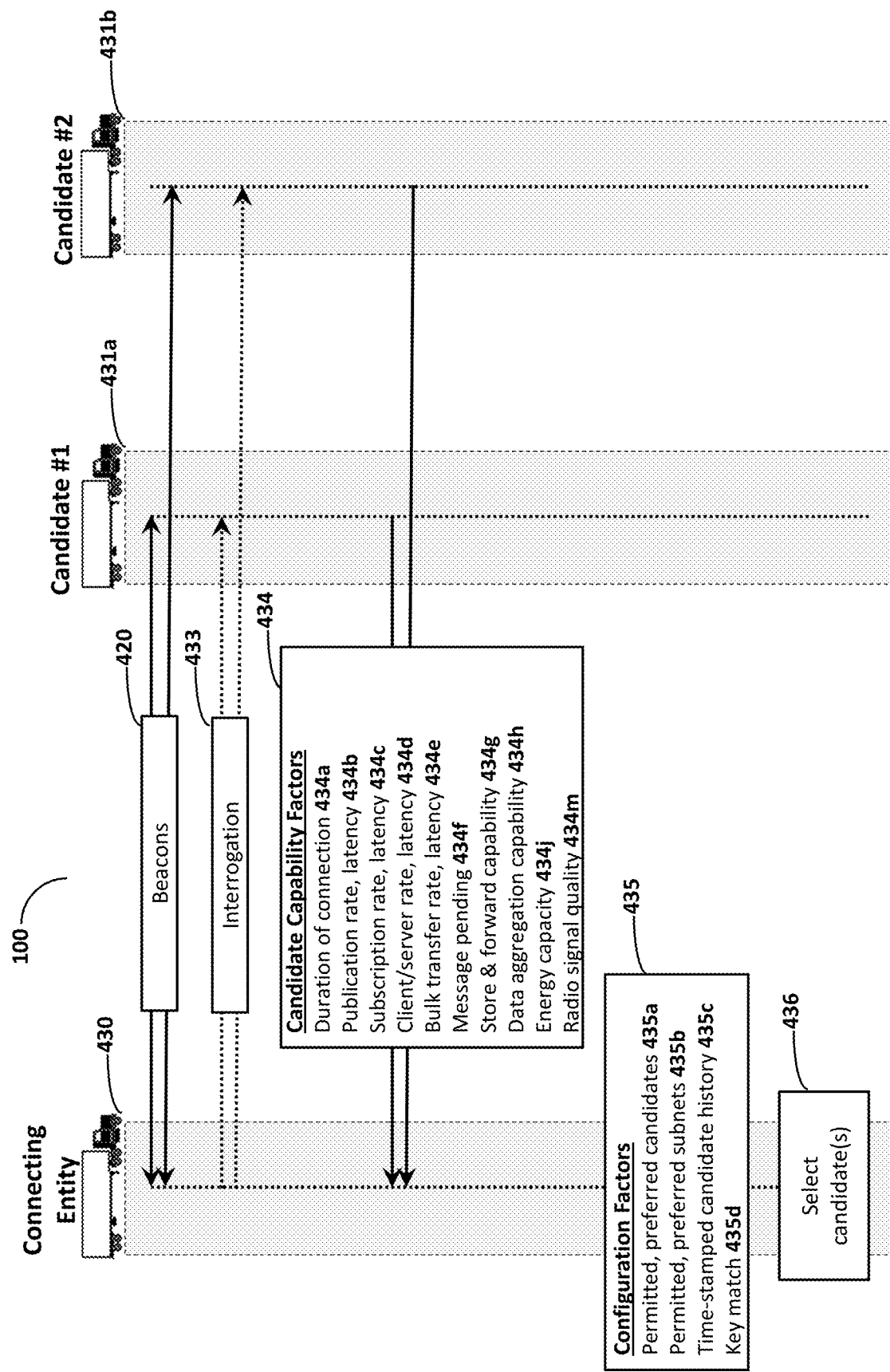
FIG. 4B is a diagram illustrating the selection of one or connection points by a connecting entity.

FIG. 4B illustrates the selection (436) of one or more connection points by a connecting entity (430) when there may be a choice among multiple candidate (431a, b) connection points. In a wireless sensor network (100), a connecting entity (430) may receive beacons from one or more candidates (431a, b). The connecting entity (430) and/or one or more of the candidates (431a, b) may be mobile. In some implementations, the connecting entity (430) may be a wireless field entity (401) and a candidate (431a, b) may be a wireless routing entity (402). In some implementations, a wireless routing entity (402) may act as a connecting entity (430), for example where a wireless field entity (401) is a cluster with multiple candidate (431a, b) connection points.

FIG. 4B indicates beacons (420) being transmitted or received by candidates (431a, b). The essential result of beacon (420) transmission or reception is that time is synchronized and that candidates (431a, b) are identified to the connecting entity (430).

Candidate capability factors (434) may be individually or collectively considered by the connecting entity (430) in the selection (436) of candidates (431a, b), based on information received from candidates (431a, b). In some implementations, certain capability factors (434) may be transmitted in beacons (420). In some implementations, certain capability factors (434) may be transmitted by a candidate (431a, b) subsequent to beacon (420) transmission. In some implementations, certain capability factors (434) may be transmitted (434) by a candidate (431a, b) in response to an interrogation (433). In some implementations, certain capability factors (434) may be may be known by the connecting entity (430) from previous interactions between the connecting entity (430) and a candidate (431a, b). Capability factors (434) considered in the candidate selection (436) in an implementation may include some combination of: duration of connection (434a); publication data rate and/or latency (434b); subscription data rate and/or latency (434c); client/server data rate and/or latency (434d); bulk transfer rate and/or latency (434e); a message pending addressed to or through the connecting entity (434f); store and forward capacity (434g); data aggregation capacity (434h); energy capacity (434j); and radio signal quality (434m).

Duration of connection (434a) through a candidate connection (431a, b) may be considered in candidate selection (436). For example, if the nature of a candidate's (431a, b) mobility provides stable connections for about 60 seconds, an indicator of "60" may be transmitted in a beacon (420) or subsequently (434). A duration-of-connection (434a) indicator may take the form of a timer that decreases by a function, such as a linear countdown or an exponential decay. A duration-of-connection (434a) indicator may vary as a function of candidate (431a, b) motion or lack thereof, whereby a candidate (431a, b) in motion may report a more transient connection (i.e., fewer number of seconds) than a candidate (431a, b) that is stationary.

Supported publication rate and/or latency (434b) through a candidate (431a, b) may be considered in candidate selection (436). A publication level-of-service indicator may be used to report that routing of one-way publication through a candidate connection (431a, b) is supported. A publication level-of-service indicator may be designated as limited to a maximum number of publications, and/or for a limited period of time, and/or limited to a constrained periodicity, and/or reserved for messages above a certain a priority level, and/or other publication parameters. A publication level-of-service indicator may designate a latency to deliver each publication to an infrastructure device such as a gateway. A publication level-of-service indicator may include a schedule of timeslots that are available for transmission of such publications.

Supported subscription rate and/or latency (434c) through a candidate (431a, b) may be considered in candidate selection (436). A subscription level-of-service indicator may be used to report that routing of one-way subscription through a candidate connection (431a, b) is supported, i.e., that subscription data can be delivered to or through the connecting entity (430) through the candidate connection (431a, b). A subscription level-of-service indicator may be designated as limited to a maximum number of subscriptions, and/or for a limited period of time, and/or a limited to a constrained periodicity, and/or reserved for messages above a certain a priority level, and/or other subscription parameters. A subscription level-of-service indicator may designate a latency to deliver each subscription from an infrastructure device such as a gateway. A subscription level-of-service indicator may include a schedule of timeslots that are available for reception of such subscriptions.

Supported client/server message rate and/or latency (434d) through a candidate (431a, b) may be considered in candidate selection (436). A client/server level-of-service indicator may be used to report that client/server routing through a candidate connection (431a, b) is supported. A client/server level-of-service indicator may be designated as limited to a maximum number of messages, and/or for a limited period of time, and/or a limited to a constrained periodicity, and/or reserved for messages above a certain a priority level, and/or other client/server parameters. A client/server level-of-service indicator may designate a latency to deliver each message to an infrastructure device such as a gateway, and receive a response. A client/server level-of-service indicator may include a schedule of timeslots that are available for transmission and reception of client/server messages. Client/server support through a candidate connection (431a, b) may be designated as covering transactions wherein the addressed entity (403) is a server, such as for alerts. Client/server support through a candidate connection (431a, b) may be designated as covering transactions wherein the addressed entity (403) is a client, such as (in ISA100.11a) for stack configuration messages to a field device's DMAP (device management application) or application configuration messages to a field device's UAP (user application process).

Supported bulk transfer rate and/or latency (434e) through a candidate (431a, b) may be considered in candidate selection (436). (In some implementations, bulk transfer support may be modeled as a client/server capability. For example, in ISA100.11a, bulk transfer is supported through the Upload/Download Object that uses client/server services.) A bulk-transfer level-of-service indicator may be used to report that bulk transfer routing through a candidate connection (431a, b) is supported. A bulk-transfer level-of-service indicator may be designated as limited to a maximum number of messages per time period and/or per bulk transfer, and/or a limited number of bulk transfers, and/or for a limited period of time, and/or a limited to a constrained periodicity, and/or reserved for messages above a certain a priority level, and/or other bulk transfer parameters. A bulk-transfer level-of-service indicator may designate a latency to deliver constituent messages to an infrastructure device such as a gateway and receive response(s). A bulk-transfer level-of-service indicator may include a schedule of timeslots that are available for transmission and reception of bulk-transfer messages. Bulk transfer support through a candidate connection (431a, b) may be designated as covering transfers where the addressed entity (403) is a server, such as for download of firmware upgrades. Bulk transfer support through a candidate connection (431a, b) may be designated as covering transfers where the addressed entity (403) is a client, such as for upload of waveforms or time series.

A message pending (434f) indicator from a candidate (431a, b) may be considered in candidate selection (436). A message may be pending in the memory of a candidate (431a, b), addressed to or potentially routed through a connecting entity (430). A message pending indicator may broadcast such as in a beacon (420), and/or may be unicast to a connecting entity (430), and/or may be provided in response to an interrogation (433).

Supported store-and-forward (434g) capability through a candidate (431a, b) may be considered in candidate selection (436). A store-and-forward level-of-service indicator may be used to report that store-and-forward routing through a candidate connection (431a, b) is supported. A store-and-forward level-of-service indicator may be designated as limited to a maximum number of messages, and/or for a limited period of time, and/or a limited to a constrained periodicity, and/or reserved for messages above a certain a priority level, and/or other store-and-forward parameters. A store-and-forward level-of-service indicator may designate a latency to deliver each message to an infrastructure device such as a gateway and receive a response. A store-and-forward level-of-service indicator may include a schedule of timeslots that are available for transmission and reception of store-and-forward messages.

Supported data aggregation (434h) capability through a candidate (431a, b) may be considered in candidate selection (436). A data-aggregation level-of-service indicator may be used to report that data aggregation through a candidate connection (431a, b) is supported. A data-aggregation level-of-service indicator may be designated as limited to a maximum number of messages, and/or for a limited period of time, and/or a limited to a constrained periodicity, and/or reserved for messages above a certain a priority level, and/or other store-and-forward parameters. A data-aggregation level-of-service indicator may designate a latency to deliver each message to an infrastructure device such as a gateway and receive a response. A data-aggregation level-of-service indicator may include a schedule of timeslots that are available for transmission and reception of store-and-forward messages.

Available energy capacity (434j) of a candidate (431a, b) may be considered in candidate selection (436). A candidate (431a, b) consumes energy when called upon to provide networking services to devices such as a connecting entity (430). Level-of-service indicators (434a-h) described above should account for the candidate's (431a, b) energy capacity to deliver such services. In addition, as a matter of good network citizenship, a connecting entity should, in some implementations, favor candidates (431a, b) that have energy to spare for such activities, with particular preference, in some implementations, for devices with unlimited and continuous energy sources.

Radio signal quality (434m) between a candidate (431a, b) and connecting entity (430) may be considered in candidate selection (436). Radio signal quality (434m) may be derived from radio diagnostics applied to beacons (420) and other messages received from a candidate 431a, b) by a connecting entity (430). A candidate (431a, b) may report radio signal quality (434m) of a message received from a connecting entity (430), for example indicated in an acknowledgement.

Configuration factors (435) may be individually or collectively considered by the connecting entity (430) in the selection (436) of candidates (431a, b), based on information previously existing in the device, such as from a system manager (103) or security manager (104).

Configuration factors considered in the candidate selection (436) in an implementation may include some combination of: permitted and/or preferred candidates (435a); permitted and/or preferred subnets (435b); time-stamped candidate history (435c); and key match (434d).

A connecting entity (430) may be configured with a list of addresses of permitted and/or preferred candidates (435a).

A connecting entity (430) may be configured with a list and/or bit mask of preferred and/or permitted networks or subnets (435b).

A connecting entity (430) may maintain a time-stamped candidate history (435c), which may be a list of addresses of candidates (431a, b) that the connecting entity (430) has successfully used in the past.

A connecting entity (430) may ascertain key matches (435d) with a candidate. As noted previously, cryptographic authentication of a beacon (420) indicates matching cryptographic keys. If other key matches are needed for the intended interaction, such as for data aggregation, test messages may be exchanged using cryptographic hashes or similar techniques.

Candidate selection (436) may involve a connecting entity (430) that may encounter different subnets and/or networks at various locations. In some implementations, a connecting entity (430) may join each network at each location, but that could involve substantial latency on joining and use live access to a security manager (104). A join executed at multiple locations may also involve access to the connecting entity's (430) join key from multiple locations. Widespread duplication and transmission of a join key may compromise security and may also constitute a management challenge.

In some implementations, a connecting entity (430) may be pre joined to every network that it might encounter. For example, when a particular connecting entity (430) device might encounter three networks, it may be joined simultaneously to all three, which may be a reasonable approach for a connecting entity (430) that has a somewhat limited range of motion.

In some implementations, an entire system may be mapped as a single wireless sensor network (100) and/or subnet across multiple sites. The IP backbone of ISA100.11a might be the Internet itself.

Figure 4C:
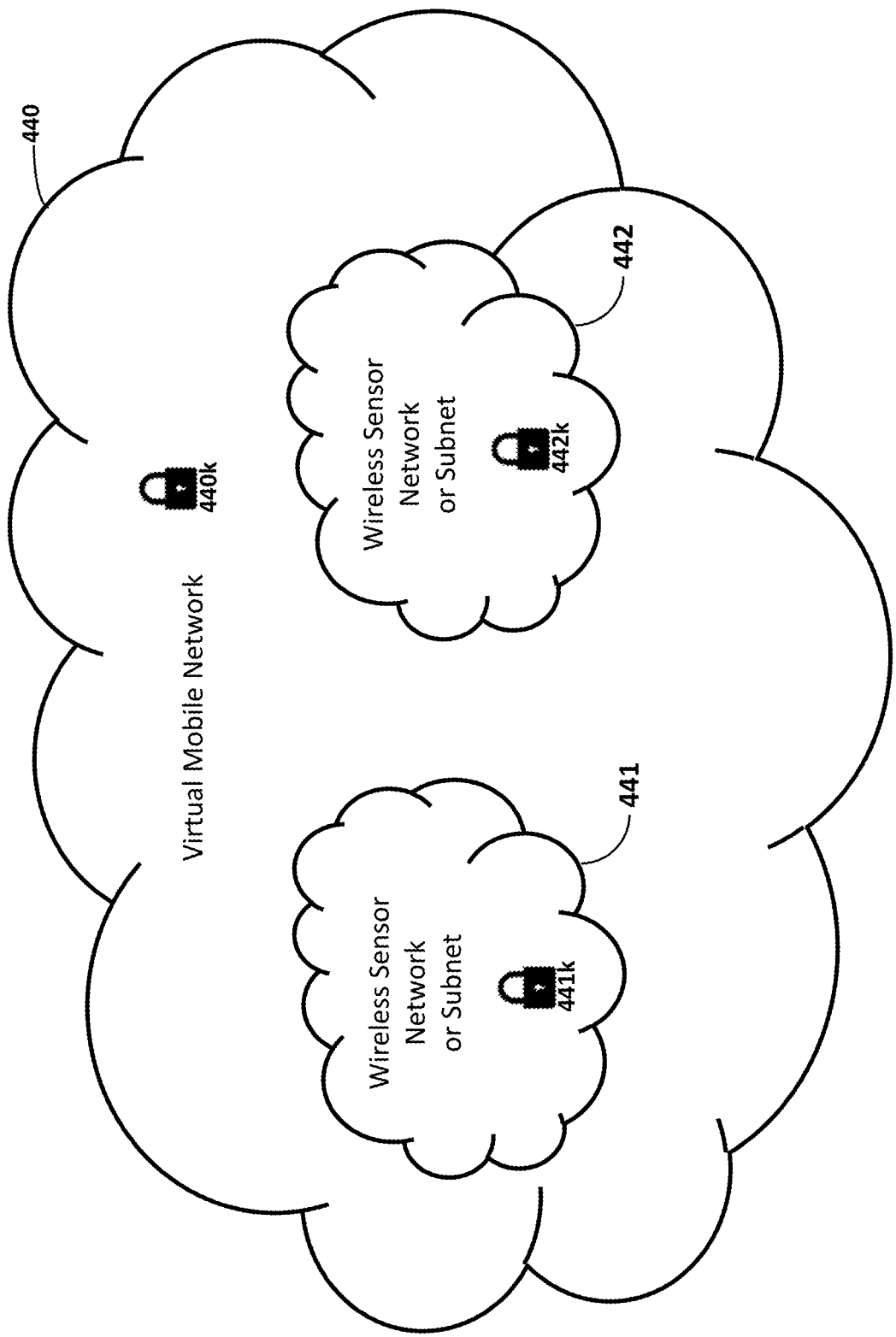
FIG. 4C is a diagram illustrating a virtual mobile network.

In some implementations, a mobile connecting entity (430) may be "pre-joined" to a virtual mobile network (VMN), (440) as illustrated in FIG. 4C. Each wireless sensor network or subnet (441, 442) may operate independently, each with its own set of keys (441k, 442k).

Simultaneously, wireless field entities (401) and wireless routing entities (402) may be configured with symmetric cryptographic key material (440k) for a VMN (440). A connecting entity (430), acting as a wireless field entity (401) or wireless routing entity (402), may come into range of a wireless sensor network or subnet (441, 442) with matching symmetric cryptographic key material (440k) for the VMN (440). Using symmetric cryptographic key material (440k) for the VMN (440), the connecting entity (430) may establish temporary connections to a wireless sensor network or subnet (441, 442) in mobile scenarios.

In some implementations, a VMN's (440) symmetric cryptographic key material (440k) may be configured in one or more wireless field entities (401) and one or more wireless routing entities (402). When a wireless field entity (401) receives a beacon (420) from a wireless routing entity (402), or vice versa, a cryptographic authentication code may use a network- or subnet-specific symmetric cryptographic key (441k, 442k) that may not be known to the wireless field entity (401). The wireless field entity (401) may interrogate the wireless routing entity (402) to ascertain whether the wireless routing entity (402) is a member of the VMN. The interrogation may use a designated cryptographic key identifier and a cryptographic authentication code that matches symmetric cryptographic key material (440k) of the VMN (440). The wireless routing entity (402), if in the VMN (440), may respond with a message, such as a beacon (420), with a cryptographic authentication code that uses the VMN's (440) symmetric cryptographic key material (440k). (MAC addresses or similar device identification information, which may be needed for nonce construction, may be exchanged as part of the interrogation and response.) Matching symmetric cryptographic key material (440k) being established, the wireless field entity (401) may consider the wireless routing entity (402) to be a candidate for providing temporary communication services.

In some implementations, end-to-end keys (410k) may be withheld from wireless routing entities (402) that have access to lower-layer VMN (440) symmetric cryptographic key material (440k), so that payload (410) between a wireless field entity (401) and an addressed entity (403) may be securely routed data through a wireless routing entity (402) that is not "trusted" with end-to-end keys (410k).

Figure 4D:
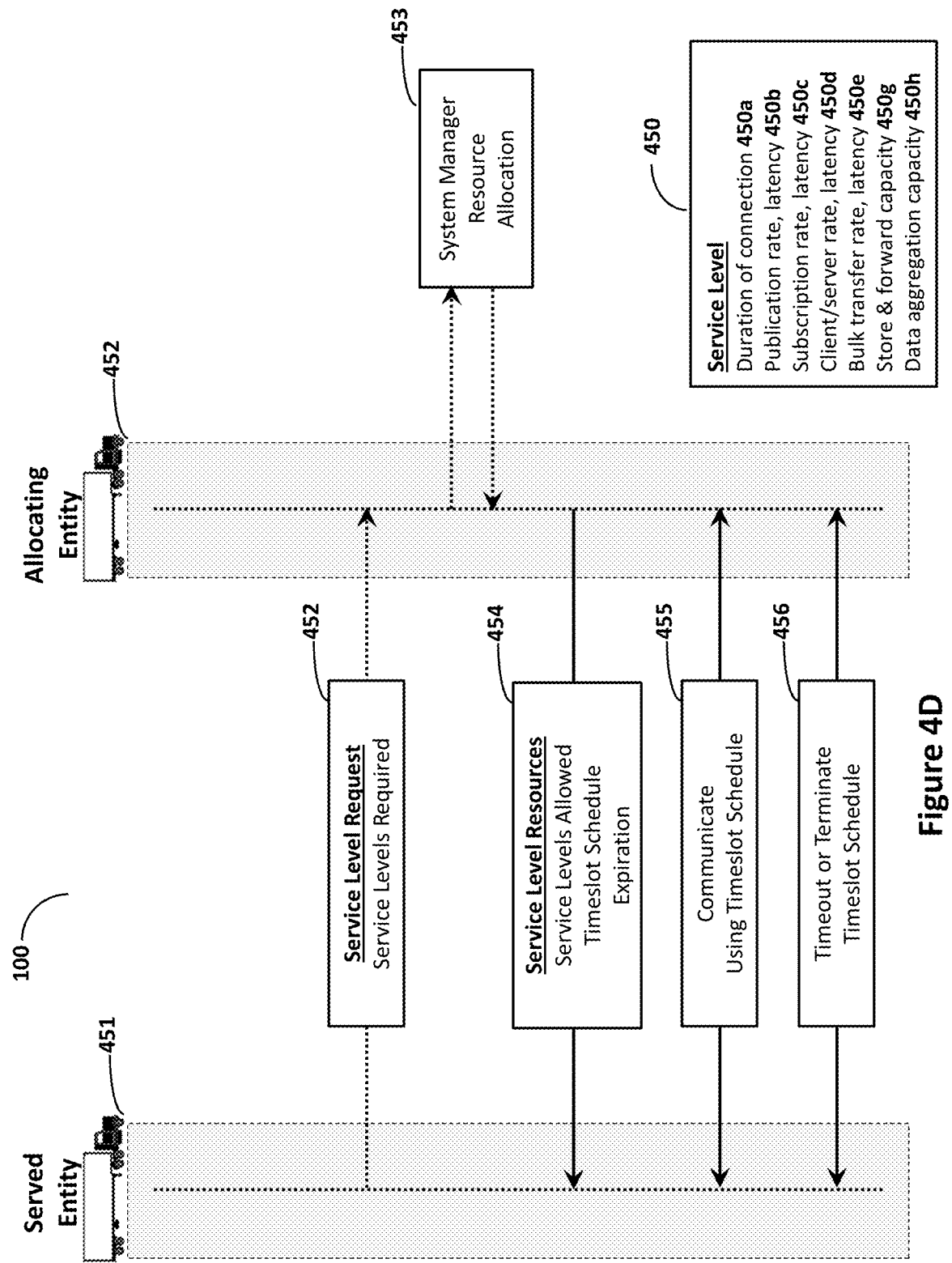
FIG. 4D is a diagram illustrating the establishment of a timeslot schedule to temporarily support a service level.
Figure 4E:
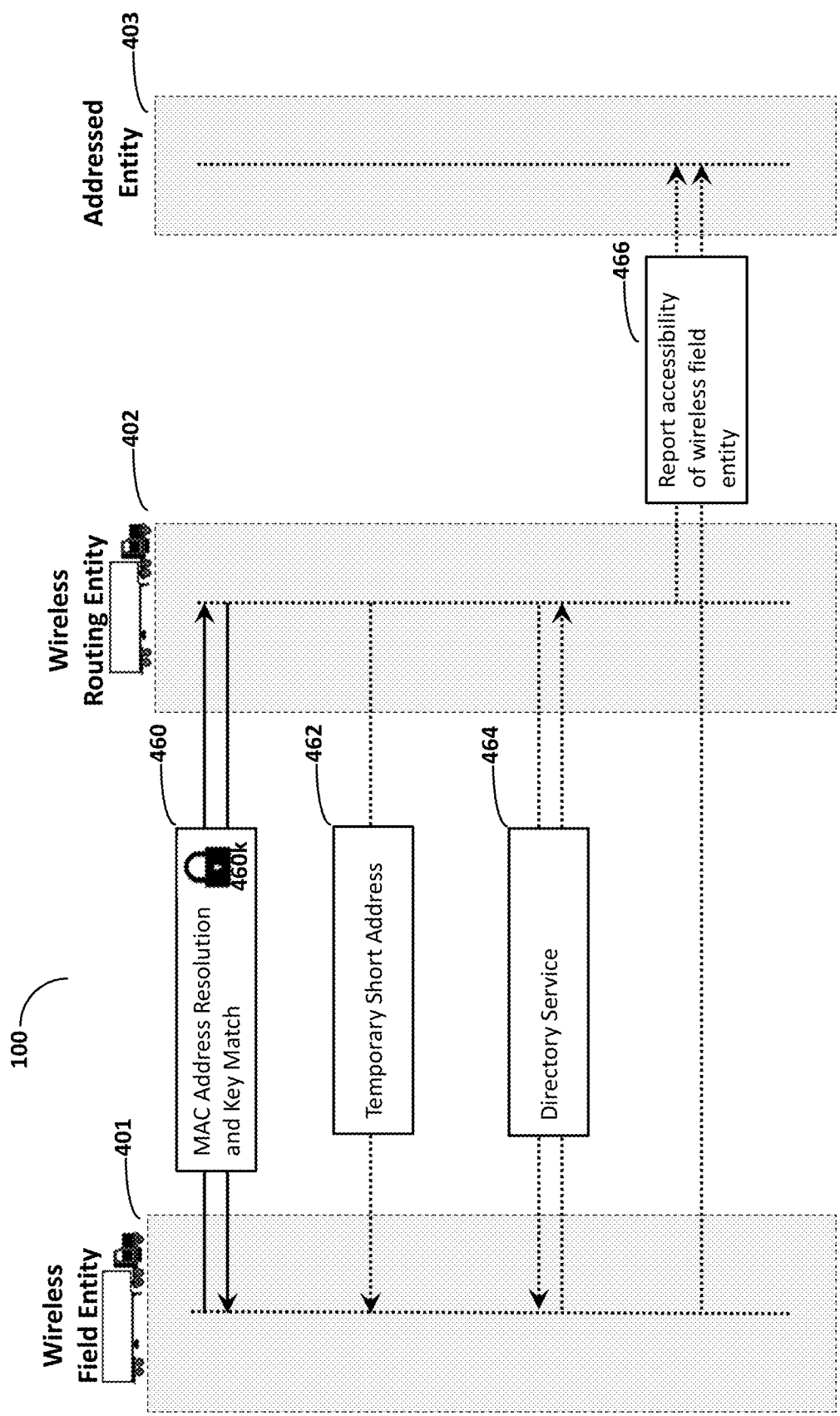
FIG. 4E is a diagram illustrating address resolution.

FIG. 4D illustrates establishment of a timeslot schedule to support temporarily a service level (450) between a served entity (451) and an allocating entity (452), subsequent to or in conjunction with candidate selection (FIG. 4B, 436). In some implementations, a served entity (451) in FIG. 4D may correspond to a connecting entity (430) in FIG. 4B. In some implementations, an allocating entity (451) in FIG. 4D may correspond to a connecting entity (430) in FIG. 4B.

A served entity (451) may request a service level (450) that may include duration of connection (450a, as described with 434a), and/or publication rate and/or latency (450b, as described with 434b), and/or subscription rate and/or latency (450c, as described with 434c), and/or client/server rate and/or latency (450d, as described with 434d), and/or bulk transfer rate and/or latency (450e, as described with 434e), and/or store and forward capacity (450g, as described with 434g), and/or data aggregation capacity (450h, as described with 434h). A served entity (451) may request a service level (450) with a service level request (452). A service level (450) requirement may be inferred from a candidate selection process such as illustrated in FIG. 4B wherein capability factors (434) are indicated. A service level (450) requirement may be inferred from previous interactions. A service level (450) requirement may be inferred based on device types.

An allocating entity (452) may be given authority for channel capacity including a set of time slots and autonomously allocate a portion of that channel capacity and resources for communication between a served entity (451) and an allocating entity (452). An allocating entity (452) may interact with a system manger (103) to allocate channel capacity and resources (453) for communication between a served entity (451) and an allocating entity (452).

Service level resources (454) may be communicated from an allocating entity (452) to a served entity (451). Service level resources may include service levels (450) allowed, and/or a schedule of timeslots for communication, and/or an expiration timer. Service level resources (454) may be communicated as a description of timeslots, such as indexes to designated superframe and/or link structures. Service level resources (454) may be communicated as one or more indexes into a lookup table. A schedule of timeslots being established, communication (455) between a served entity (451) and an allocating entity (452) may proceed using the timeslot schedule. The timeslot schedule may expire (456) due to passage of time or be terminated by messages received by a served entity (451) or an allocating entity (452). Termination of a timeslot schedule (456) may be indicated with a NACK that may be at the link layer. Termination of a timeslot schedule (456) may be triggered by device behavior indicative of a security fault. Termination of a timeslot schedule (456) may be triggered by higher priority requirements, such as a higher priority service level request (452). Termination of a timeslot schedule (456) may be triggered by management messages from a system manager (103).

In ISA100.11a, each device has a unique 64-bit MAC address that is assigned to the radio. The 64-bit MAC address is factory-assigned as a globally unique identifier for a device's entire existence and is also used in the security nonce for all secure messages originating from the device.

In ISA100.11a, each device also has one or more 128-bit addresses (long address) that are assigned when the device joins a network. The long address is used for IP addressing on a backbone. In ISA100.11a, wireless packets have a limited length, and therefore a 16-bit alias or short address is used for wireless communications. In ISA100.11a, a short address is assigned per subnet, and each subnet has a limited address space of about 32,000 unique 16-bit addresses.

FIG. 4E illustrates address resolution in a wireless sensor network (100) involving mobile elements. The principles may apply to any pair of wireless entities, one or both of which may be mobile, that needs to establish addressing for temporary communication. For clarity, the principles are illustrated for the case of a wireless field entity (401), a wireless routing entity (402), and an addressed entity (403), but the roles may be reversed. For example, a temporary short address is shown as provided by a wireless routing entity (402) to a wireless field entity (401). In some implementations, the reverse may occur, with a temporary short address provided by a wireless field entity (401) to a wireless routing entity (402).

In conjunction with establishing a key match (435*b*), MAC address resolution may occur (460). In ISA100.11a, the receiver of a secure message needs to have a matching key and also a matching MAC address for nonce construction. While the key is secret, the MAC address is generally not considered a secret and may be transmitted without being encrypted. The MAC address resolution and key match (460) functions may be efficiently accomplished by: first, initiated by the wireless field entity (401), transmitting a secure message from a wireless field entity (401) to a wireless routing entity (402), with the wireless field entity's (401) MAC address in the message's header or payload, with the message authenticated using a shared key (460*k*); second, the wireless routing entity (402) receiving and authenticating the message and then responding with an acknowledgement secured by the same key (460*k*) and including the wireless routing entity's (402) MAC address in the acknowledgement's header or payload; third, the wireless field entity (401) receiving and authenticating the acknowledgement. The MAC address resolution and key match (460) procedure as described may be initiated by any wireless entity on a wireless sensor network (100), with the receiving wireless entity responding with an acknowledgement.

It may then be necessary to establish temporary short addresses (462) to be used by the wireless field entity (401), with addresses corresponding to itself (401), a wireless routing entity (402), and an addressed entity (403).

In ISA100.11a, the short address of a wireless routing entity (402) is communicated as the source address in the header of a beacon (420).

An addressed entity (403), such as a system manager (103) or a gateway (106), may be assigned a fixed short address to be used on all subnets that a wireless field entity (401) might encounter. When a short address of an addressed entity is fixed, that short address may be stored in a wireless field entity (401) in addition to other fixed information about the addressed entity (403), such as MAC address, 128-bit address, symmetric cryptographic keys, and tag. (Special storage may be used in some implementations for key material.) When an addressed entity's (403) short addresses is not fixed, a directory service (464) may be interrogated in a wireless routing device (402) or through a wireless routing device (402) to determine a short address for an addressed entity (403) based on a long address or a MAC address.

A wireless field entity (401) may be assigned a fixed short address on all subnets that the wireless field entity (401) might encounter, potentially creating a management challenge if there are many wireless field entities (401) and/or many subnets. In a system with many devices, there may be more mobile devices (401) than available short addresses, so a fixed short address for every mobile device may be infeasible. In some implementations, a wireless field device's short address may be temporarily assigned, with an expiration time, for the duration of a subnet interaction involving a mobile device, and that temporary address assignment may be communicated, expired, and/or terminated in conjunction with temporary assignment of communication resources (454). A set of short addresses may be allocated to a wireless routing entity (402), enabling the wireless routing entity (402) to autonomously assign those addresses to wireless field devices for temporary use.

Following successful completion of address resolution (FIG. 4E), the accessibility of a wireless field entity may be reported to an addressed entity (466). The report (466) may originate from by the wireless field entity (401) and/or from the wireless routing entity (402). The addressed entity (403) may then address messages to the wireless field entity (401), routed through the wireless routing entity (402).

One important case is where temporary addressing (FIG. 4E) and temporary communication resources (FIG. 4D) are established between a wireless field entity (401) and a wireless routing entity (402), and the wireless routing entity (402) can route messages to and from an addressed entity (403). We have shown how to establish a quick, temporary connection between the wireless field entity (401) and the wireless routing entity (403). Further optimizations allow for routing between a wireless field entity (401) and an addressed entity (403) through a wireless routing entity (402) with minimal re-configuration of the network (100). Essentially, the network routes such messages between the wireless routing entity (402) and the addressed entity (403), using existing network routing tables and configurations between those two points. The wireless routing entity (402) then handles the edge connection with the wireless field entity (401), without a need to re-configure the rest of the network in support of a temporary connection.

For messages addressed from a wireless field entity (401) to an infrastructure device such as a gateway (106), a default route to the backbone may be reserved. For example, in ISA100.11a, a graph number may be reserved on all subnets all messages that need to be routed to the nearest access point. All messages addressed from the wireless field entity (401) to a gateway (106) or system manager (103) may be so routed, by designating a reserved graph number in the message's header.

For greater generality, messages addressed from a wireless field entity (401) to any addressed entity (403) may be source-routed to the wireless routing entity (402), which is one hop away. The wireless routing entity (402) may then route the message as it would its own messages with the addressed entity (403) as a destination address. In the case of ISA100.11a, the wireless routing entity (402) may set the message's DROUT sub-header based on tables configured in the wireless routing entity (402), based on the address of the addressed entity (403) and other considerations as defined in ISA100.11a.

A similar approach may be used for routing of messages addressed from an addressed entity (403) to a wireless field entity (401). In the process of address resolution (FIG. 4E), an addressed entity (403) may be informed (466) that a wireless field entity (401) is accessible by routing messages to a wireless routing entity (402). A wireless routing entity (402), when receiving a message from an addressed entity (403) addressed to a wireless field entity (401), may then forward the message to a neighboring wireless field entity (401).

Data Exchange

There are various configurations and situations wherein a Wireless Sensor Network Router (WSN Router) will be unable to offer a low latency connection to a backbone network, system manager, gateway, or another ultimate destination for messages. Similarly, a network might be unable to offer a low-latency connection from a message source to a wireless field device (WFD), or between WFDs. To support network configurations of that kind, an intermittently connected WFD may communicate with a store-and-forward surrogate (S&F Surrogate) in a WSN Router. An S&F Surrogate may receive a message (or message set or message fragment) and may forward it, immediately or after a delay, to its intended destination or to another S&F Surrogate along the path toward the message's intended destination. If there is a delay in transmission, for example if a neighbor is not available for forwarding the message immediately, the message may be stored in an S&F buffer until the message may be forwarded. For example, consider the case of a mobile data logger with an archive of historical data and only brief intermittent connections to a WSN Router. A WSN Router, in turn, may be unable to provide an immediate and direct connection to a message's destination such as a gateway. In circumstances wherein a message can be transferred to a WSN Router but not immediately forwarded, a message may be transferred quickly to an S&F Surrogate in the WSN Router, where the message may be stored and subsequently forwarded to toward the message's destination.

Some similar concepts have been explored in delay tolerant networks (DTNs), but without essential adjustments to account for particular characteristics of industrial wireless sensor networks and applications. DTNs, originally conceived for interplanetary communication, overcome some of the problems associated with intermittent connectivity, long or variable delays, mismatched network delays, asymmetric data rates, and high error rates by using store-and-forward message switching.

Figure 5A:
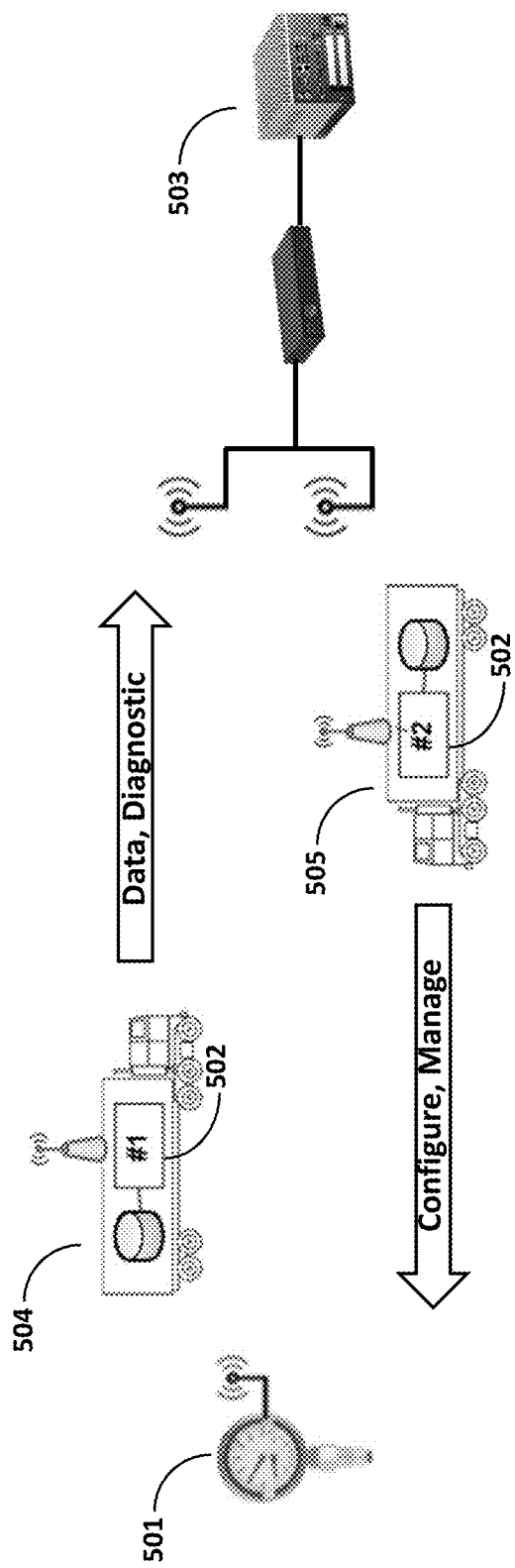
FIG. 5A is a diagram illustrating data flow in a configuration wherein vehicles are equipped with WSN Routers with store-and-forward capability.

FIG. 5A illustrates general data flow in a configuration wherein vehicles (504, 505) may be equipped with WSN Routers (502) with store-and-forward capability. A WFD (501), operating individually or in conjunction with a cluster, discovers, connects with, and exchanges messages with a WSN Router (502) conveyed by vehicle (504) that may periodically come into proximity. Subsequently, the WSN Router (502) discovers, connects with, and exchanges messages with a host system (503). The host system (503) is shown, as an example, comprising two wireless access points (105), a gateway (103, 104, 106), and a DCS. Data and diagnostics, such as sensor time series, waveforms, and device diagnostics, are shown as being conveyed from WFD (501) to host system (503), in a delay-tolerant manner through a mobile WSN Router (502). In the reverse direction, from host system (503) to WFD (501), the same vehicle or a different vehicle (505) may incorporate a WSN Router (502) that discovers, connects with, and exchanges messages with a host system (503). Subsequently, the WSN Router (502) discovers, connects with, and exchanges messages with a WFD (501). Configuration and management messages are indicated as flowing from host (503) to WFD (501), which may result in WFD (501) updates to cryptographic keys, data buffers, publication parameters such as period and phase, sensor and/or actuator function block configuration, exception reporting thresholds, and so forth.

Figure 5B:
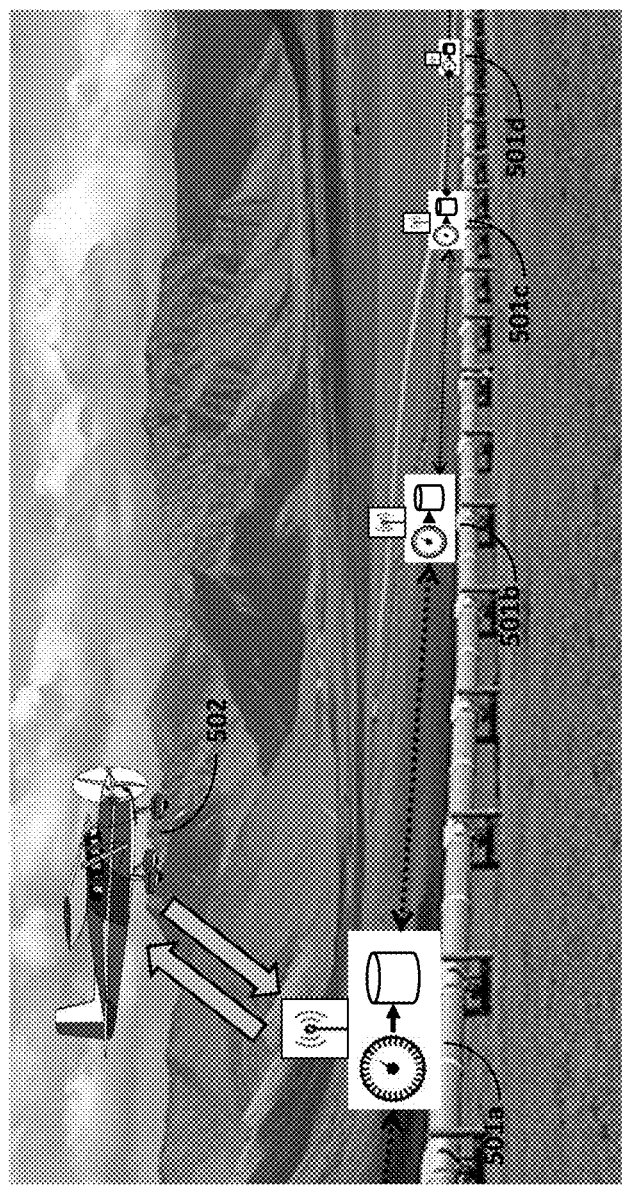
FIG. 5B is a diagram illustrating a configuration wherein WFDs on a pipeline form a mesh network cluster and wherein one or more WFDs may buffer messages from neighbors in a store-and-forward buffer, in addition to its own data.

FIG. 5B illustrates a configuration wherein WFDs (501a-501d) on a pipeline form a mesh network cluster and wherein each WFD (501a-501d) may buffer messages from its neighbors in a store-and-forward buffer, in addition to its own data. Some or all WFDs in the cluster may have such buffering capacity. When, periodically, mobile personnel, vehicle, aircraft, or equipment with an embedded WSN router (502) passes in range of a WFD (501a), the router (502) may connect and then quickly exchange messages to and from the WFD's (501a) store-and-forward buffer. Subsequently, that WFD (501a) may forward messages in its store-and-forward buffer that are addressed to other cluster participants (501b-501d).

Figure 5C:
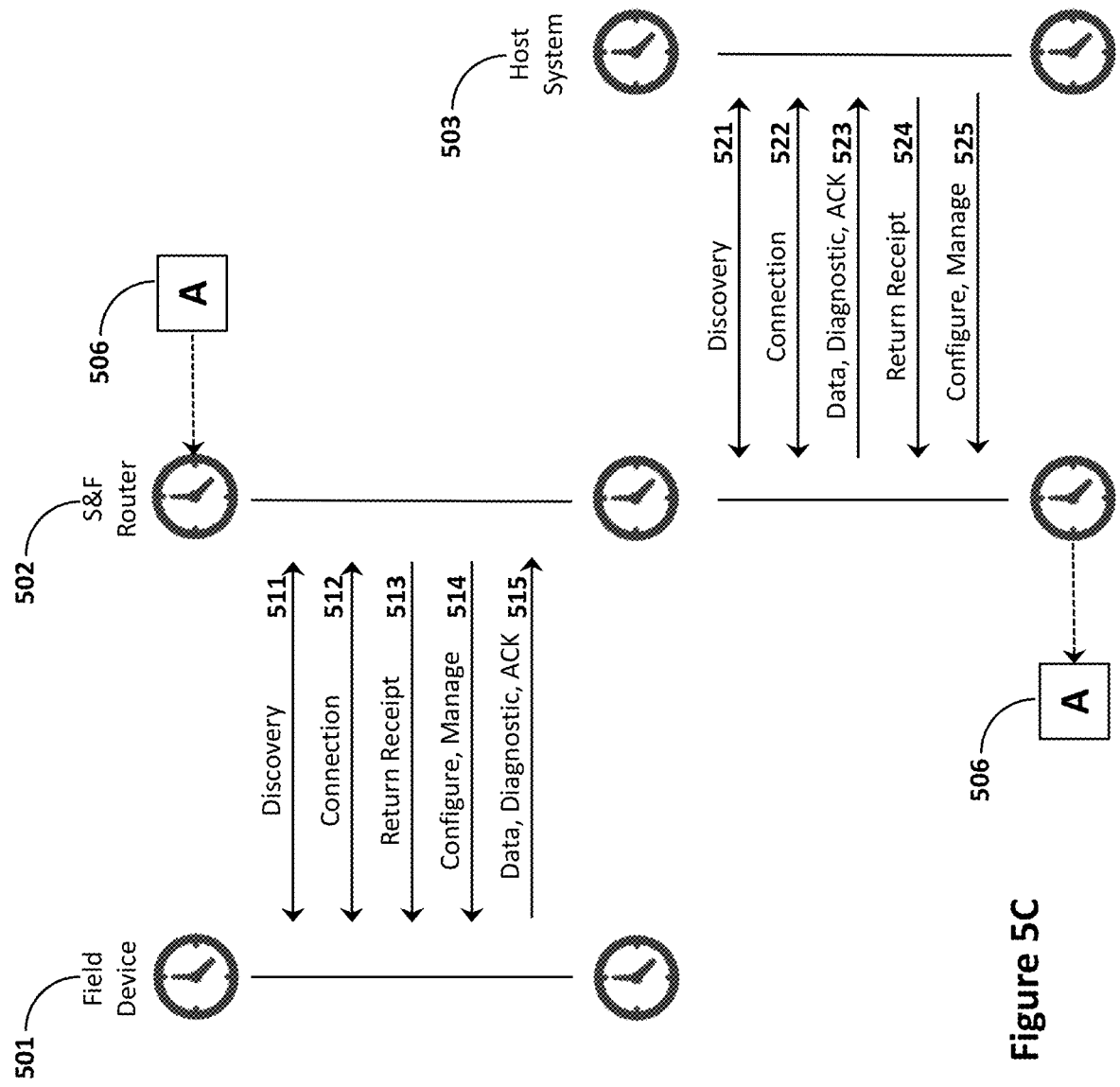
FIG. 5C is a diagram illustrating message forwarding interactions between a field device and a host system through a router.

FIG. 5C illustrates interactions between WFD (501) and WSN Router (502) and interactions at a different time, and potentially different location, between WSN Router (502) and Host System (503). Delay tolerant messages flow in both directions. Messages flow from WFD (501) toward Host System (503) in step 515 and then step 523. Messages flow from Host System (503) toward WFD (501) in steps 524, 525 and then steps 513, 514. The box labeled A (506) indicates two-way flow, for example as shown in FIG. 5A wherein one or more WSN Routers (502) may travel back and forth between WSN Field Device (501) and Host System (503).

When WFD (501) and WSN Router (502) may occasionally come within proximity of each other, a discovery process (511, corresponding to 210 and described in more detail in FIGS. 3A to 3M) may be executed. Discovery (511) is illustrated with a bi-directional arrow, indicating that discovery may be configured as any reasonable combination of active and passive scanning, with WFD (501) and/or WSN Router (502) acting as DC (301) and/or CBD (302) (see FIG. 3A), depending on a variety of system design considerations, such as energy availability of each entity.

WFD (501) and/or WSN Router (502) may be in motion prior to or during the discovery process (511) and subsequent interaction steps (512, 513, 514, 515). Similarly, when WSN Router (502) and Host System (503) may occasionally come within proximity of each other, a discovery process (521 corresponding to 210 and described in more detail in FIGS. 3A to 3M) may be executed, which may be different from the WFD-Router discovery process (511) due to radio differences, energy profiles, and other considerations. Discovery may be followed by a connection process (512, 521, corresponding to 211 in FIG. 2B).

The discovery (511, 521) and/or connection (512, 522) steps may be unnecessary in some configurations. For example, one purpose of a store-and-forward surrogate may be to buffer messages when one or both connections (512 and/or 522) are already established but latencies are long and/or mismatched. A mobile WFD (501) may quickly interact with the WSN Router (502) as shown (511, 512, 513, 514, 515). The WSN Router (502) may subsequently use an existing connection (522) to interact (523, 524, 525) with host system (503), but more slowly and possibly after the WFD (501) connection (512) is interrupted.

After a connection is established, messages may be read from and written to the WSN Router's (502) store-and-forward buffer. The operational sequence shown in FIG. 5C may provide certain advantages for wireless sensor network application.

In one illustrative WFD-Router interaction, message sets from the host (513, 514) may be received by the WFD (501) and processed prior to transmission of message sets (515) from the WFD (501) addressed to the host (503) through the WSN Router (502). A message set is a set of messages that are packaged and transmitted together. For example, ISA100.11a supports concatenation of APDUs, wherein multiple application payloads are concatenated into one message. A return receipt (513) from a previous transmission may acknowledge to the WFD (501) that particular previously transmitted message sets have been properly received and processed by the Host System (503) and the corresponding data need not be transmitted again. Configuration and management message sets (514) from the Host System (503), such as key updates, may alter the nature of transmitted data and/or include a request to transmit specific information. A store-and-forward buffer in a WSN Router's (502) may be managed more efficiently if message sets to the WFD (501) are transmitted and deleted before message sets from the WFD (501) are received and processed. Since message sets received and processed by a WFD (501) may, in some implementations, require some kind of response (indicated as "ACK" in 515), it may be more efficient to combine responses and buffered data into a single message set (515).

In some configurations, the WFD-Router (501-502) connection may be very transient, and for faster operation it may be reasonable to alter the sequence of interaction. For example, a WFD (501) may reasonably transmit a first store-and-forward message set containing data that the WFD may send regardless of message sets received, and then—if time allows—the WFD (501) may receive, process, and respond to incoming return receipts, configuration messages, and management message sets. A WFD (501) may first create and transmit a message set containing previously accumulated time series, alerts, and diagnostic data that have never been published before. Subsequently, the WFD (501) may receive and process incoming message sets (513, 514) including return receipts (513) from prior publications. If return receipts (513) indicate that the host (503) has not received certain prior publications, those publications may be transmitted again in an additional message set if time and resources reasonably allow. More generally, if a first message set is transmitted and information is subsequently received (or not received) that justifies transmission of an additional message set, a second message set may be created and transmitted as part of the same interaction. Sending a high-priority message set early in a transaction may be less efficient than sending one message set at the end of the interaction, but may be done in scenarios wherein the interaction may be interrupted by lost connectivity. Another justification for changing the order of interaction is in configurations wherein the WSN Router (502) has a high-latency connection to the Host System (503), in which case it may be desirable to place a first message set quickly into the WSN Router's (502) store-and-forward buffer so that forwarding by the WSN Router (502) may commence before the interaction is completed.

Similar principles may apply to a Router-Host interaction (523, 524, 525). When sufficient time is likely to be available, data from field devices (523) may be transmitted to and processed by the Host System (503), and subsequently responses (524) and/or configuration and/or management messages (525) may be transmitted from a Host System (503) to a Router (502). A Router-Host interaction with field-initiated messages (523) being transmitted before host-initiated messages (524, 525), as illustrated in FIG. 5C, may enable the host response (524, 525) to account fully for field information. In some configurations involving transient connections between router (502) and host (503), relatively urgent host-initiated messages may be transmitted to the WSN Router's (502) store-and-forward buffer before transmission of field information (523) is complete, thereby enabling high-priority host-initiated messages to be transmitted before the connection may be interrupted.

FIG. 5C indicates a single WSN Router (502) that interacts with a WFD (501) endpoint at one set of times and a Host System (503) endpoint at potentially different set of times. In some configurations, the communication paradigm illustrated in FIG. 5C may be used to transmit message sets between WFD (501) endpoints or between a WFD (501) endpoint and another endpoint entity that is not considered part of a Host System (503). A WSN Router (502) shown in FIG. 5C may actually be a series of store-and-forward routers that pass message sets, with or without transfer of custody, from point to point until they arrive at a destination endpoint.

Figure 5D:
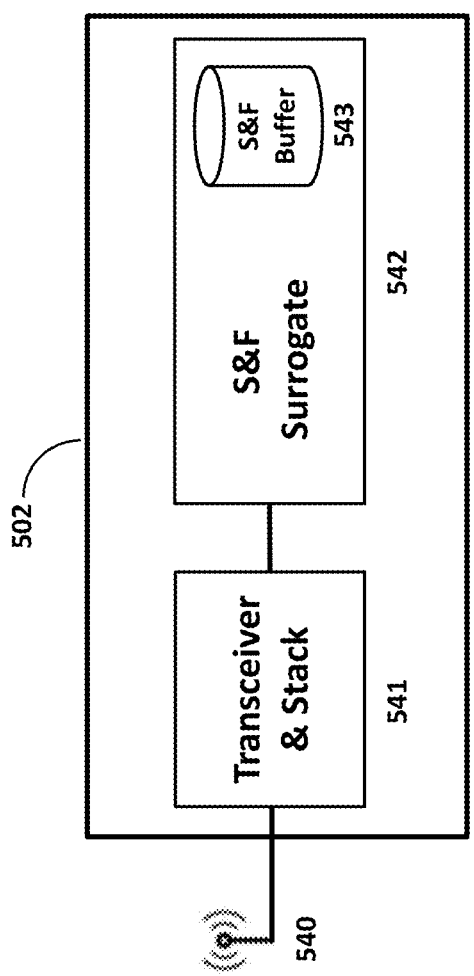
FIG. 5D is a diagram illustrating store-and-forward surrogate operations.

FIG. 5D illustrates a WSN Router (502) embodiment that supports store-and-forward (S&F) surrogate operations. A radio transceiver and stack (541) with an antenna subsystem (540) may perform transmission, reception, and routing of wireless sensor network protocol data units (PDUs). Such technology for a given wireless standard may be implemented as a surface mount module and/or as integrated transceiver chips with reference designs. Transceiver modules may or may not directly support S&F operations, which may occur at the application layer. A physical or logical S&F Surrogate subsystem (542) with an S&F storage buffer (543) is illustrated. Depending on the software architecture and hardware capabilities of the transceiver subsystem (541), a separate microprocessor with dedicated buffer storage may be used for the S&F Surrogate (542, 543) in some implementations. In some configurations, an S&F Surrogate (542) may share processing and/or storage resources with a transceiver and stack (541).

An S&F Surrogate (542) in a WSN Router (502) may be modeled as an OSI Layer 7 application, although the function may be accomplished in some implementations in other OSI stack layers of the stack, as will be shown. A WFD (501) may establish a wireless connection (512) with the WSN Router (502) for a brief period of time, followed by quick transmission of application data from the WFD (501) to an S&F Surrogate (542) in the WSN Router (502), wherein the data may be stored and then forwarded subsequently. Similarly, a network entity such as a gateway or system manager may need to send message sets to a particular WFD (501); the network entity may distribute copies of the message sets, for example as bundles, to all any or all WSN Routers (502) containing at least one S&F surrogate (542) that may come into contact with the WFD (501).

A WFD (501) may send data in a burst to an S&F Surrogate (542), where the data may be immediately stored and subsequently forwarded. A payload stored in an S&F Surrogate (542) may be cryptographically encrypted and authenticated so that the WSN Router (502) can store and forward the data without being established as a trusted intermediary. In some embodiments, a WSN Router (502) may be a cryptographically trusted intermediary, and a payload stored in an S&F Surrogate (542) may be viewed and/or modified by the S&F Surrogate (542). For example, in secure industrial applications, data aggregation may occur en route in configurations wherein the intermediaries are cryptographically trusted.

Similarly, a payload that is addressed to a mobile WFD (501) may be buffered in a WSN Router (502, 543), or duplicated in a collection of WSN Routers (502, 543), that are reasonably likely to connect (512) to the WFD (501). Data transfer to WFD (501) may occur immediately following WFD-Router connection (512), before the WFD connection is lost due to device movement or other factors.

A mobile WFD (501) configured for data logging may accumulate a substantial archive of data, such as time series and waveforms, which may be data collected by the WFD (501) and/or data from other devices (303) in a cluster (301, 302). When connected, the WFD (501) may, in some implementations, have only a brief period of time to transfer an archive of data to a WSN Router (502, 533).

In some configurations, such as when a WSN router (502) has a relatively high-speed connection established to a host (503), it may be reasonable to use the WSN router's (502) routing functions to convey messages to their ultimate destinations without involving an S&F Surrogate (542). In some configurations, data may be transferred as a block (such as a bundle) or multiple blocks from a WFD (501) to an S&F Surrogate (542), if available in the WSN Router (502), where the data is immediately stored (543) and subsequently forwarded.

In a mobile scenario, it may be necessary to establish a secure connection quickly between devices, so that essential data can be transferred in a potentially short period of time that the devices are in range of each other. One approach is to optimize the join process so that a device with essential data can quickly join the network. Especially in cases wherein the device reader is mobile and without a real-time connection to the system manager, joining the network can be problematic. For the general mobile case, it is reasonable to establish the notion of an untrusted proxy device, such as a mobile reader, that can store-and-forward confidential information to and from a device that may itself be mobile, and is modeled as already having joined the network.

A pre-existing secure relationship, such as a session, between a WFD (501) and another entity on the network may enable a message payload to be encrypted and/or authenticated securely. An S&F Surrogate (542) that stores (543) a payload does not necessarily need any particular security material in order to store and forward the message. That is, an S&F Surrogate (542) does not necessarily need to be "trusted".

An untrusted S&F Surrogate (542) may deliver key updates and other secure payload to a WFD (501). Consider the New_Key method (Table 84) in ISA100.11a-2011. (The same principles may be applied to other key updating functions.) A Security Manager or similar function may request that the New_Key method be sent to the WFD (501) the next time that it connects to a network entity. New_Key payload (Key_And_Policies) is encrypted and authenticated using keys (such as a master key) available to the payload's originator and ultimate recipient but not available to any intermediaries. Therefore, the secured payload may be safely duplicated on various S&F Surrogates (542) buffering the message (543) on any S&F Router (502) that is reasonably likely to come into contact with the WFD (501). When the WFD (501) connects (512) with one of these S&F Routers (502), a payload containing Key_And_Policies may be delivered (514) to the WFD (501). The WFD (501) may respond (515) with Key_Update_Status, which may be stored by an S&F Surrogate (542) and subsequently delivered to a system manager (103), which may in turn deliver the payload to a security manager (104). The security manager (104) may instruct the system manager (103) to delete the now-unnecessary copies of Key_And_Policies from various S&F Surrogates (542), or, in some implementations, allow the now-unnecessary copies of Key_And_Policies to time out and be deleted autonomously by the S&F Surrogates (542).

To generalize the principle described above for the example of a key update: payload to an S&F Surrogate (542) may be encrypted and/or authenticated at the source, transmitted to the S&F Surrogate (542) in that secure form, and subsequently forward in that secure font).

Application data, such as a time series log of analog input readings, may be transmitted from a WFD (501) to a neighboring WSN Router (502) with an S&F Surrogate (542) for subsequent delivery to a host system (503) entity such as a gateway. The application data payload, stored by the S&F Surrogate (542) in an S&F Buffer (543), may be encrypted and authenticated using a cryptographic key that allows for secure communication between the WFD (501) and the ultimate destination such as the host (503). Each application payload stored by the S&F Surrogate (542) may be encrypted and signed in a manner that is similar to TL security in ISA100.11a-2011, wherein a payload is encrypted and authenticated using a shared AES-128 key or alternative cipher. Similarly, secure messages from a host system (503) application or gateway to a WFD (501) application, such as a delayed return receipt for received data, may be buffered by the gateway on an S&F Surrogate (542) and then delivered to or transmitted toward its destination WFD (501) when a connection (211, 512) may be established.

A WSN Router (502) with an S&F Surrogate (542) may receive and forward time series data logs, such as historical process data, from one or more WFDs (501). Time series data may include periodic logs of process data, such as a temperature reading every 10 minutes. Time series data may include a time-stamped log of events, such as vibration above a threshold. Time series data may include detailed diagnostics such as vibration waveforms associated with events. Time series payload may be rapidly transmitted in an encrypted and/or authenticated message set to a WSN Router's (502) S&F Surrogate (542), where the time series payload may be stored for subsequent forwarding A WFD (501) application may not receive an immediate guarantee that the message set has been (or will be) transmitted to its ultimate destination address, so the time series data may reasonably be retained on the device. Eventually, and possibly via a different WSN Router (502), the WFD (501) may receive a return receipt (513) with confirmation or acknowledgement that a previously transmitted payload was securely received at its destination address, indicating that time series data transmitted in the previously transmitted payload may be deleted. When the WFD (501) connects to a WSN Router (502), it may first check for inbound messages (513, 514) the contents of which may include an acknowledgement that a previously transmitted payload was received, thereby enabling a WFD (501) to squelch or change the nature of what it reports. A return receipt (513) of a previously transmitted time series, received and processed by the WFD (501), may squelch transmission of corresponding archived information. A WFD (501) may be configured to delete time series data corresponding to a previous report when a corresponding return receipt (513) is received and processed by the WFD (501). The WFD (501) may then reasonably transmit time series data to the WSN Router (502, 542), with transmitted time series data corresponding to data that was archived subsequent to that time series data covered by a return receipt (513).

Security in some industrial wireless sensor networks, such as in ISA100.11a, assumes that application layer messages are received at their destination addresses within a few minutes of transmission. An assumption of delivery within a time frame enables protocols to use time as security material and provides some protection against replay attacks. For example, each TPDU (end-to-end transport layer message) in ISA100.11a is time-stamped with a compressed data structure that indicates the time of message transmission. In certain store-and-forward scenarios, message sets may be buffered for a substantial period of time, such as hours. When message propagation time can be measured in hours, time stamp information may involve less compression and/or different measures of time that allow for an extended transmission time. In some implementations, a simple counter may be used in a nonce as security material instead of time. Cryptographic challenges may be included in end-to-end application layer interactions to confirm that a session remains intact. In some implementations, an authenticated message response may confirm that a session remains intact.

Figure 5E:
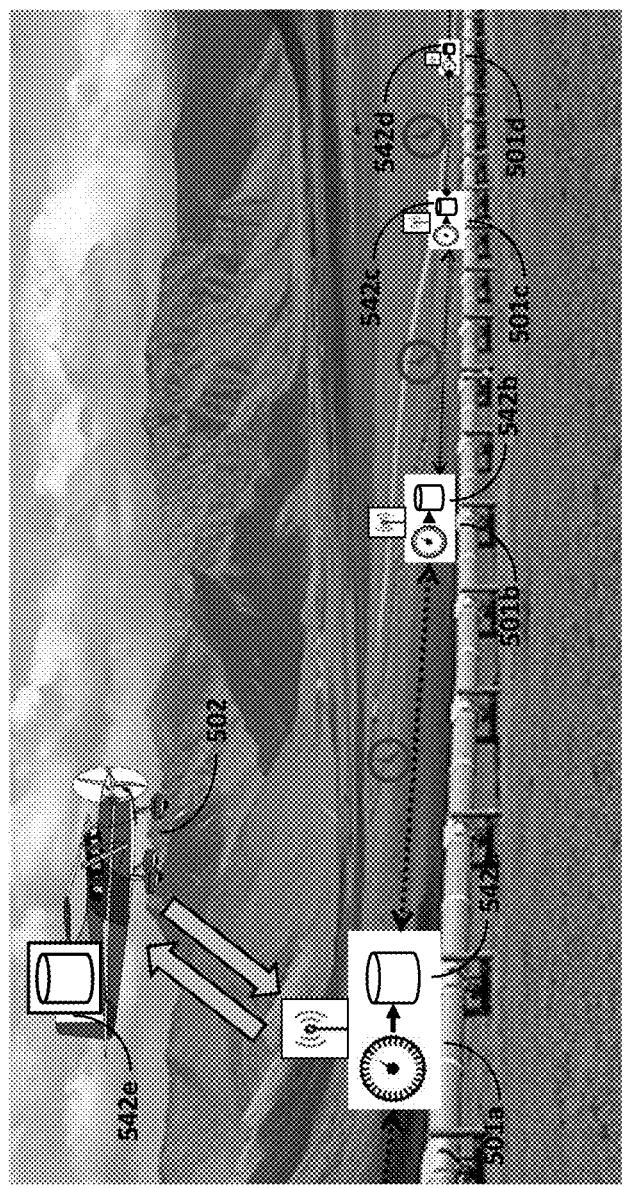
FIG. 5E is a diagram illustrating daisy-chaining of store-and-forward surrogates.

S&F Surrogates (542) may be daisy-chained. For example, as shown in FIG. 5E, a pipeline may have multiple WFDs (501*a*-501*d*) capable of WSN Routing that form a mesh network cluster. Several such WFDs (501) in a cluster (301, 302) acting as WSN Routers (502), may be configured to provide S&F Surrogates (542) that buffer (543) data on behalf of other devices in the cluster, as indicated by the storage elements illustrated in the WFDs (501*a*-501*d*) in FIG. 5B. When a mobile element (502) briefly connects with a particular WFD's (501*a*) S&F Surrogate (542*a*) in the cluster, message sets may be quickly exchanged between a S&F Surrogate (542*e*) in a mobile device (502) and a S&F Surrogate (542*a*) in a cluster's WFD (501*a*). (The WFD (501*a*) may, in some implementations, exchange messages with a WSN Router (502) on its own behalf) A S&F Surrogate (542*e*) in the mobile WSN Router (502) may then or subsequently convey its store-and-forward messages to a remote location, and the S&F Surrogate (542*a*) in the WFD (501*a*) may propagate received store-and-forward message sets to other WFDs (501*b*-501*d*) in the cluster.

The foregoing describes how data may be securely buffered and forwarded by an intermediary device. The same general techniques may be daisy-chained. For example, WFDs (501*a*-501*d*) in a cluster of devices, operating as a mesh, may buffer (543) a copy of data from multiple devices in the cluster. When, periodically, a WSN Router (502), which may be a mobile device, may connect to a WFD (501) in a cluster, buffered data may be quickly exchanged with the mobile's S&F Surrogate (542) on behalf of multiple WFDs (501) in the cluster. Message sets may be encrypted and/or authenticated by the devices that generate the data in the first place, with neighbors and other intermediaries acting as untrusted S&F Surrogates (542).

FIGS. 5F, 5G, 5H, 5I illustrate implementations of stack architectures in support of S&F Surrogates 542.

Figure 5G:
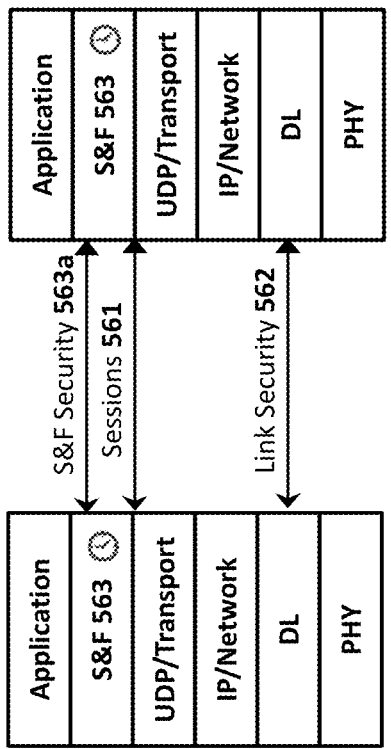
FIG. 5G is a diagram illustrating a stack architecture with added store-and-forward capability, in which the store-and-forward layer is placed above the UDP/transport layer.
Figure 5I:
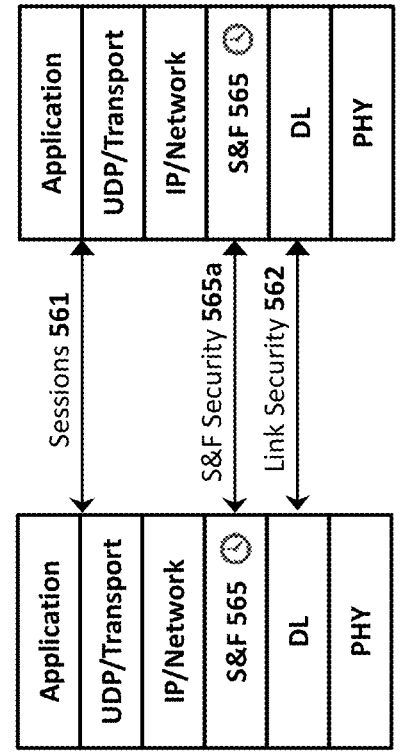
FIG. 5I is a diagram illustrating a stack architecture with added store-and-forward capability, in which the store-and-forward layer is placed below the IP/network layer.
Figure 5F:
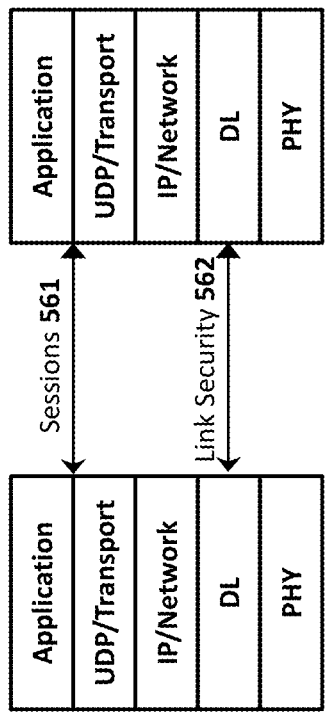
FIG. 5F is a diagram illustrating the ISA100.11a stack and security architecture.

FIG. 5F illustrates the ISA100.11a stack and security architecture, building upon IP OSI layer conventions. The data link layer (DL) integrates link layer security (562). In ISA100.11a-2011, link layer security is similar to MAC security in IEEE 802.15.4. In some implementations, link layer security may be adjusted when different physical layers are used, for example by building on Wi-Fi access point security when IEEE 802.11 radios are employed. End-to-end sessions (561) may be provided as a service that is more or less transparent to applications at the endpoints. In ISA100.11a, sessions can be thought of as a thin layer between UDP and the application, as drawn in FIG. 5F. In the case of ISA100.11a, two AES-128 keys symmetric keys are utilized: one group key at the DL level (562) and one pairwise key at the session level (561). WirelessHART security is functionally similar, but with layers and semantics defined somewhat differently.

Figure 5H:
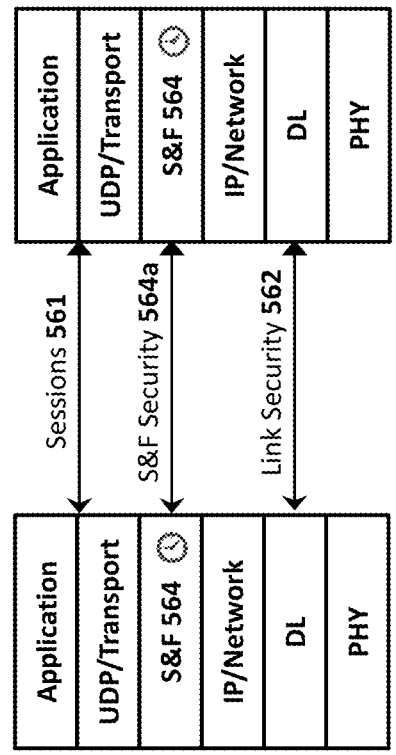
FIG. 5H is a diagram illustrating a stack architecture with added store-and-forward capability, in which the store-and-forward layer is placed below the UDP/transport layer and above the IP/network layer.

FIGS. 5G, 5H, 5I illustrate some ways to introduce store-and-forward capability into a stack architecture. In each of these examples, an S&F (store-and-forward) layer is introduced, shown modeled as a separate layer, although in fact the function may be modeled in some implementations as an extension to or function of an existing layer. The S&F layer performs the function of an S&F Surrogate. In FIGS. 5G, 5H, 5I, message sets are modeled as being constructed at the originating node and passed down the stack to the S&F layer. Message sets are then propagated from point-to-point through the S&F layer until arriving at their ultimate destination, where the message sets are reconstructed to their original form by the S&F layer and then passed upward to the next higher layer in the communication stack. In all of these examples, the S&F layer is shown as an add-on that can be absent or deactivated in devices, systems, or configurations wherein the S&F capability is not needed, without adjusting the OSI stack model into which the S&F layer is embedded.

In FIG. 5G, an S&F layer (563) is illustrated above UDP. This placement allows for blocks of data that may be larger than the underlying UDP packets. S&F stack placement (563) in FIG. 5G enables the S&F function to span non-homogeneous networks. Placement of this functionality above the communication stack may literally be specified as a new S&F layer (563), as shown, or in some implementations it may be specified as an application layer service, similar to the way that join proxies are arranged in ISA100.11a-2011. In FIG. 5G, security at the transport layer (561) and below (562), when available, may not provide end-to-end security assurances in a FIG. 5G configuration. Therefore, a third S&F Security (563*a*) process is shown associated with its corresponding S&F layer (563).

In FIGS. 5H, 5I, an S&F layer (564, 565) is illustrated below the transport layer (UDP), in one case (FIG. 5H) above the network layer (IP) and in the other case (FIG. 5I) below the network layer (IP). The representations in FIGS. 5H, 5I are not intended to exclude configurations wherein an S&F function (564, 565) is integrated into the transport, network, or data link layers. For example, in FIG. 5I an S&F layer (565) is illustrated above the data link layer (DL), but in some implementations an S&F (565) may be integrated into the DL, particularly in "mesh under IP" designs such as ISA100.11a-2011 and RFC4944, wherein the wireless mesh is modeled as a single IP hop. In each of the configurations FIGS. 5H, 5I, the S&F function (564, 565) benefits from end-to-end session security (561) at a higher layer. A third level of S&F Security (564*a*, 565*a*) may be useful in some implementations, as discussed subsequently.

In stack configurations wherein the S&F layer is below an end-to-end session (561) in a stack, such as is illustrated in FIGS. 5H, 5I, individual message sets may be limited to a size that fits within transport layer transactions, such as APDUs (Application Protocol Data Units) concatenated within a single TPDU (Transport Protocol Data Unit). In some implementations, message sets may use an upload/download, bulk transfer, or similar service that is available at the application layer, handling segmentation for the application and relying on security at lower layers.

In configurations wherein a WSN Router (502) performs the function of an S&F Surrogate (542) on behalf of a WFD (501), a transient S&F Security relationship may be established directly between the WFD (501) and the WSN Router (502). Message sets that flow through an S&F Surrogate (542) may be encrypted and/or authenticated using keys that are shared by the endpoints and not rely on whatever security may be established between the WFD (501) and the WSN Router (502). In some implementations, a secure relationship may exist at the S&F Surrogate level of the stack, between a WFD (501) and WSN Router (502), or between two WSN Routers (502) containing S&F Surrogates (542).

S&F Surrogates (542) may operate below UDP (Layer 4) in ISA100.11a, as illustrated in FIGS. 5H, 5I, with the message sets being conveyed within UDP packets. In such a configuration, communication to and from S&F Surrogates may be protected by whatever security protects wireless links below Layer 4, such as IEEE 802.15.4 MAC security or Wi-Fi access point security. A special layer of security may be added at the S&F level, re-using lower layer keys such as data link layer keys, or using special S&F keys shared among pairs or groups of devices.

In some implementations, S&F Surrogates (542) may operate above UDP in ISA100.11a, for example as illustrated in FIG. 5G. In such a configuration. S&F Surrogate (542) pairs may use sessions between UDP endpoints (from the UDP point of view). As illustrated in FIG. 5G, a supplementary level of end-to-end security (563a) may be associated with an S&F layer or function (563). Security for interactions between the WFD (501) and WSN Router (502) (or between WSN Routers (502)) may rely entirely on security provided by the DL and/or may use session layer (561) and/or S&F layer security services (563a, 564a, 565a) using a DL key. In some embodiments, it may be possible for a given DL key to apply to a pair of devices, or to all connections with a particular device, a cluster of devices, or other topological entities. Dedicated S&F layer (561, 563a, 564a, 565a) keys may be pre-loaded into device pairs for use in security services. In some implementations, a WSN Router (502) may support a relatively high-performance connection to a security manager, and a new key procedure (Table 84 in ISA100.11a-2011, or an analog) may be used to deliver a temporary key to both sides of an S&F interaction, so that a shared key may be used to secure the transmissions between S&F Surrogates.

Figure 5J:
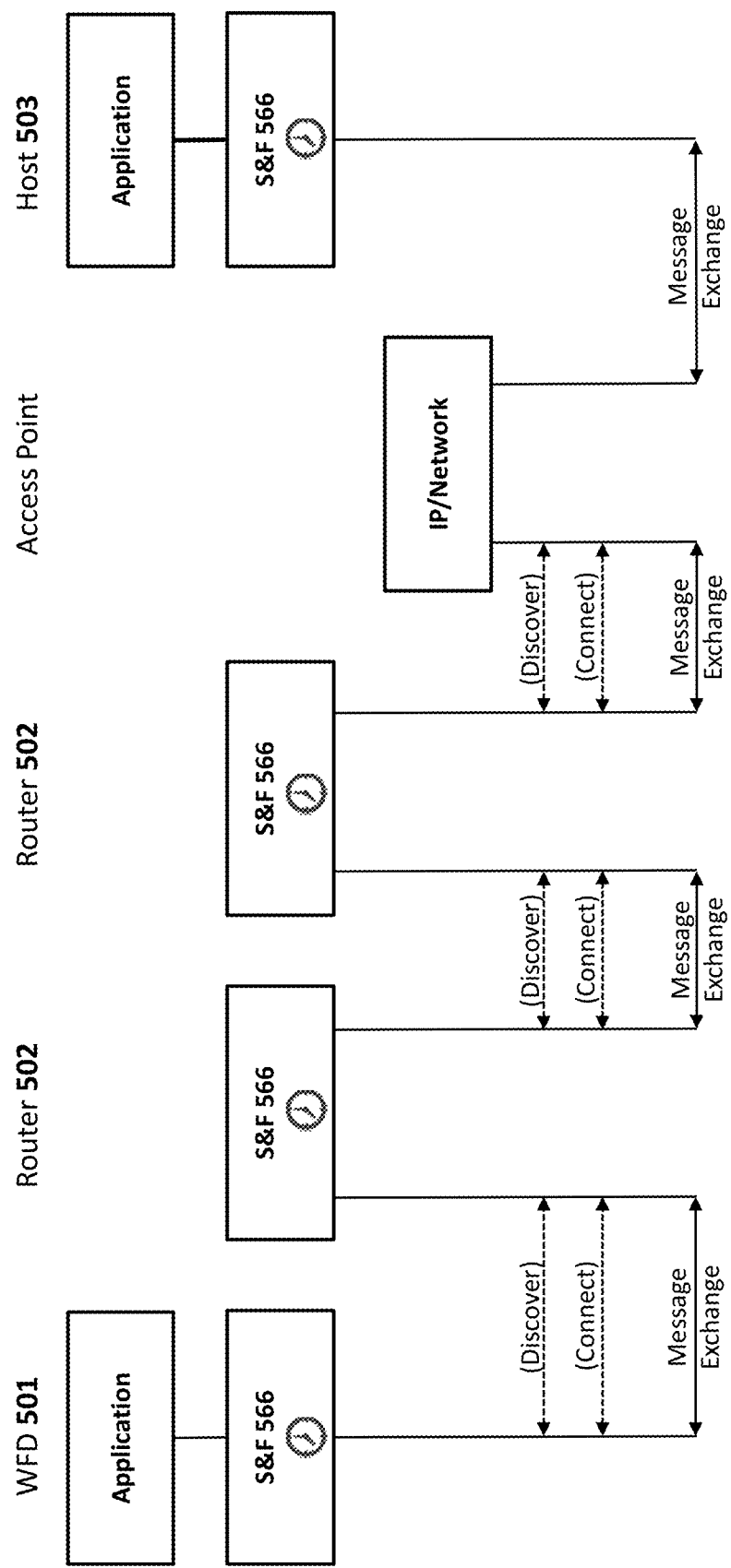
FIG. 5J is a diagram illustrating message exchange through a stack architecture between devices that serve a store-and-forward surrogate function.

FIG. 5J illustrates how messages may be exchanged between devices that serve an S&F Surrogate (542) function and whose stack architecture therefore includes an S&F layer. Message sets may flow from one device to another through each device's S&F layer (566). Message exchange as illustrated in FIG. 5J may be used with various stack architectures, including those shown in FIGS. 5F, 5G, 5H, 5I.

S&F layer security (563a, 564a, 565a) may involve establishing shared credentials between devices such as a shared AES-128 symmetric key. In conjunction with a connection process (512, 522), a first device may use a second device's master key to establish new keys for an interaction between the first device and second device. In some implementations, the only copies of the master key are in a single device and in the security manager; so for security reasons and for simple and fast operation, in some implementations, the system may be configured so that S&F layer security builds on credentials that pre-exist in the devices involved.

ISA100.11a-2011 and other standards include the notion of a cryptographic key identifier. Within each device, there may be an actual or virtual lookup table of cryptographic keys, with a cryptographic key identifier being essentially an index into that table. Each transmission may include a cryptographic key identifier, either implicitly from context or explicitly as a header field. An S&F Surrogate (542) containing an S&F layer and/or function (563, 564, 565) may have in memory a list of available keys that it may use for transient sessions. A neighboring device may query the S&F Surrogate (542) for a key, providing its own EUI-64 (when needed for a nonce, and if not already known by the surrogate), a challenge, and (optionally) a list of available cryptographic key identifiers. A MIC from a lower layer may be used as a challenge. The S&F Surrogate (542) may respond with its own EUI-64 (when needed for a nonce, and if not already known by the neighbor), a list of one or a selection of available cryptographic key identifiers, and a hash for each such cryptographic key identifier. If the neighboring device can regenerate one of the hashes with its key corresponding to the cryptographic key identifier, then the keys match and it may acknowledge a key match with a hash so that the S&F Surrogate (542) may confirm key match. This or another credential-matching function may operate at any reasonable layer of the stack, such as the application layer, not necessarily the layer corresponding to the S&F layer. A credential-matching function may operate in conjunction with a discovery process (511, 521) or connection process (512, 522).

In support of S&F layer security, essential data for each S&F message set as shown in FIG. 5L may include:

EUI-64 581 or similar information of the device initiating the S&F message, for use in an S&F security nonce.

Timestamp, counter, or other value 582 that is unique over the life of a given key in combination with the originating EUI-64, transmitted with the message set. In some implementations, unique value information may be transmitted in compressed form or elided, accounting for shared context of the entities.

Cryptographic key identifier 583, for selection of the correct key.

Security level 584, when multiple security levels are supported. For example, IEEE 802.15.4 allows for 8 security levels: None, MIC-32, MIC-64, MIC-128, ENC-MIC-32, ENC-MIC-64, and ENC-MIC-128.

Payload 585, including a message set. All or part of a payload may be encrypted depending on the security level.

MIC 586, with number of bits determined implicitly or explicitly by the security level.

Certain fields, such as EUI-64, cryptographic key identifier, and/or security level, may be known a priori or established during the connection process, and so may be elided from the S&F message set transmission.

In ISA100.11a-2011 security, the TL timestamp has a resolution of $2^{-10}$ seconds and the nonce allows for a 32-bit timestamp, resulting in a key lifetime of about 48.5 days. In some mobile applications with infrequent device connections, it may not always be possible to replace keys in a 1-2 month period. To support such mobile scenarios, it may be reasonable to reduce the resolution of the timestamp, such as to $2^{-8}$ seconds. In some embodiments, there is a 0xff constant in the TL nonce that might be repurposed to provide additional time bits. (The 0xff constant is apparently intended to avoid the possibility of a nonce collision in the case wherein the DL and TL keys are identical. This byte could be used for other purposes in the proxy, if the system design does not use DL keys for proxy payloads.)

Each secure S&F layer or function (563, 564, 565) payload may need to retain its integrity when stored in an S&F Surrogate's (542) store-and-forward buffer (543). In some implementations, as an optimization, an S&F Surrogate (542) may concatenate payloads. Each message set may have an explicit or implicit source address and destination address. If multiple message sets are being forwarded to the same second S&F Surrogate (542), a first S&F Surrogate (542) may concatenate these message sets and transmit them together as a block. For example, a TPDU (transport layer data unit), NPDU (network layer data unit), or DPDU (data link layer data unit) originating at a first S&F Surrogate (563, 564, 565) may contain multiple message sets in its payload. For blocks that are larger than the capacity of a single PDU, a block transfer protocol may be used to minimize overhead, involving fragmentation or segmentation depending on the S&F Surrogate (563, 564, 565). The second S&F Surrogate (542) can subsequently receive payload and then divide the payload into its original constituent message sets and process them accordingly. Some constituent message sets may be addressed to particular applications (e.g., ports) within the same device as the second S&F Surrogate (542) and may be passed up the stack. Some constituent message sets may be addressed to different devices from the second S&F Surrogate (542), and as such they may be immediately routed or, in some configurations, placed into a store-and-forward buffer (543).

For example, a cluster of devices in a remote location may accumulate message sets from various devices in a store-and-forward buffer (543) in one or more designated portal devices. A portal device may include a Wi-Fi radio that can quickly transfer message sets in its store-and-forward buffer (543) to a remote S&F Surrogate (542) in a vehicle as it drives by. In this example, a block may be addressed from the S&F Surrogate (542) in the portal device to the S&F Surrogate (542) in the vehicle, but the constituent message sets within the block may be addressed from and/or to multiple devices. The message sets may then be placed in an S&F Buffer (543), to be forwarded toward their ultimate destination(s) when the vehicle in turn is in proximity to another S&F Surrogate (542) and/or an infrastructure connection such as an access point (105).

ISA100.11a-2011 and similar protocols may establish security on an end-to-end basis. The gateway (106) role may be "trusted" in the sense that security sessions terminate at the gateway and the data may be translated to another form by that intermediary. S&F Surrogates (542) may concatenate secure messages for reduced protocol overhead and faster transfer, but may lack security credentials to decode the payloads therein.

In sensor networks, data aggregation may involve combining data from multiple sources and processing the data into a different form. For example, data may be published from a device to an S&F Surrogate (542). If the Surrogate is essentially operating as an untrusted router, each message set should be buffered and forwarded with its full security fingerprint, without modifying the secured payload. In some implementations, the S&F Surrogate (542) may operate as a data aggregator, with data elements being accumulated in a compressed form as a time series, and/or data being accumulated incrementally over time based on a series of message sets received by the S&F Surrogate (542). Operation as an aggregator may involve trusting the S&F Surrogate (542) as an endpoint from a security point of view. In particular, an S&F Surrogate (542) operating at or near the application later, per FIG. 5G, may be provided with security credentials to act as a data aggregator.

On an a priori basis, a WSN Router (502) may be configured with a set of credentials to decrypt and/or validate payload contained within certain S&F layer message sets that it receives. Trust being so established, message sets may be stored in a compressed form in an S&F Buffer (543), for example as a time series that builds up over time based on the content of a sequence of message sets.

For remote clusters, a WFD (501) may use PKI (such as ECC) keys to form a secure relationship with one or more WSN Routers (502) in the cluster, and that secure relationship may be used to support data aggregation by an S&F Surrogate (542). A private key in the WFD (501) and a public key in the S&F Surrogate (542) may be used to establish (to the S&F Surrogate (542)) that the WFD (501) is a legitimate data source. The S&F Surrogate (542) may then supply a session key to the WFD (501) so that the WFD (501) may securely and efficiently send data to the S&F Surrogate (542). Similarly, a private key in an S&F Surrogate (542) and public key in a WFD (501) may identify the S&F Surrogate (542) as a trusted recipient for field data.

Remote Clusters

A set of wireless devices may be disconnected from a WSN (100) for an extended period of time. Each wireless device in the set may independently collect and archive time series data, and each wireless device may independently report time series data when the wireless device periodically comes into contact with a WSN (100). Each wireless device may connect with a WSN (100) and report the wireless device's data independently using the approaches outlined herein. In some implementations, various optimizations are available to devices that are operating in a cluster.

Figure 6A:
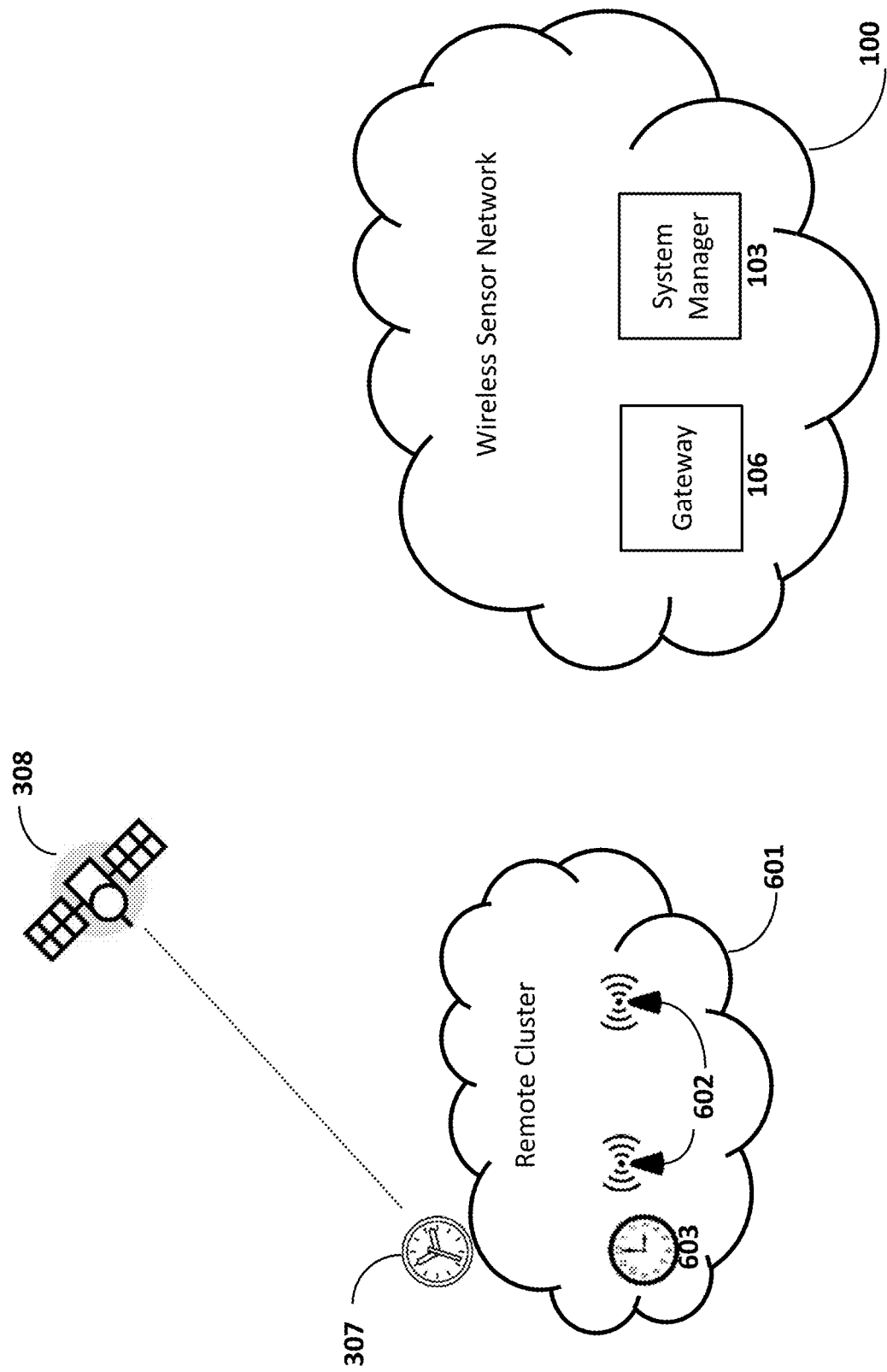
FIG. 6A is a diagram illustrating a remote cluster.

A remote cluster (601) is illustrated in FIG. 6A. A remote cluster (601) is a set of remote cluster participants (602) that can form and/or sustain radio interconnections and resource sharing for an extended period of time, in the absence of a connection to a remote WSN (100) entity such as a system manager (103) or a gateway (106). Remote cluster (601) services may include time services, routing services, proxy services, and gateway services.

A remote cluster (601) may maintain a coherent time (603) among remote cluster participants (602). Time updates may be propagated among remote cluster participants (602) through beacons (325) or other messages containing time synchronization information.

A remote cluster (601) may establish a coherent and accurate time (603) by configuring a remote cluster participant (602) to receive an accurate clock reference through a designated radio channel. For example, a GPS (308) receiver (307) integrated with a remote cluster participant (602) may enable the remote cluster participant (602) to track a global clock and to provide a clock update periodically to other remote cluster participants (602), such as by transmitting a beacon (325). In other implementations, a long-range receiver in a remote cluster participant (602) may be arranged to receive periodically clock updates from a distant time source.

A remote cluster (601) may establish a coherent time (603) by assigning a role of time master to a remote cluster participant (602) that is equipped with a stable clock. A time master may be equipped with a Temperature Compensated Crystal Oscillator (TCXO). While a time master's clock may be expected to drift slowly over time, a time master's clock may be used to keep the remote cluster (601) on an internally consistent time reference, for example by arranging for each remote cluster participant (602) to receive periodic beacons from a time master.

To enable discovery, a remote cluster (601) may be configured to operate as a DC (301), a CBD (302), or both.

Figure 6B:
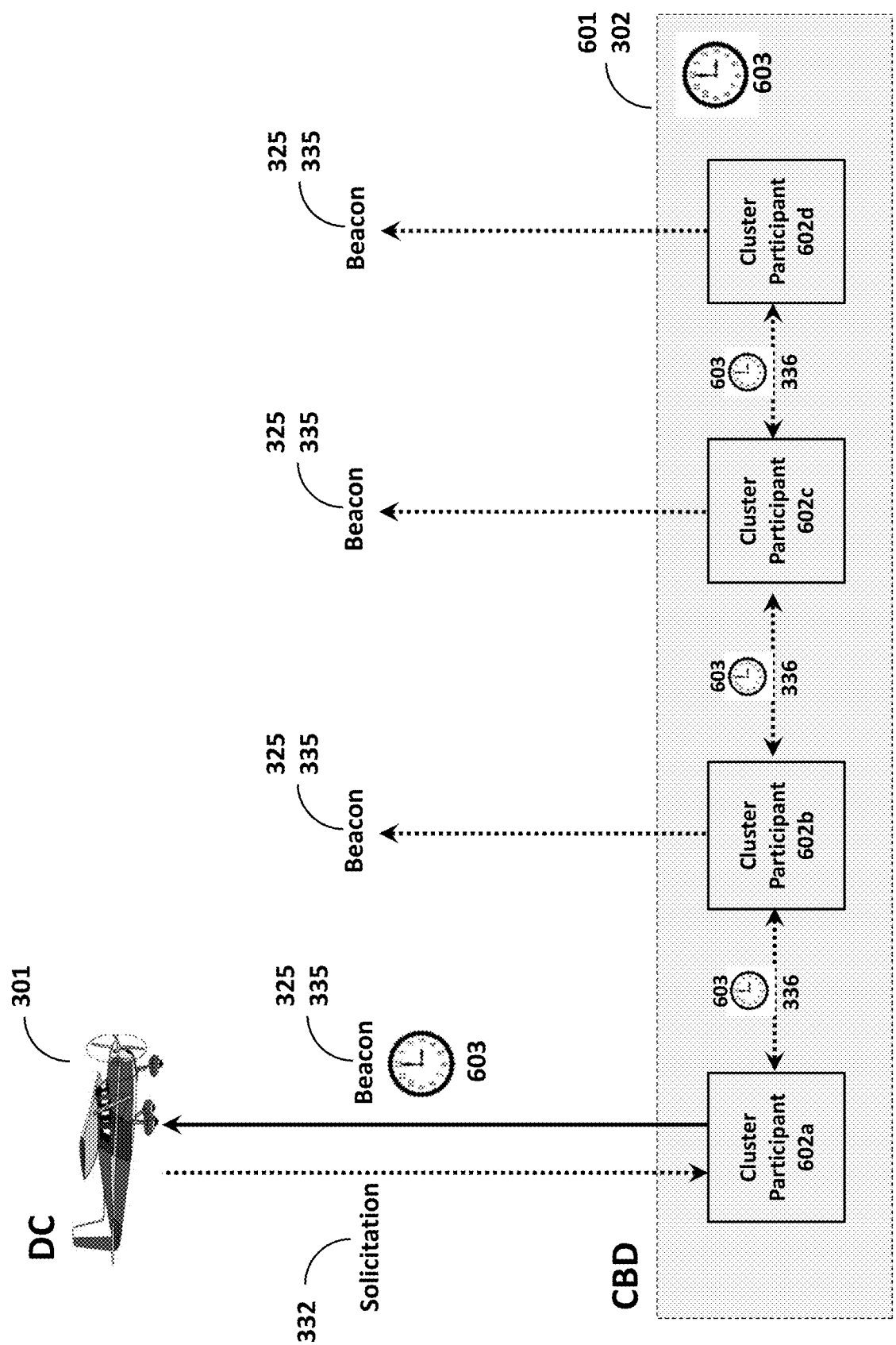
FIG. 6B is a diagram illustrating a remote cluster configured as a cluster being discovered.

A remote cluster (601) configured as a CBD (302) is illustrated in FIG. 6B. The remote cluster (601) may maintain a synchronized time (603) among cluster participants (602*a-d*). Cluster participants (602*a-d*) may exchange periodically CBD time synchronization (336) messages. A DC (301), illustrated as an aircraft flying from left to right, may periodically come into proximity of the remote cluster (601). The DC (301) may receive and process a beacon (325, 335) that includes a synchronized time (603) of the remote cluster (601). The beacon (325, 335) may also provide information that is indicative of an overall beaconing and/or scanning schedule for the remote cluster (601). The DC (301) may use active scanning (FIG. 3C) to discover cluster participants (602*a-d*), by transmitting a solicitation (332) and receiving one or more beacons (335) in response. The DC (301) may use passive scanning (FIG. 3B), and receive beacons (325, 335) transmitted by cluster participants (602*a-d*). Beacons (325) may be transmitted by the remote cluster (601) on a schedule. As illustrated, with the DC (301) traveling from left to right, a first beacon (325, 335) with remote cluster time (603) and other information may be received and processed by the DC (301). Based on information in the first beacon (325, 335), especially involving the remote cluster clock (603), the DC (301) may infer a beacon (325, 335) schedule for other cluster participants (602a-d) so that the DC (301) may quickly and efficiently discover other cluster participants (602b-d) as the DC (301) moves past and/or through the remote cluster (601).

Figure 6C:
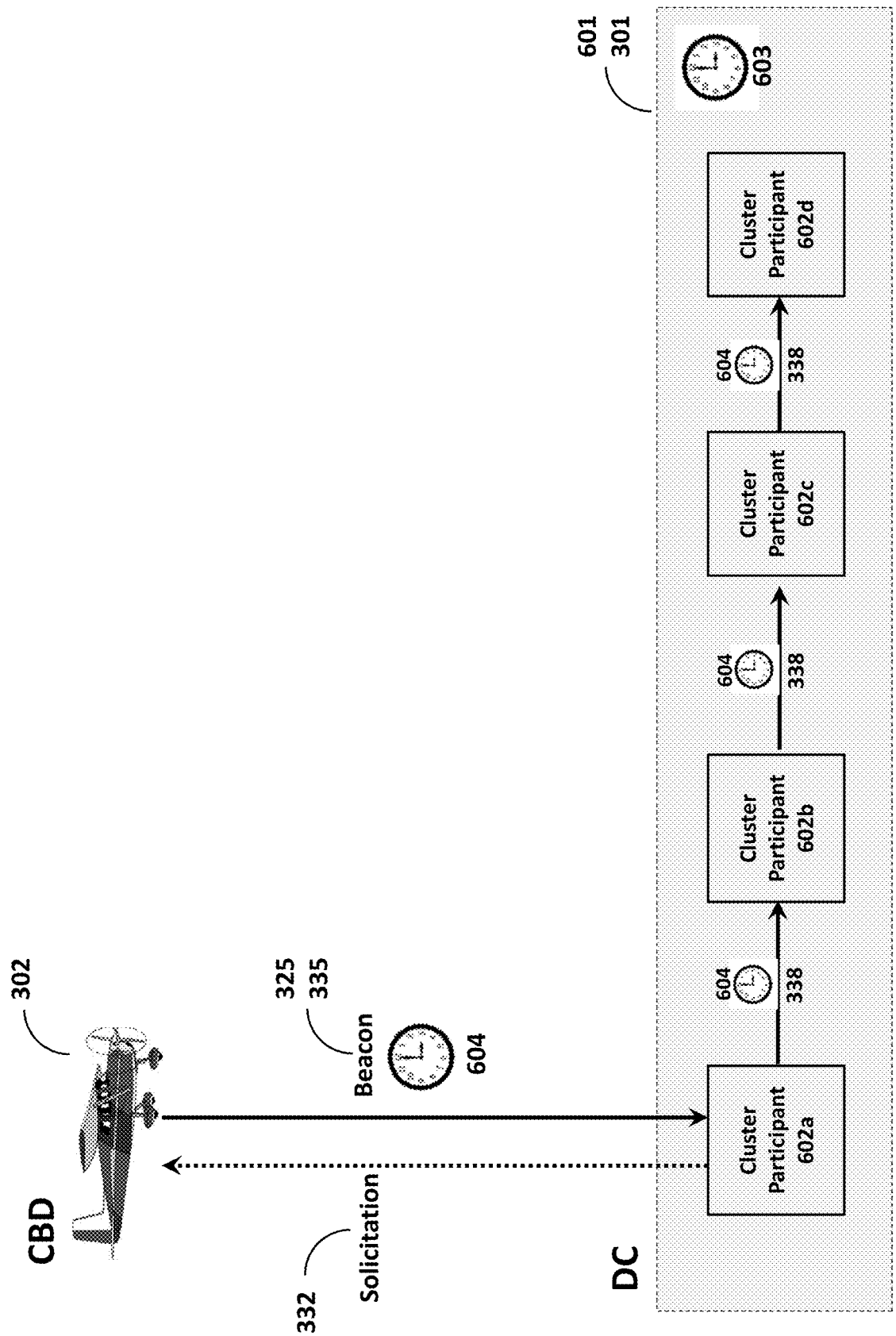
FIG. 6C is a diagram illustrating a remote cluster configured as a discovering cluster.

A remote cluster (601) configured as a DC (301) is illustrated in FIG. 6C. The remote cluster (601) may maintain a synchronized time (603) among cluster participants (602a-d). Cluster participants (602a-d) may exchange periodically DC synchronization (337) messages, approximately as illustrated in FIG. 6B for CBD synchronization (336). A CBD (302), illustrated as an aircraft flying from left to right, may periodically come into proximity of the remote cluster (601). A cluster participant (602a-d) may use active scanning (FIG. 3C) to discover the CBD (302), by transmitting a solicitation (332) and receiving one or more beacons (325, 335) in response. A cluster participant (602a-d) may use passive scanning (FIG. 3B), and receive beacons (325, 335) transmitted by the CBD (302). The beacons (325, 335) may be transmitted on a schedule. A first cluster participant (602a) may receive and process a beacon (325, 335) from the CBD (302). The beacon (325, 335) may provide CBD information (338), especially CBD time (604), that is indicative of a beaconing and/or scanning schedule for the CBD (302). CBD information (338) and CBD time (604) may be propagated from the first cluster participant (602a) to other cluster participants (602b-d), so that other cluster participants may scan efficiently for the CBD as the CBD (302) moves past and/or through the remote cluster (601).

FIG. 6C illustrates 2 clocks. A remote cluster clock (603) may be used to allow for time-synchronized communication among cluster participants (602a-d) when a remote cluster (601) is operating autonomously. A CBD clock (604) provides a time reference for cluster participants (602a-d) to scan for and communicate with a corresponding CBD (302). Two clocks—a remote cluster clock (603) and a CBD clock (604)—may be used by a remote cluster (601) simultaneously, with the remote cluster clock (603) used for exchanging messages among remote cluster participants (602a-d), and the CBD clock (604) used for scanning and/or communication between the remote cluster (601) and a CBD (302). In some implementations, the remote cluster clock (603) may be reset to the time of the CBD clock (604), after enough time has passed so that time-synchronized messages using the remote cluster clock (603) may be used to propagate the clock update.

When a remote cluster (601) is out of radio contact with the WSN (100), one or more remote cluster participants (602) may be configured to participate periodically in a passive scan (FIG. 3B) and/or an active scan (FIG. 3C). In some configurations, a remote cluster (601) may have an accurate clock (307), such as from GPS (308), enabling a remote cluster participant (602) to scan for beacons (325) or solicitations (332) at specific times, i.e., a synchronous scan. In some configurations, a remote cluster's (601) clock may be expected to drift over time, making the scan asynchronous. In an asynchronous scan, device-level energy constraints may render it impossible for energy-constrained remote cluster participants (602) to execute a scan successfully and quickly enough to detect a transient connection point while it remains in radio range.

In some configurations, a remote cluster participant (602) may be equipped with a larger energy sources, such as from mains or solar power, and may be configured to scan a high duty cycle.

An energy-constrained remote cluster participant (602) may designate certain times when it listens for messages that include CBD information (338). After CBD information (338) is received, a remote cluster participant (602) may commence CBD (302) discovery process using the CBD information (338).

If most or all remote cluster participants (602) in a remote cluster (601) are energy-constrained, passive scanning (FIG. 3B) and active scanning (FIG. 3C) may be scheduled so that multiple remote cluster participants (602) in the remote cluster (601) each scan at a different but coordinated time, with multiple remote cluster participants (602) sharing the energy burden. Remote cluster participants (602) that are more energy-constrained may be configured to share a lower proportion of the burden (e.g., scan less frequently) as compared to multiple remote cluster participants (602) that are less energy-constrained. When any remote cluster participant (602) in the remote cluster (601) detects a beacon (325, 335) from a CBD (302), CBD information (338) may be propagated through the remote cluster (601) so that each remote cluster participant (602) may quickly and efficiently discover the CBD (302).

For example, consider a pipeline with sensor devices operating as a remote cluster (601), with a remote cluster participant (602) located every 100 meters. A drone may fly over the pipeline, conducting a visual inspection, at a speed of 75 km per hour, or 100 m every 8 seconds. Each remote cluster participant (602) may be configured to receive and process CBD information (338) every 2 seconds. In this example, it is apparent that CBD information (337) may be configured to propagate along the remote cluster (601) more quickly than the drone can fly. Reception of a beacon being a relatively infrequent event, CBD information (338) would usually not be propagated. Nonetheless, remote cluster participants (602) may be configured to listen at an interval measured in seconds, so that fast propagation is possible. A message propagation schedule within a remote cluster (601) may be sequenced so that CBD information (338) received by one remote cluster participant (602) is quickly re-transmitted to the next remote cluster participant (602). In this example, a remote cluster participant (602) may be scheduled to listen for CBD information (337) every 2 seconds, with its schedule arranged to re-transmit the CBD information (337) to the next remote cluster participant (602) within 0.1 s of receipt. In that example, CBD information (338) may propagate 10 hops (1 km in this example) in about 1 s, or about 3600 km/hr. The energy impact for each remote cluster participant (602) may be incidental, because the propagation path may be infrequently used.

A few devices at the periphery of a remote cluster (601) or WSN (100) may be configured with sufficient resources to detect an approaching CBD (302) by receiving and processing a beacon (325, 335). After a first beacon (325, 335) is received and processed by a remote cluster participant (602), corresponding CBD information (338) may be rapidly propagated through the remote cluster (601) or WSN (100).

In some implementations, a remote cluster (601) may be configured as a CBD (302). A remote cluster participant (602) may receive a solicitation (332) from a DC (301) and respond with a beacon (335). The DC (301) may then adopt the timing of the remote cluster (601) member and transmit a series of solicitations (332) on a schedule. Remote cluster participants (602) may be arranged to scan for solicitations (332) on that schedule. In this manner, a mobile DC (301) may be configured to scan actively for a series of remote cluster participants (602) in a time-synchronized manner and with minimal coordination among remote cluster participants (602). A mobile device, such as in a fly-by scenario, may synchronize to the clock (603) of a remote cluster (601) based on reception of a single beacon (325, 335) or any other message conveying the remote cluster's clock (603). The remote cluster (601) and the mobile device having established a shared clock, discovery of remote cluster participants (602) by the mobile device may proceed on a time-synchronized basis.

Flood routing may be used in a remote cluster (601). Certain timeslots may be designated for "shared" use, i.e., contention-based transmission. Remote cluster participants (602) may share these links, selecting links for broadcast transmission of a message on a randomized basis. Reception of the message by another remote cluster participant (602) may be inferred by noting that the message has been re-transmitted in a subsequent shared timeslot. A history of recently transmitted messages, stored in each remote cluster participant (602), may be used to squelch circular routing.

Shared links may become over-burdened if used by too many remote cluster participants (602). Contention-based protocols may become congested in the 10-40% range. Each remote cluster participant (602) participating in flood routing may monitor shared links and limit the use of shared links when high utilization is detected.

Remote cluster clock (603) update messages may be flooded periodically from clock master(s) and may be used to establish routing tables. For example, timeslots may be designated for transmission by hop count or hop depth from a clock master. A device at hop depth N may transmit its data using timeslots designated for hop depth N and listen during timeslots designated for hop depths N−1 and layer N+1. For linear configurations such as pipelines, timeslot allocations may be arranged based on a modulus of hop depth. Timeslot allocations may be sequenced so that messages flow in either direction relatively quickly. If clock masters are arranged also to act as proxies or gateways (106) for the remote cluster (106), data messages routed toward a clock master may be repeated only in the direction of lower hop depth.

A remote cluster participant (602) may be configured as an S&F surrogate (542) for other remote cluster participants (602).

In a remote cluster (601) some or all remote cluster participants (602) may be configured as S&F surrogates (542). An S&F surrogate (542) in a remote cluster participant (602) may store and subsequently forward messages on behalf of some or all other remote cluster participants (602) in the remote cluster (601). Messages containing sensor time series or other information may be unicast, broadcast, or flooded through the remote cluster (601) and arrive at S&F surrogates (542), where they may be stored in an S&F buffer (543). The contents of each message may be authenticated and encrypted using symmetric keys known only to the source and destination of the message, but unknown to the S&F surrogate. The message header may contain a source address, message identifier, and timestamp. If a message is received with the same source address and message identifier as a previously buffered message, but a later timestamp, the S&F surrogate (542) may interpret that as a fresher version of the same message and replace the stale message in its S&F buffer (543) with the fresher version of the same message.

When a second cluster is discovered that can accept the contents of a remote cluster participant's (602) S&F buffer (543), the remote cluster participant (602) may form a temporary connection to the second cluster and then forward the information from the cluster participant's (602) S&F buffer (543) to the second cluster. The remote cluster participant (602) may receive and store messages from the second cluster addressed to other remote cluster participants (602), which may be forwarded when time allows.

A remote cluster participant (602) with an S&F surrogate (542) may use a second radio for faster bulk transfer. For example, the remote cluster participant (602) may communicate with a second cluster using Wi-Fi, while using an IEEE 802.15.4 radio to communicate with other remote cluster participants (602). Discovery involving the second cluster may use the WSN radio, such as an IEEE 802.15.4 radio, with bulk transfer to the second cluster using Wi-Fi if available on both sides of the link.

Delivery of a message to an S&F surrogate (542) does not necessarily constitute delivery of a payload to its ultimate destination. A remote cluster (601) may reasonably be arranged so that each remote cluster participant's (602) data is proxied by multiple S&F surrogates (542) in the remote cluster (601), providing multiple opportunities for the data to be uploaded to a second cluster. Assuming that each such message is identified—such as with a source address, a message identifier, and a timestamp—S&F communication may be arranged so that transmission of a message may be squelched if the same message has already been received from another S&F surrogate (542) by the second cluster.

In a remote cluster (601), one or several remote cluster participants (602) may act as a gateway (106). A gateway (106) in a remote cluster (601) may be a trusted entity that can cryptographically authenticate and decrypt messages from remote cluster participant (602). Delivery of a message to a gateway may be considered, from the remote cluster participant's (602) point of view, to constitute delivery of the payload to its ultimate destination. It is up to the gateway to assure transmission of the data to other system entities. A data aggregator may be modeled as a gateway (106), or not, depending on the resilience of the onward communication path and/or security policies.

Symmetric keys may be used to determine whether a remote cluster participant (602) may be admitted to a remote cluster (601) and/or whether a remote cluster participant (602) may be trusted to provide certain services such as gateway (106) services. When a new remote cluster participant (602) is introduced to a remote cluster (601), a symmetric key in the remote cluster participant (602) may be matched with a symmetric key in the remote cluster (601) to confirm that the remote cluster participant (602) is permitted to operate in conjunction with the cluster. A symmetric key in a cluster element (such as a gateway (106)) may be matched with a symmetric key in a remote cluster participant (602) to confirm that the cluster element is a trusted recipient of the remote cluster participant's (602) data.

Asymmetric keys may be used to determine whether a remote cluster participant (602) may be admitted to a remote cluster (601) and/or whether a remote cluster participant (602) may be trusted to deliver certain services such as gateway (106) services. When a new remote cluster participant (602) is introduced into a remote cluster (601), a private key in the remote cluster participant (602) may be matched with a public key in the remote cluster (601) to confirm that the remote cluster participant (602) is permitted to operate in conjunction with the cluster. A private key in a cluster element (such as a gateway (106)) may be matched with a public key in a remote cluster participant (602) to confirm that the cluster element is a trusted recipient of the remote cluster participant's (602) data.

What is claimed:

1. A method for sharing sensor data between a wireless device that is mobile and a cluster of wireless devices that stores sensor data, the method comprising:
   transmitting, by a cluster of wireless devices, a request to the wireless device that is mobile;
   transmitting, by a wireless device that is mobile responsive to receiving the request from the cluster of wireless devices, a response comprising information identifying the wireless device, to the cluster of wireless devices that stores sensor data;
   receiving, by the cluster of wireless devices, the response from the wireless device;
   establishing, by the cluster of wireless devices responsive to and using the response, a time synchronized two way wireless communication with the wireless device while at least temporarily in wireless range of each other;
   receiving, by the wireless device via the time synchronized two way wireless communication, sensor data stored at the cluster of wireless devices; and
   wherein the wireless device establishes a connection with a second wireless device and forwards sensor data received from the cluster of wireless devices to the second wireless device.

2. The method of claim 1, wherein the response comprises one or more of the following elements: a network identifier, a cryptographic authentication code, a time synchronization field, a time and frequency communication schedule and an extended header.

3. The method of claim 1, wherein the connection is established with the second wireless device after the time synchronized two way wireless communication is established.

4. The method of claim 1, wherein the wireless device is being conveyed by one of a vehicle, personnel, personal transport, boat, ship, aircraft, robot, or drone.

5. The method of claim 1, wherein the cluster of wireless devices is a single wireless device.

6. The method of claim 1, wherein one of the cluster of wireless devices aggregates data received by at least another wireless device of the cluster of wireless devices.

7. The method of claim 1, further comprising identifying, by the wireless device via cryptographic authentication, that the cluster of wireless devices has credentials to access the wireless device.

8. The method of claim 1, further comprising identifying, by the cluster of wireless devices, via cryptographic authentication, that the wireless device has credentials to access the cluster of wireless devices.

9. The method of claim 1, further comprising designating a frequency hopping schedule for wireless communications.

10. A system for sharing sensor data between a wireless device that is mobile and a cluster of wireless devices that stores sensor data the system comprising:
    a plurality of wireless devices comprising the wireless device that is mobile and at least one of the cluster of wireless devices that stores sensor data;
    wherein the cluster of wireless devices is configured to transmit a request to the plurality of wireless devices;
    wherein the wireless device is configured to transmit a response comprising information identifying the wireless device to the cluster of wireless devices responsive to receiving a request from the cluster of wireless devices,
    wherein the cluster of wireless devices is configured to receive the response from the wireless device;
    wherein the cluster of wireless devices is configured, responsive to and using the response, to establish a time synchronized two way wireless communication with the wireless device while at least temporarily in wireless range of each other;
    wherein one of the wireless device is configured to receive, via the time synchronized two way wireless communication, sensor data stored at the at least one cluster of wireless devices; and
    wherein the wireless device establishes a connection with a second wireless device and forwards sensor data received from the cluster of wireless devices to the second wireless device.

11. The system of claim 10, wherein the response comprises one or more of the following elements: a network identifier, a cryptographic authentication code, a time synchronization field, a time and frequency communication schedule and an extended header.

12. The system of claim 10, wherein the connection is established with the second wireless device after the time synchronized two way wireless communication is established.

13. The system of claim 10, wherein the wireless device is being conveyed by one of a vehicle, personnel, personal transport, boat, ship, aircraft, robot, or drone.

14. The system of claim 10, wherein the cluster of wireless devices is a single wireless device.

15. The system of claim 10, wherein one of the cluster of wireless devices is configured to aggregate data received by at least another wireless device of the cluster of wireless devices.

16. The system of claim 10, wherein the wireless device is configured to identify via cryptographic authentication that the cluster of wireless devices has credentials to access the wireless device.

17. The system of claim 10, wherein the cluster of wireless devices is configured to identify via cryptographic authentication that the wireless device has credentials to access the cluster of wireless devices.

18. The system of claim 10, wherein the cluster of wireless devices is configured to use a designated frequency hopping schedule for wireless communications.

19. A method for sharing sensor data between a wireless device that is mobile and a cluster of wireless devices that store sensor data, the method comprising:
    transmitting, by a cluster of wireless devices, a request to the wireless device that is mobile;
    transmitting, by a wireless device that is mobile responsive to receiving the request from the cluster of wireless devices, a response comprising information identifying the wireless device, to the cluster of wireless devices that stores sensor data;
    receiving, by the cluster of wireless devices, the response from the wireless device;
    establishing, by the cluster of wireless devices responsive to and using the response, a time synchronized two way wireless communication with the wireless device while at least temporarily in wireless range of each other, wherein a connection is established with a second wireless device after the time synchronized two way wireless communication is established; and
    receiving, by the wireless device via the time synchronized two way wireless communication, sensor data stored at the cluster of wireless devices.

20. The method of claim 19, wherein the response comprises one or more of the following elements: a network identifier, a cryptographic authentication code, a time synchronization field, a time and frequency communication schedule and an extended header.

21. The method of claim 19, wherein the wireless device is being conveyed by one of a vehicle, personnel, personal transport, boat, ship, aircraft, robot, or drone.

22. The method of claim 19, wherein the cluster of wireless devices is a single wireless device.

23. The method of claim 19, wherein one of the cluster of wireless devices aggregates data received by at least another wireless device of the cluster of wireless devices.

24. The method of claim 19, further comprising identifying, by the wireless device via cryptographic authentication, that the cluster of wireless devices has credentials to access the wireless device.

25. The method of claim 19, further comprising identifying, by the cluster of wireless devices, via cryptographic authentication, that the wireless device has credentials to access the cluster of wireless devices.

26. The method of claim 19, further comprising designating a frequency hopping schedule for wireless communications.

27. A system for sharing sensor data between a wireless device that is mobile and a cluster of wireless devices that store sensor data the system comprising:
   a plurality of wireless devices comprising the wireless device that is mobile and at least one of the cluster of wireless devices that stores sensor data;
   wherein the cluster of wireless devices is configured to transmit a request to the plurality of wireless devices;
   wherein the wireless device is configured to transmit a response comprising information identifying the wireless device to the cluster of wireless devices responsive to receiving a request from the cluster of wireless devices,
   wherein the cluster of wireless devices is configured to receive the response from the wireless device;
   wherein the cluster of wireless devices is configured, responsive to and using the response, to establish a time synchronized two way wireless communication with the wireless device while at least temporarily in wireless range of each other;
   wherein one of the wireless device is configured to receive, via the time synchronized two way wireless communication, sensor data stored at the at least one cluster of wireless devices; and
   wherein a connection is established with a second wireless device after the time synchronized two way wireless communication is established.

28. The system of claim 27, wherein the response comprises one or more of the following elements: a network identifier, a cryptographic authentication code, a time synchronization field, a time and frequency communication schedule and an extended header.

29. The system of claim 27, wherein the wireless device is being conveyed by one of a vehicle, personnel, personal transport, boat, ship, aircraft, robot, or drone.

30. The system of claim 27, wherein the cluster of wireless devices is a single wireless device.

31. The system of claim 27, wherein one of the cluster of wireless devices is configured to aggregate data received by at least another wireless device of the cluster of wireless devices.

32. The system of claim 27, wherein the wireless device is configured to identify via cryptographic authentication that the cluster of wireless devices has credentials to access the wireless device.

33. The system of claim 27, wherein the cluster of wireless devices is configured to identify via cryptographic authentication that the wireless device has credentials to access the cluster of wireless devices.

34. The system of claim 27, wherein the cluster of wireless devices is configured to use a designated frequency hopping schedule for wireless communications.

* * * * *